US008862489B2

(12) United States Patent
Motoyama et al.

(10) Patent No.: US 8,862,489 B2
(45) Date of Patent: Oct. 14, 2014

(54) PROJECT MANAGEMENT SYSTEM WITH INSPECTION FUNCTIONALITY

(75) Inventors: Tetsuro Motoyama, Cupertino, CA (US); Avery Fong, Castro Valley, CA (US)

(73) Assignee: Ricoh Company, Ltd., Tokyo (JP)

( * ) Notice: Subject to any disclaimer, the term of this patent is extended or adjusted under 35 U.S.C. 154(b) by 302 days.

(21) Appl. No.: 12/211,341

(22) Filed: Sep. 16, 2008

(65) Prior Publication Data
US 2010/0070321 A1 Mar. 18, 2010

(51) Int. Cl.
*G06Q 10/00* (2012.01)
*G06Q 10/06* (2012.01)

(52) U.S. Cl.
CPC ........ *G06Q 10/06* (2013.01); *G06Q 10/063114* (2013.01)
USPC .......................... 705/7.15; 705/7.13; 705/301

(58) Field of Classification Search
USPC ........... 705/7, 8, 9, 28, 7.11, 7.12, 7.13, 7.15, 705/301; 700/103; 717/101; 707/999.007; 702/83, 122, 185; 714/38.1
See application file for complete search history.

(56) References Cited

U.S. PATENT DOCUMENTS

| | | | |
|---|---|---|---|
| 5,682,473 A * | 10/1997 | Carson et al. | ................. 714/38.1 |
| 5,826,252 A | 10/1998 | Wolters et al. | |
| 6,049,776 A | 4/2000 | Donnelly et al. | |
| 6,101,481 A | 8/2000 | Miller | |
| 6,222,530 B1 | 4/2001 | Sequeria | |
| 6,308,164 B1 | 10/2001 | Nummelin et al. | |
| 6,334,097 B1 * | 12/2001 | Yoshitake et al. | ............ 702/185 |
| 6,415,259 B1 | 7/2002 | Wolfinger et al. | |
| 6,487,469 B1 | 11/2002 | Formenti | |
| 6,954,737 B2 | 10/2005 | Kalantar et al. | |
| 7,051,036 B2 | 5/2006 | Rosnow et al. | |
| 7,073,175 B2 | 7/2006 | Rehg et al. | |
| 7,167,893 B1 | 1/2007 | Malone et al. | |
| 7,219,107 B2 | 5/2007 | Beringer | |
| 7,251,693 B2 | 7/2007 | Stull et al. | |
| 7,269,798 B2 | 9/2007 | Nonaka et al. | |
| 7,283,975 B2 * | 10/2007 | Broughton | ...................... 705/28 |
| 7,406,432 B1 | 7/2008 | Motoyama | |
| 7,496,886 B2 | 2/2009 | Puttaswany et al. | |
| 7,546,228 B2 | 6/2009 | Cullick et al. | |
| 7,668,800 B2 | 2/2010 | Motoyama et al. | |

(Continued)

FOREIGN PATENT DOCUMENTS

| | | | |
|---|---|---|---|
| JP | 2001202405 A | 7/2001 | |
| JP | 2002024495 A | 1/2002 | |
| JP | 2006244342 A | 9/2006 | |

OTHER PUBLICATIONS

Chin et al., Elsevier, Automation in Construction, vol. 13, Issue 2, Mar. 2004, pp. 241-259.*

*Primary Examiner* — Timothy Padot
(74) *Attorney, Agent, or Firm* — Hickman Palermo Truong Becker Bingham Wong LLP

(57) ABSTRACT

A project management system manages project schedule data using project task state data. The project task state data indicates the current state of project tasks and is used to determine which project tasks are to be included in a member schedule editor, member schedule reports and inspection reports. The project management system also provides support for various inspection functionality. This includes, for example, identifying and naming inspection material for use in inspection meeting forms and inspection meeting documents. The inspection functionality also includes generating an inspection index and an inspection statistics report.

9 Claims, 47 Drawing Sheets

(56) References Cited

U.S. PATENT DOCUMENTS

| | | |
|---|---|---|
| 7,721,290 B2 | 5/2010 | Horikawa |
| 2002/0004734 A1 | 1/2002 | Nishizawa |
| 2002/0077879 A1 | 6/2002 | Uchida et al. |
| 2002/0078007 A1 | 6/2002 | Herrero |
| 2002/0082889 A1 | 6/2002 | Oliver |
| 2002/0143601 A1* | 10/2002 | Sinex ................................ 705/9 |
| 2002/0169739 A1 | 11/2002 | Carr et al. |
| 2002/0178019 A1 | 11/2002 | Anderson et al. |
| 2002/0194048 A1 | 12/2002 | Levinson |
| 2003/0014409 A1* | 1/2003 | Shukoor ............................ 707/7 |
| 2003/0046134 A1 | 3/2003 | Frolick et al. |
| 2003/0046345 A1 | 3/2003 | Wada et al. |
| 2003/0135481 A1* | 7/2003 | Helmes et al. .................... 707/1 |
| 2003/0191681 A1 | 10/2003 | Gallion et al. |
| 2003/0225611 A1* | 12/2003 | Wilson et al. ................... 705/11 |
| 2004/0017400 A1 | 1/2004 | Ly et al. |
| 2004/0039723 A1 | 2/2004 | Lee et al. |
| 2004/0078257 A1 | 4/2004 | Schweitzer et al. |
| 2004/0111705 A1* | 6/2004 | Motoyama et al. ........... 717/126 |
| 2004/0117046 A1* | 6/2004 | Colle et al. ...................... 700/99 |
| 2004/0162750 A1 | 8/2004 | Motoyama |
| 2004/0260782 A1 | 12/2004 | Affleck et al. |
| 2004/0267595 A1 | 12/2004 | Woodings et al. |
| 2005/0022198 A1 | 1/2005 | Olapurath et al. |
| 2005/0027386 A1 | 2/2005 | Weigand et al. |
| 2005/0028158 A1 | 2/2005 | Ferguson et al. |
| 2005/0033669 A1 | 2/2005 | Stremler et al. |
| 2005/0080714 A1 | 4/2005 | McHale et al. |
| 2005/0137920 A1 | 6/2005 | O'Connor et al. |
| 2005/0138031 A1 | 6/2005 | Wefers |
| 2005/0160084 A1 | 7/2005 | Barrett |
| 2005/0216328 A1 | 9/2005 | Clark |
| 2006/0053043 A1 | 3/2006 | Clarke |
| 2006/0053125 A1 | 3/2006 | Scott |
| 2006/0070019 A1 | 3/2006 | Vishnumurty et al. |
| 2006/0074844 A1 | 4/2006 | Frankel et al. |
| 2006/0090071 A1 | 4/2006 | Sinzig et al. |
| 2006/0111953 A1 | 5/2006 | Setya |
| 2006/0136461 A1 | 6/2006 | Lee et al. |
| 2006/0173879 A1 | 8/2006 | MacFarlane et al. |
| 2006/0212327 A1 | 9/2006 | Norman |
| 2006/0223509 A1* | 10/2006 | Fukazawa et al. ......... 455/414.3 |
| 2006/0248166 A1 | 11/2006 | Milosevic et al. |
| 2006/0265690 A1 | 11/2006 | Motoyama et al. |
| 2007/0067196 A1* | 3/2007 | Usui ................................. 705/8 |
| 2007/0073695 A1 | 3/2007 | Conlan et al. |
| 2007/0143827 A1 | 6/2007 | Nicodemus et al. |
| 2007/0146791 A1 | 6/2007 | Murase |
| 2007/0150327 A1 | 6/2007 | Dromgold |
| 2007/0192156 A1 | 8/2007 | Gauger |
| 2007/0203660 A1* | 8/2007 | North et al. ...................... 702/83 |
| 2007/0214450 A1 | 9/2007 | Motoyama et al. |
| 2007/0282658 A1 | 12/2007 | Brintle |
| 2007/0288283 A1 | 12/2007 | Fitzpatrick |
| 2007/0288288 A1 | 12/2007 | Motoyama et al. |
| 2007/0288289 A1 | 12/2007 | Motoyama et al. |
| 2007/0288290 A1 | 12/2007 | Motoyama et al. |
| 2007/0288334 A1 | 12/2007 | Creedle et al. |
| 2007/0294617 A1 | 12/2007 | Kroeger |
| 2008/0027779 A1 | 1/2008 | Kirwan |
| 2008/0103871 A1 | 5/2008 | Ruehl et al. |
| 2008/0201713 A1 | 8/2008 | Chaffee et al. |
| 2008/0209416 A1 | 8/2008 | De Souza et al. |
| 2008/0221952 A1 | 9/2008 | Mohri |
| 2008/0255907 A1 | 10/2008 | Motoyama et al. |
| 2008/0313024 A1 | 12/2008 | Kunichika et al. |
| 2009/0217240 A1 | 8/2009 | Motoyama et al. |
| 2009/0217241 A1 | 8/2009 | Motoyama et al. |
| 2009/0222299 A1 | 9/2009 | Clemenson et al. |
| 2009/0263769 A1 | 10/2009 | Sweeney |
| 2009/0276260 A1 | 11/2009 | Douglas et al. |
| 2009/0287521 A1 | 11/2009 | Motoyama et al. |
| 2009/0287522 A1 | 11/2009 | Motoyama et al. |
| 2009/0287718 A1 | 11/2009 | Motoyama et al. |
| 2009/0287730 A1 | 11/2009 | Motoyama et al. |
| 2009/0287731 A1 | 11/2009 | Motoyama et al. |
| 2010/0070328 A1 | 3/2010 | Motoyama |

* cited by examiner

Task Assignment

| Task | Member Assignment |
|---|---|
| Planning | |
| Project Plan | T1 |
| Project Initiation | MGR |
| Requirements | |
| Requirements for System | T2 |
| Requirements Matrix for System | T2 |
| Guideline Documents | |
| Implementation and Unit Test Plan Guideline | T3 |
| Procedure for Source Code Control | T3 |
| Organization and Use of Project Directory | T1 |
| Design Document Guideline | T1 |
| Code Convention | |
| Package Design | |
| Top Level Design | |
| Interface | T1 |
| Architecture | MGR |
| Database | |

FIG. 1B

J17 Project Task Schedule Editor

| Task | | Set Date | Planned Start Date | Planned End Date | Actual Start Date | Actual End Date |
|---|---|---|---|---|---|---|
| Planning | | 2005-09-19 | 2005-10-03 | 2005-10-14 | | |
| MGR | Project Initiation | 2005-09-20 | 2005-09-20 | 2005-09-29 | 2005-09-20 | |
| T1 | Project Plan | 2005-09-19 | 2005-10-06 | 2005-10-13 | | |
| Requirements | | 2005-09-19 | 2005-10-17 | 2005-10-25 | | |
| Guideline Documents | | 2005-09-19 | 2005-10-17 | 2005-10-28 | | |
| T1 | Code Convention | 2005-10-27 | 2005-10-16 | 2005-10-23 | | |
| | Design Document Guideline | 2005-09-19 | 2005-10-21 | 2005-10-28 | | |
| Top Level Design | | 2005-09-19 | 2005-10-31 | 2005-11-18 | | |
| MGR | Architecture | 2005-09-20 | 2005-10-04 | 2005-10-12 | | |
| T1 | Interface | 2005-09-19 | 2005-10-31 | 2005-11-11 | | |
| Class Specification | | 2005-09-19 | 2005-11-18 | 2005-11-11 | | |
| Implementation and Unit Test Plan | | 2006-04-21 | Dec 23 2005 | Jan 9 2006 | | |
| New | | 2006-04-21 | | | | |
| | | 2006-04-21 | | | | |

Add Rows Above  Add Rows Below  3  Delete  Consolidate

Finish

| sProjectNumber | sMemberLabel | nProjectTaskID | nLevel1TaskID | sLevel1TaskName | setDate | planStart | planEnd | actualStart | actualEnd | nScheduleRevNumber | nDateState |
|---|---|---|---|---|---|---|---|---|---|---|---|
| J20 | AF | 30 | 32 | Specification Document Guideline | 9/24/2007 | 9/21/2007 | 9/26/2007 | 9/21/2007 | 9/26/2007 | 1 | 4 |
| J20 | AF | 0 | 12 | Review Patent Application | 9/14/2007 | 9/14/2007 | 9/21/2007 | 9/14/2007 | 9/20/2007 | 1 | 4 |
| J20 | AF | 30 | 52 | JavaScript Coding Guideline | 9/24/2007 | 9/27/2007 | 10/3/2007 | 9/25/2007 | 9/27/2007 | 1 | 4 |
| J20 | AF | 0 | 22 | Report for Project Website File/Directory Structure | 9/24/2007 | 9/24/2007 | 9/28/2007 | 9/24/2007 | 9/28/2007 | 1 | 4 |
| J20 | AF | 30 | 42 | PHP Coding Guideline | 9/24/2007 | 9/25/2007 | 10/1/2007 | 9/25/2007 | 9/27/2007 | 1 | 4 |
| J20 | AF | 60 | 72 | Setup new Database | 10/10/2007 | 10/9/2007 | 10/16/2007 | 10/9/2007 | | 1 | 3 |
| J20 | AF | 50 | 62 | Architecture/Database | 10/4/2007 | 9/28/2007 | 10/10/2007 | 9/28/2007 | | 1 | 3 |
| J20 | TM | 70 | 131 | Task Assignment Package | 10/9/2007 | 10/18/2007 | 10/26/2007 | 10/10/2007 | 10/12/2007 | 1 | 4 |
| J20 | TM | 0 | 71 | Project Budget Status | 9/28/2007 | 10/5/2007 | 10/9/2007 | 10/5/2007 | 10/8/2007 | 1 | 4 |
| J20 | TM | 70 | 141 | Project Schedule Package | 10/9/2007 | 10/29/2007 | 11/7/2007 | 10/13/2007 | 10/15/2007 | 1 | 4 |
| J20 | TM | 0 | 11 | Patent Application Status Report | 9/17/2007 | 9/17/2007 | 9/20/2007 | 9/17/2007 | 9/20/2007 | 1 | 4 |
| J20 | TM | 0 | 61 | Printer Analysis Report | 9/26/2007 | 9/27/2007 | 10/5/2007 | 9/27/2007 | 9/28/2007 | 1 | 4 |
| J20 | TM | 0 | 51 | Project Status Preparation | 9/20/2007 | 9/20/2007 | 9/28/2007 | 9/20/2007 | 9/28/2007 | 1 | 4 |
| J20 | TM | 40 | 41 | Project Plan Document | 9/20/2007 | 9/27/2007 | 10/10/2007 | 9/27/2007 | 10/9/2007 | 1 | 4 |
| J20 | TM | 10 | 21 | Project Initiation Document | 9/17/2007 | 9/17/2007 | 9/21/2007 | 9/17/2007 | 9/21/2007 | 1 | 4 |
| J20 | TM | 20 | 31 | Requirements Document | 9/20/2007 | 9/20/2007 | 10/8/2007 | 9/19/2007 | 9/26/2007 | 1 | 4 |

*FIG. 19A-1*

| J20 | TM | 70 | 81 | Inspection Database Design | 10/4/2007 | 11/9/2007 | 11/11/2007 | 10/12/2007 | 1 | 3 |
| J20 | TM | 70 | 121 | Common Package | 10/9/2007 | 10/10/2007 | 10/18/2007 | 10/9/2007 | 1 | 3 |
| J20 | TM | 70 | 151 | Member Schedule Package PHP Implementation | 10/9/2007 | 11/7/2007 | 11/14/2007 | | 1 | 2 |
| J20 | TM | 70 | 91 | Inspection Form Design | 10/4/2007 | 11/4/2007 | 11/9/2007 | | 0 | 2 |
| J20 | TM | 70 | 101 | Inspection Documents Design | 10/4/2007 | 11/13/2007 | | | 0 | 1 |
| J20 | TM | 70 | 111 | Inspection Package Design | 10/3/2007 | | | | 0 | 0 |

| sProjectNumber | nLevel1TaskID | nLevel2TaskID | sLevel2TaskName | setDate | planStart | planEnd | actualStart | actualEnd | nScheduleRevNumber | nDateState |
|---|---|---|---|---|---|---|---|---|---|---|
| J20 | 21 | 11 | Draft | 9/17/2007 | 9/17/2007 | 9/18/2007 | 9/17/2007 | 9/17/2007 | 1 | 4 |
| J20 | 62 | 72 | Draft | 10/4/2007 | 9/28/2007 | 10/5/2007 | 9/28/2007 | 10/5/2007 | 1 | 4 |
| J20 | 52 | 62 | Review/Inspection | 9/24/2007 | 10/1/2007 | 10/3/2007 | 9/26/2007 | 9/27/2007 | 1 | 4 |
| J20 | 52 | 52 | Draft | 9/24/2007 | 9/27/2007 | 10/1/2007 | 9/25/2007 | 9/25/2007 | 1 | 4 |
| J20 | 42 | 42 | Review/Inspection | 9/24/2007 | 9/27/2007 | 10/1/2007 | 9/26/2007 | 9/27/2007 | 1 | 4 |
| J20 | 42 | 32 | Draft | 9/24/2007 | 9/25/2007 | 9/27/2007 | 9/25/2007 | 9/25/2007 | 1 | 4 |
| J20 | 32 | 22 | Review/Inspection | 9/24/2007 | 9/24/2007 | 9/26/2007 | 9/25/2007 | 9/26/2007 | 1 | 4 |
| J20 | 32 | 12 | Draft | 9/24/2007 | 9/21/2007 | 9/24/2007 | 9/21/2007 | 9/24/2007 | 1 | 4 |
| J20 | 41 | 81 | Review/Inspection | 9/20/2007 | 10/8/2007 | 10/10/2007 | 10/8/2007 | 10/9/2007 | 1 | 4 |
| J20 | 21 | 21 | Review/Inspection | 9/17/2007 | 9/19/2007 | 9/20/2007 | 9/18/2007 | 9/19/2007 | 1 | 4 |
| J20 | 21 | 31 | Project Initiation Meeting | 9/17/2007 | 9/21/2007 | 9/21/2007 | 9/21/2007 | 9/21/2007 | 1 | 4 |
| J20 | 31 | 41 | Explore Task Flow | 9/20/2007 | 9/20/2007 | 9/26/2007 | 9/19/2007 | 9/21/2007 | 1 | 4 |
| J20 | 31 | 51 | Draft | 9/20/2007 | 9/24/2007 | 9/28/2007 | 9/24/2007 | 9/24/2007 | 1 | 4 |
| J20 | 31 | 61 | Review/Inspection | 9/20/2007 | 10/4/2007 | 10/8/2007 | 9/25/2007 | 9/26/2007 | 1 | 4 |
| J20 | 41 | 71 | Draft | 9/20/2007 | 9/27/2007 | 10/5/2007 | 9/27/2007 | 10/5/2007 | 1 | 4 |
| J20 | 62 | 82 | Review/Inspection | 10/4/2007 | 10/5/2007 | 10/10/2007 | 10/5/2007 | | 1 | 3 |
| J20 | 121 | 91 | Design | 10/9/2007 | 10/10/2007 | 10/15/2007 | 10/9/2007 | | 1 | 3 |
| J20 | 72 | 92 | Database Package Design | 10/10/2007 | 10/8/2007 | 10/13/2007 | 10/9/2007 | | 1 | 3 |
| J20 | 121 | 101 | Implementation | 10/9/2007 | 10/15/2007 | 10/18/2007 | | | 1 | 2 |
| J20 | 72 | 102 | Implement Database on lin | 10/10/2007 | 10/12/2007 | 10/16/2007 | | | 1 | 2 |

*FIG. 19B*

| sProjectNumber | nLevel2TaskID | nLevel3TaskID | sLevel3TaskName | setDate | planStart | planEnd | actualStart | actualEnd | nScheduleRevNumber | nDateState |
|---|---|---|---|---|---|---|---|---|---|---|
| J20 | 92 | 12 | Draft | 10/10/2007 | 10/9/2007 | 10/11/2007 | 10/9/2007 | 10/10/2007 | 1 | 4 |
| J20 | 91 | 11 | CDatabaseP | 10/9/2007 | 10/10/2007 | 10/12/2007 | 10/10/2007 | | 1 | 3 |
| J20 | 91 | 21 | DateUtilityP fglo_displayStatus | 10/9/2007 | 10/10/2007 | 10/12/2007 | 10/10/2007 | | 1 | 3 |
| J20 | 91 | 31 | Clean up of other specifications | 10/9/2007 | 10/11/2007 | 10/15/2007 | 10/10/2007 | | 1 | 3 |
| J20 | 101 | 41 | CDatabaseP | 10/9/2007 | 10/15/2007 | 10/18/2007 | | | 1 | 2 |
| J20 | 101 | 51 | DateUtilityP fglo_displayStatus | 10/9/2007 | 10/15/2007 | 10/17/2007 | | | 1 | 2 |
| J20 | 92 | 22 | Review/Inspection | 10/10/2007 | 10/11/2007 | 10/13/2007 | | | 1 | 2 |

FIG. 19C

| sProjectNumber | nLevel3TaskID | nLevel4TaskID | sLevel4TaskName | setDate | planStart | planEnd | actualStart | actualEnd | nScheduleRevNumber | nDateState |
|---|---|---|---|---|---|---|---|---|---|---|
| J20 | 11 | 11 | Draft | 10/9/2007 | 10/10/2007 | 10/10/2007 | 10/9/2007 | 10/9/2007 | 1 | 4 |
| J20 | 21 | 31 | Draft | 10/9/2007 | 10/10/2007 | 10/10/2007 | 10/9/2007 | 10/9/2007 | 1 | 4 |
| J20 | 11 | 21 | Review/Inspection | 10/9/2007 | 10/11/2007 | 10/12/2007 | 10/10/2007 | | 1 | 3 |
| J20 | 21 | 41 | Review | 10/9/2007 | 10/11/2007 | 10/12/2007 | 10/10/2007 | | 1 | 3 |
| J20 | 41 | 51 | Coding | 10/9/2007 | 10/15/2007 | 10/16/2007 | | | 1 | 2 |
| J20 | 41 | 61 | Test/Inspection | 10/9/2007 | 10/17/2007 | 10/18/2007 | | | 1 | 2 |
| J20 | 51 | 71 | Coding | 10/9/2007 | 10/15/2007 | 10/15/2007 | | | 1 | 2 |
| J20 | 51 | 81 | Test/Inspection | 10/9/2007 | 10/16/2007 | 10/17/2007 | | | 1 | 2 |

FIG. 19D

| sProjectNumber | sProjectDescription | sProjectDirectory | nProjectStatus |
|---|---|---|---|
| J01 | Application Software Usage Monitor | /web/dept/Projects/j01/ | 10 |
| J02 | Monitoring Library | /web/dept/Projects/j02/ | 10 |
| J19 | Project Schedule Management Implementation Database Change and Browser Support | /web/dept/Projects/j19/ | 1 |
| J20 | Linking inspection and project schedule, automatic project setup | /web/dept/Projects/j20/ | 1 |
| J21 | Discussion and General Meeting Forms | /web/dept/Projects/j21/ | 0 |

FIG. 20A

| sProjectNumber | sMemberName | sMemberLabel | nMemberRole | sMemberDirectory | sMemberEmail |
|---|---|---|---|---|---|
| J01 | Test One | TO | 2 | /web/dept/Members/t1/ | t1@usa.ricoh.com |
| J01 | Test Two | TT | 2 | /web/dept/Members/t2/ | t2@ricoh-usa.com |
| J01 | Test Manager | TM | 1 | /web/dept/Members/tm/ | tm@ricoh-usa.com |
| J01 | Test Leader | TL | 3 | /web/dept/Members/t1/ | t1@ricoh-usa.com |
| J02 | Test Leader | TL | 3 | /web/dept/Members/t1/ | t1@ricoh-usa.com |
| J02 | Test Three | T3 | 2 | /web/dept/Members/t3/ | t3@ricoh-usa.com |
| J02 | Test One | TO | 2 | /web/dept/Members/t1/ | t1@ricoh-usa.com |
| J02 | Test Two | TT | 2 | /web/dept/Members/t2/ | t2@ricoh-usa.com |
| J19 | Amy Fraiser | AF | 2 | /web/dept/Members/amy/ | amy@ricoh-usa.com |
| J19 | Tom Marsh | TM | 3 | /web/dept/Members/manager/ | manager@ricoh-usa.com |
| J20 | Amy Fraiser | AF | 2 | /web/dept/Members/amy/ | amy@ricoh-usa.com |
| J20 | Tom Marsh | TM | 3 | /web/dept/Members/manager/ | manager@ricoh-usa.com |
| J20 | Test One | TO | 2 | /web/dept/Members/t1/ | t1@ricoh-usa.com |
| J21 | Amy Fraiser | AF | 2 | /web/dept/Members/amy/ | amy@ricoh-usa.com |
| J21 | Tom Marsh | TM | 3 | /web/dept/Members/manager/ | manager@ricoh-usa.com |

| nInspectionId | sInspectionDocContId | sProjectNumber | inspectDate | sOriginator | sModerator | nAvePrepTime | sMeetingType | sInspectionType | startTime |
|---|---|---|---|---|---|---|---|---|---|
| 101 | Q6-RJ20-II-001 | J20 | 2/7/2008 | AF | TM | 17.5 | Inspection(T) | Doc | 15:14:00 |
| 102 | Q6-RJ20-II-002 | J20 | 2/7/2008 | TM | AF | 16 | Inspection(T) | CD | 15:18:00 |
| 103 | Q6-RJ20-II-003 | J20 | 2/7/2008 | AF | TM | 17.5 | Inspection(T) | CD | 15:23:00 |
| 104 | Q6-RJ20-II-004 | J20 | 2/7/2008 | TM | AF | 24 | Inspection(T) | Doc | 15:33:00 |
| 1 | Q6-RJ20-II-PRE01 | J20 | 2/7/2008 | TM | AF | 7 | Inspection(T) | Doc | 14:55:00 |
| 2 | Q6-RJ20-II-PRE02 | J20 | 2/7/2008 | TM | AF | 14 | Inspection(T) | Doc | 14:58:00 |

| endTime | nMeetingDuration | nNumOfMajorDefect | nNumOfMinorDefect | sResultOfInspection |
|---|---|---|---|---|
| 15:16:00 | 2 | 0 | 4 | C |
| 15:20:00 | 2 | 0 | 0 | A |
| 15:33:00 | 10 | 0 | 14 | R |
| 15:48:00 | 15 | 0 | 4 | C |
| 14:56:00 | 1 | 0 | 3 | C |
| 15:02:00 | 4 | 1 | 2 | R |

FIG. 21B

| sInspectionDocContId | sInspector | nPrepTime |
|---|---|---|
| Q6-RJ20-II-001 | TM | 13 |
| Q6-RJ20-II-001 | STR | 22 |
| Q6-RJ20-II-001 | AF | 0 |
| Q6-RJ20-II-002 | STR | 25 |
| Q6-RJ20-II-002 | TM | 0 |
| Q6-RJ20-II-002 | ADM | 23 |
| Q6-RJ20-II-002 | AF | 16 |
| Q6-RJ20-II-003 | TM | 19 |
| Q6-RJ20-II-003 | STR | 0 |
| Q6-RJ20-II-003 | AF | 24 |
| Q6-RJ20-II-004 | AF | 0 |
| Q6-RJ20-II-004 | TM | 7 |
| Q6-RJ20-II-PRE01 | AF | 0 |
| Q6-RJ20-II-PRE01 | TM | 0 |
| Q6-RJ20-II-PRE02 | TM | 0 |
| Q6-RJ20-II-PRE02 | AF | 14 |

| sInspectionDocContId | sDocument | nNumOfMajorDefect | nNumOfMinorDefect | sResultOfInspection | defectFixApprovalDate |
|---|---|---|---|---|---|
| Q6-RJ20-II-001 | Architecture/Database | 0 | 0 | A | |
| Q6-RJ20-II-001 | Setup new Database::Database Package Design | 0 | 3 | C | |
| Q6-RJ20-II-001 | Setup new Database::Implement Database on lin | 0 | 1 | C | |
| Q6-RJ20-II-002 | Implementation::DataUtilityP-fglo_displayStatus | 0 | 0 | A | |
| Q6-RJ20-II-002 | Implementation::phpDatabaseConstants | 0 | 0 | A | |
| Q6-RJ20-II-002 | Implementation::CDatabaseP | 0 | 0 | A | |
| Q6-RJ20-II-002 | Implementation::phpInspectionConstants | 0 | 0 | A | |
| Q6-RJ20-II-003 | Implement IMjs::cIMjsFormManagerJ.js | 0 | 9 | R | |
| Q6-RJ20-II-003 | Implement IMjs::cIMjsFormDisplayJ.js | 0 | 5 | C | |
| Q6-RJ20-II-004 | Task Assignment Package | 0 | 2 | C | |
| Q6-RJ20-II-004 | Member Schedule Package | 0 | 2 | C | |
| Q6-RJ20-II-004 | Project Schedule Package | 0 | 0 | A | |
| Q6-RJ20-II-PRE01 | Project Initiation | 0 | 3 | C | |
| Q6-RJ20-II-PRE02 | Project Plan | 1 | 2 | R | |

| sInspectionDocContId | nDefectId | sDocument | sLocation | sDescription | sType | sClass | sSeverity |
|---|---|---|---|---|---|---|---|
| Q6-RJ20-II-001 | 1 | Setup new Database::Database Package Design | ggg | ggg | DC | W | M |
| Q6-RJ20-II-001 | 1 | Setup new Database::Implement Database on lin | jjj | jjj | DA | E | M |
| Q6-RJ20-II-001 | 3 | Setup new Database::Database Package Design | iii | iii | DC | M | M |
| Q6-RJ20-II-001 | 2 | Setup new Database::Database Package Design | hhh | hhh | DC | W | M |
| Q6-RJ20-II-003 | 3 | Implement IMjs::cIMjsFormDisplayJ.js | vvv | vvv | IF | M | M |
| Q6-RJ20-II-003 | 5 | Implement IMjs::cIMjsFormManagerJ.js | ooo | ooo | IO | M | M |
| Q6-RJ20-II-003 | 6 | Implement IMjs::cIMjsFormManagerJ.js | ppp | ppp | ST | W | M |
| Q6-RJ20-II-003 | 7 | Implement IMjs::cIMjsFormManagerJ.js | qqq | qqq | ST | W | M |
| Q6-RJ20-II-003 | 8 | Implement IMjs::cIMjsFormManagerJ.js | rrr | rrr | ST | W | M |
| Q6-RJ20-II-003 | 9 | Implement IMjs::cIMjsFormManagerJ.js | sss | sss | ST | W | M |
| Q6-RJ20-II-003 | 1 | Implement IMjs::cIMjsFormDisplayJ.js | ttt | ttt | DC | W | M |
| Q6-RJ20-II-003 | 4 | Implement IMjs::cIMjsFormManagerJ.js | nnn | nnn | IF | W | M |
| Q6-RJ20-II-003 | 3 | Implement IMjs::cIMjsFormManagerJ.js | mmm | mmm | LO | U | M |
| Q6-RJ20-II-003 | 2 | Implement IMjs::cIMjsFormManagerJ.js | lll | lll | DC | W | M |
| Q6-RJ20-II-003 | 1 | Implement IMjs::cIMjsFormManagerJ.js | kkk | kkk | DC | M | M |
| Q6-RJ20-II-003 | 4 | Implement IMjs::cIMjsFormManagerJ.js | www | www | LO | M | M |
| Q6-RJ20-II-003 | 5 | Implement IMjs::cIMjsFormDisplayJ.js | xxx | xxx | IO | W | M |
| Q6-RJ20-II-003 | 2 | Implement IMjs::cIMjsFormDisplayJ.js | uuu | uuu | FN | E | M |
| Q6-RJ20-II-004 | 1 | Task Assignment Package | yyy | yyy | DC | M | M |
| Q6-RJ20-II-004 | 2 | Task Assignment Package | zzz | zzz | DC | W | M |
| Q6-RJ20-II-004 | 1 | Member Schedule Package | 111 | 111 | ST | W | M |
| Q6-RJ20-II-004 | 2 | Member Schedule Package | 222 | 222 | ST | W | M |
| Q6-RJ20-II-PRE01 | 3 | Project Initiation | ccc | ccc | DC | W | M |
| Q6-RJ20-II-PRE01 | 2 | Project Initiation | bbb | bbb | DC | E | M |
| Q6-RJ20-II-PRE01 | 1 | Project Initiation | aaa | aaa | DC | M | M |
| Q6-RJ20-II-PRE02 | 3 | Project Plan | fff | fff | LO | W | J |
| Q6-RJ20-II-PRE02 | 2 | Project Plan | eee | eee | DC | E | M |
| Q6-RJ20-II-PRE02 | 1 | Project Plan | ddd | ddd | DC | W | M |

| Image2.gif(6492 bytes) RICON | | Record Ctrl No.: Q6-RJ20-II-004 |
|---|---|---|
| | | Form Number: Q6-F010-01 Rev Number 1.6 |
| Inspection Form | | Project Number: J20 |

Meeting Date: _07Feb08_ Time: _15:33 – 15:48_

Project: _J20_ Release: _____

Document: _Member Schedule Package, Project Schedule Package, Task Assignment Package_ Originator: _TM_

Moderator: _AF_ Time Spent for Preparation: _Ave 24.00/60 AF 24/60 TM 0/60_

Meeting Type: Inspection(I)

Inspection Type: Document (Doc)

Result: Conditional (C)

Defect Type:
DA=Data, DC=Documentation, FN=Functionality, IF=Interface, LO=Logic, I/O=Input/Output, HF=Human Factors, MN=Maintainablility, PF=Performance, SN=syntax, ST=Standards, OT=Other Defect Class: M=Missing, W=Wrong, E=Extra (need to be removed), U=Unclear Defect Severity: J=Major, N=Minor Member Schedule Package Defect Table

| Location | Defect Description | Type | Class | Severity |
|---|---|---|---|---|
| 111 | 111 | ST | W | M |
| 222 | 222 | ST | W | M |

Task Assignment Package Defect Table

| Location | Defect Description | Type | Class | Severity |
|---|---|---|---|---|
| yyy | yyy | DC | M | M |
| zzz | zzz | DC | W | M |

FIG. 30

Inspection Statistics

Index of Inspection List

| Record ID | Title | Date | Type | Dec. | Minor | Major |
|---|---|---|---|---|---|---|
| Q6-RJ20-II-004 | Member Schedule Package, Project Schedule Package, Task Assignment Package | 07Feb08 | Inspection (I) | C | 4 | 0 |
| Q6-RJ20-II-003 | Implement IMjs::cIMjsFormDisplayJ.js, Implement IMjs::cIMjsFormManagerJ.js | 07Feb08 | Inspection (I) | R | 14 | 0 |
| Q6-RJ20-II-002 | Implementation::CDatabaseP, Implementation::DataUtilityP-fglo_displayStatus, Implementation::phpDatabaseConstants, Implementation::phpInspectionConstants | 07Feb08 | Inspection (I) | A | 0 | 0 |
| Q6-RJ20-II-001 | Architecture/Database, Setup new Database::Database Package Design, Setup new Database::Implement Database on lin | 07Feb08 | Inspection (I) | C | 4 | 0 |
| Q6-RJ20-II-PRE02 | Project Plan | 07Feb08 | Inspection (I) | R | 2 | 1 |
| Q6-RJ20-II-PRE01 | Project Initiation | 07Feb08 | Inspection (I) | C | 3 | 0 |

*FIG. 31*

Inspection Statistics Report
as of 07Feb08

| Statistics | Time Elapsed | Preparation Time | Minor Defect | Major Defect |
|---|---|---|---|---|
| All N=6 | | | | |
| Sum | 0.57 | 1.60 | 27.00 | 1.00 |
| Mean | 0.09 | 0.27 | 4.50 | 0.17 |
| StdDev | 0.09 | 0.08 | 4.46 | 0.37 |
| Min | 0.02 | 0.12 | 0.00 | 0.00 |
| Median | 0.05 | 0.28 | 3.50 | 0.00 |
| Max | 0.25 | 0.40 | 14.00 | 1.00 |
| Doc N=4 | | | | |
| Sum | 0.37 | 1.04 | 13.00 | 1.00 |
| Mean | 0.09 | 0.26 | 3.25 | 0.25 |
| StdDev | 0.09 | 0.10 | 0.83 | 0.43 |
| Min | 0.02 | 0.12 | 2.00 | 0.00 |
| Median | 0.05 | 0.26 | 3.50 | 0.00 |
| Max | 0.25 | 0.40 | 4.00 | 1.00 |
| CD N=2 | | | | |
| Sum | 0.20 | 0.56 | 14.00 | 0.00 |
| Mean | 0.10 | 0.28 | 7.00 | 0.00 |
| StdDev | 0.07 | 0.01 | 7.00 | 0.00 |
| Min | 0.03 | 0.27 | 0.00 | 0.00 |
| Median | 0.10 | 0.28 | 7.00 | 0.00 |
| Max | 0.17 | 0.29 | 14.00 | 0.00 |

FIG. 32

New Project Setup Form

Project Information

| Name | Directory | Title/Description |
|---|---|---|
| J21 | /web/dept/Project/j21 | Project Setup System |

Member Information

| Name | Label | Directory | Email Address | Role |
|---|---|---|---|---|
| Test Manager | TM | /web/dept/manager/ | manager@proj.ricoh.com | Manager |
| Test 1 | T1 | /web/dept/t1/ | t1@proj.ricoh.com | Manager-Member |
| Test 2 | T2 | /web/dept/t2/ | t2@proj.ricoh.com | Member |
| Test 3 | T3 | /web/dept/t3/ | t3@proj.ricoh.com | Member |

[Add Member] [Clear Members]

[Submit] [Reset]

FIG. 39

PROJECT MANAGEMENT SYSTEM WITH INSPECTION FUNCTIONALITY

CROSS REFERENCE TO RELATED APPLICATIONS

This application is related to co-pending U.S. patent application Ser. No. 12/122,392, filed May 16, 2008, entitled "Managing Project Schedule Data Using Separate Current And Historical Task Schedule Data"; U.S. patent application Ser. No. 12/122,442, filed May 16, 2008, entitled "Managing Project Schedule Data Using Separate Current And Historical Task Schedule Data And Revision Numbers"; co-pending U.S. patent application Ser. No. 12/122,497 filed May 16, 2008, entitled "To-Do List Representation In The Database Of A Project Management System"; co-pending U.S. patent application Ser. No. 12/122,514 filed May 16, 2008, entitled "Managing To-Do Lists In Task Schedules In A Project Management System"; co-pending U.S. patent application Ser. No. 12/122,533 filed May 16, 2008, entitled "Managing To-Do Lists In A Schedule Editor In A Project Management System"; U.S. patent application Ser. No. 12/211,286, filed Sep. 16, 2008, entitled "Managing Project Schedule Data Using Project Task State Data", the contents of all of which are hereby incorporated by reference for all purposes as if fully set forth herein.

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

TECHNICAL FIELD

The present application relates generally to project management. The application relates more specifically to managing project schedule data using task state data and also includes various inspection functionality.

BACKGROUND

Computer-implemented project management tools have evolved into sophisticated systems that allow very large projects with many tasks to be managed effectively. Some tools allow designation of a so called "critical path" that identifies a task or set of tasks that must be completed before other tasks can be started. Knowing which tasks must be completed before other tasks can be started helps business organizations allocate resources on a project. When dates are changed in the project, the schedules are automatically updated based upon dependencies between tasks. For example, suppose that task A is on the critical path and tasks B and C cannot be started until task A is completed. If the projected end date of task A is changed, then the projected start dates of tasks B and C are automatically updated by the project management tool to reflect the change made to the projected end date of task A. One of the problems with conventional project management systems is that they tend to accumulate a large amount of historical data. For example, in some situations, changing a single date on a task can cause changes in a large number of dates for other tasks. This is particularly true in situations where, because of dependencies, changes in dates cause a large number of other dates to change because of cascade effects. Conventional project management systems store both current and historical date information. One consequence of this is that as the amount of historical data grows, queries against the schedule data become more complex and computationally expensive to process. Another issue with conventional project management systems is that the user interfaces are often focused on project tasks that have been scheduled and little attention is given to tasks that have not yet been scheduled.

SUMMARY

A project management system manages project schedule data using project task state data. The project task state data indicates the current state of project tasks and is used to determine which project tasks are to be included in a member schedule editor, member schedule reports and inspection reports. The project management system also provides support for various inspection functionality. This includes, for example, identifying and naming inspection material for use in inspection meeting forms and inspection meeting documents. The inspection functionality also includes generating an inspection index and an inspection statistics report.

According to one aspect of the invention, an approach is provided for managing project schedule data. According to the approach, schedule data is generated and stored in a project schedule database for a plurality of project tasks in a project. State data is generated and stored in association with the schedule data in the project schedule database. The state data is separate from the schedule data and indicates a current state of each of the plurality of project tasks. A current state of a project task may include one of the project task is completed, the project task has been started but is not completed, the project task is planned but not started, only a start date is specified for the project task and the project task is unscheduled. The state data may be used, for example, to retrieve particular schedule data from the database, i.e., schedule data for project tasks having a particular state. The state data may also be used to arrange schedule data in editors, forms and reports to improve the user experience.

According to another aspect of the invention, another approach is provided for managing project schedule data. According to this approach, schedule data is generated and stored in a project schedule database for a plurality of project tasks in a project. State data is generated and stored in association with the schedule data in the project schedule database. The state data is separate from the schedule data and indicates a current state of each of the plurality of project tasks. A current state of a project task may include one of the project task is completed, the project task has been started but is not completed, the project task is planned but not started, only a start date is specified for the project task and the project task is unscheduled. In response to a request to perform an inspection, inspection material is retrieved from the project schedule database. The inspection material includes schedule data for one or more project tasks that both, based upon the corresponding state data, have a state of started but not completed, planned but not started or have only a start date specified and do not have any child project tasks. According to another aspect of the invention, the inspection material further includes schedule data for a particular project task that, based upon the corresponding state data, has a state of started but not completed, planned but not started or has only a start date specified and has at least one child project task that is a review, test or inspection project task. Identification data may also be generated and included in the inspection material in association with the schedule data for the particular project task. The identification data identifies the particular project task and the child project task for the particular project task.

According to another aspect of the invention, an approach is provided for managing inspections in a project management system. According to this approach, schedule data is generated and stored in a project schedule database for a plurality of project tasks in a project. State data is generated and stored in association with the schedule data in the project schedule database. The state data is separate from the schedule data and indicates a current state of each of the plurality of project tasks. A current state of a project task may include one of the project task is completed, the project task has been started but is not completed, the project task is planned but not started, only a start date is specified for the project task and the project task is unscheduled. In response to a request to perform an inspection, one or more project tasks are identified that qualify for inspection based upon the state data associated with the one or more project tasks indicating that each of the one or more projects tasks has been scheduled but not yet completed. A plurality of inspection materials associated with the one or more project tasks are identified and an inspection meeting form is generated. The inspection meeting form identifies the plurality of inspection materials and allows a user to enter information about defects in the plurality of inspection materials. The approach may also include generating inspection meeting documents, an inspection index and an inspection statistics Web page.

BRIEF DESCRIPTION OF THE DRAWINGS

In the drawings:

FIG. 1B is a screenshot of a sample of a task assignment Web page.

FIG. 2A is a screenshot of a project schedule editor.

FIG. 3A is a screenshot of a member schedule editor.

FIG. 8 also depicts the sequences involved in displaying the Web page for the task editor or meeting form, interacting with the task editor or meeting form by a user and completing the session, posting the information in the task editor or meeting form into the database and generating the appropriate web pages for the task editor or meeting form.

FIGS. 19A-19D depict example entries in the Level1MemberTask, Level3MemberTask, Level3MemberTask, and Level4MemberTask tables of the schedule database depicted in FIG. 9.

FIGS. 20A and 20B depict example entries in the ProjectInformation and MemberInformation tables of the ProjectTeam database depicted in FIG. 10.

FIGS. 21A through 21D depict sample entries in InspectionInformation, InspectorList, DocumentList, and DefectList tables of the inspection database depicted in FIG. 11.

FIG. 24 depicts an example member schedule editor.

FIG. 29 depicts an example Web page for entering information pertaining to an inspection meeting.

FIG. 30 depicts an example Inspection Meeting document generated after an inspection meeting session.

FIG. 31 depicts an example Inspection Index document generated after an inspection meeting session.

FIG. 32 depicts an example Inspection Statistic Report generated after an inspection meeting session.

FIG. 39 depicts the New Project Setup Form that allows a user to setup the new project.

DETAILED DESCRIPTION

A project management system manages project schedule data using project task state data. The project task state data indicates the current state of project tasks and is used to determine which project tasks are to be included in a member schedule editor and member schedule reports. The project management system also provides support for various inspection functionality. This includes, for example, identifying and naming inspection material for use in inspection meeting forms and inspection meeting documents. The inspection functionality also includes generating an inspection index and an inspection statistics report. Example embodiments of the invention are depicted in the figures and described herein in the context of a client-server based project management system. However, the approaches described herein are applicable to other types of systems and arrangements.

Task Assignment Editor

Figure 1A:
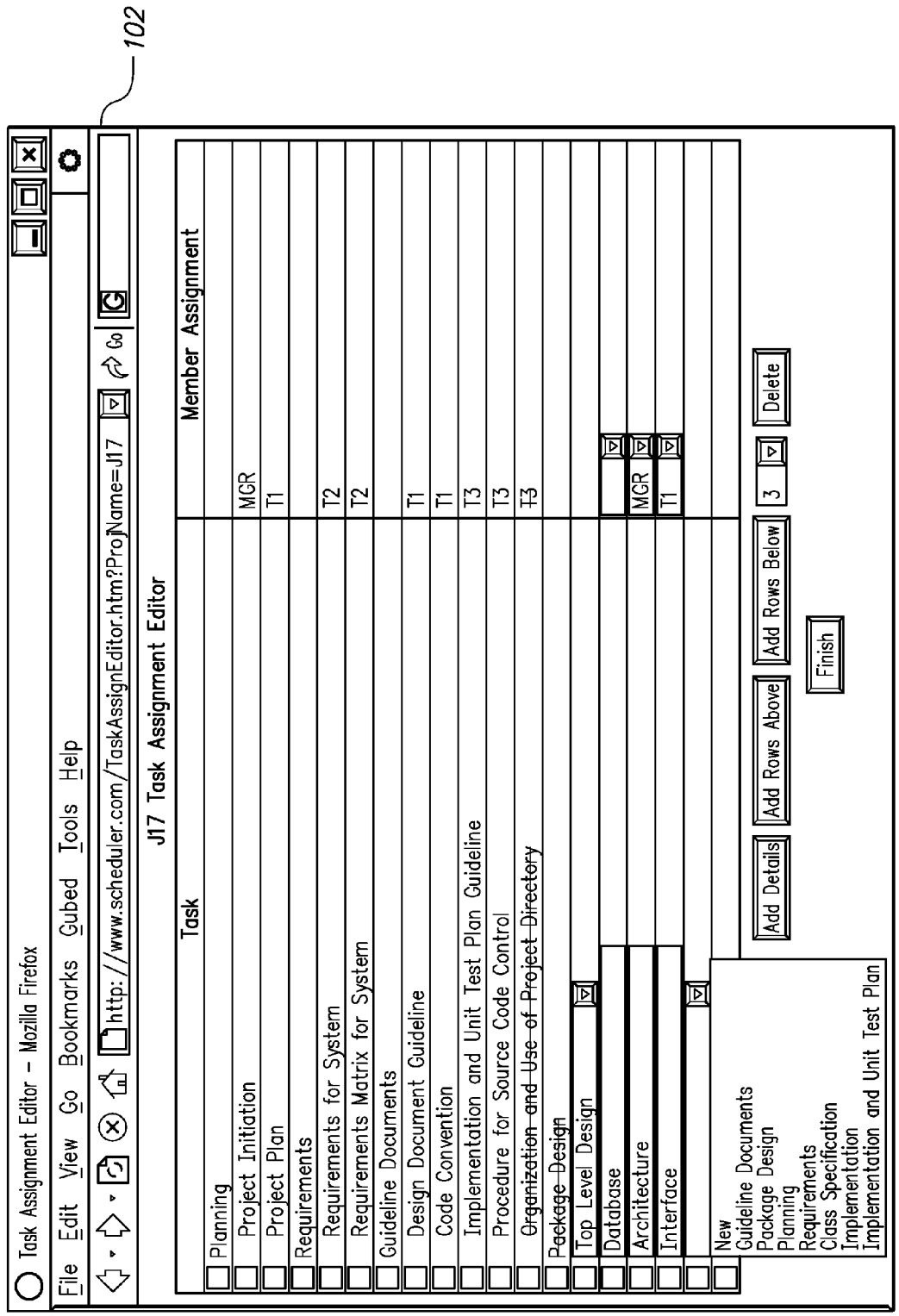
FIG. 1A is a screenshot of a task assignment editor.

FIG. 1A is a screenshot of a task assignment editor. The task assignment editor 102 assists users in creating the project tasks that are to be completed in a project. With some organizations, there are default project tasks that are common to all projects that will be performed in association with the organization. Associated with the project tasks are subtasks which are assigned to project members. Typically, a project manager sets and assigns tasks to project members. The project manager can use this task assignment editor 102 to set up the project tasks for a project, create the subtasks for each project task, and assign the subtasks to the members. Information about the task assignment is stored and maintained in the task assignment editor 102 while the project manager is adding and assigning tasks. Upon the manager completing a session with the task assignment editor 102, the task assignment information is passed to, stored in, and maintained in a database.

In response to completion of a task assignment session, such as in response to a user selecting the "Finish" button on the task assignment editor 102 of FIG. 1A, a task assignment Web page 104 is automatically created, at the Web server, for displaying the tasks that are assigned to various project members. FIG. 1B is a screenshot of a sample of a task assignment Web page. Task and task assignment information entered and edited via the task assignment editor 102 is displayed in a form in a Web page when displayed in a Web browser. All the tasks and the assignment of tasks are stored within one or more database tables, where each row preferably corresponds to a task, and displayed in the task assignment editor 102 and the task assignment Web page 104.

According to one embodiment, the task assignment editor 102 (FIG. 1A) includes buttons (e.g., Add Details, Add Rows Above, Add Rows Below, Delete, and Finish) usable to perform various operations. The "Finish" button completes the editor session and submits the task assignment information to be stored and maintained in the database. The other buttons perform a respective operation on a task that must be selected by selecting the checkbox in the row corresponding to the task. An "Add Details" button adds rows beneath a project task so the manager can add and assign subtasks to project members. "Add Rows Above" and "Add Rows Below" buttons add rows above and below the row corresponding to the selected task (either project task or subtask) so the manager can add more project tasks or add and assign more subtasks. The number of rows added is set by a "number of rows" menu selection that is next to the "Add Rows Below" button. The "Delete" button deletes the selected task, and removes a project task from the project or removes the assignment of subtasks to a project member.

Project Schedule Editor

FIG. 2A is a screenshot of a project schedule editor. The project schedule editor 202 is used to set the schedule for the project tasks that are created in the task assignment editor 102 (FIG. 1A). A project task may be created and scheduled in the project schedule editor 202. However, in one embodiment, subtasks cannot be added to the project tasks to assign them to project members using the project schedule editor 202. Most likely, the project manager will use the project schedule editor 202 after the task assignment editor 102. The manager can use the project schedule editor 202 to set the initial project schedule for the major project tasks added in the task assignment editor 102. Information about the scheduling of project tasks is stored and maintained in the project schedule editor 202 while the project manager is adding and scheduling tasks. Upon the manager completing a project schedule editor session, the schedule information for the project tasks is passed, stored, and maintained in the database.

In response to completion of a project schedule session, such as in response to a user selecting the "Finish" button on the project schedule editor 202 of FIG. 2A, a project schedule Web page 204 is automatically created, at the Web server, for displaying a table for the project schedule. If the individual project members' schedules are created and/or updated for the project subtasks, the project schedule editor 202 displays each project task schedule along with all the subtask schedules. The project schedule editor 202 depicts the subtasks with the project member to whom it was assigned. By completing the editor session or by selecting "Consolidate" on the project schedule editor 202 of FIG. 2A, all the subtask schedules for each project task are automatically consolidated or aggregated to update the schedule for the project task, and the project task schedule is updated in the database.

Figure 2B:
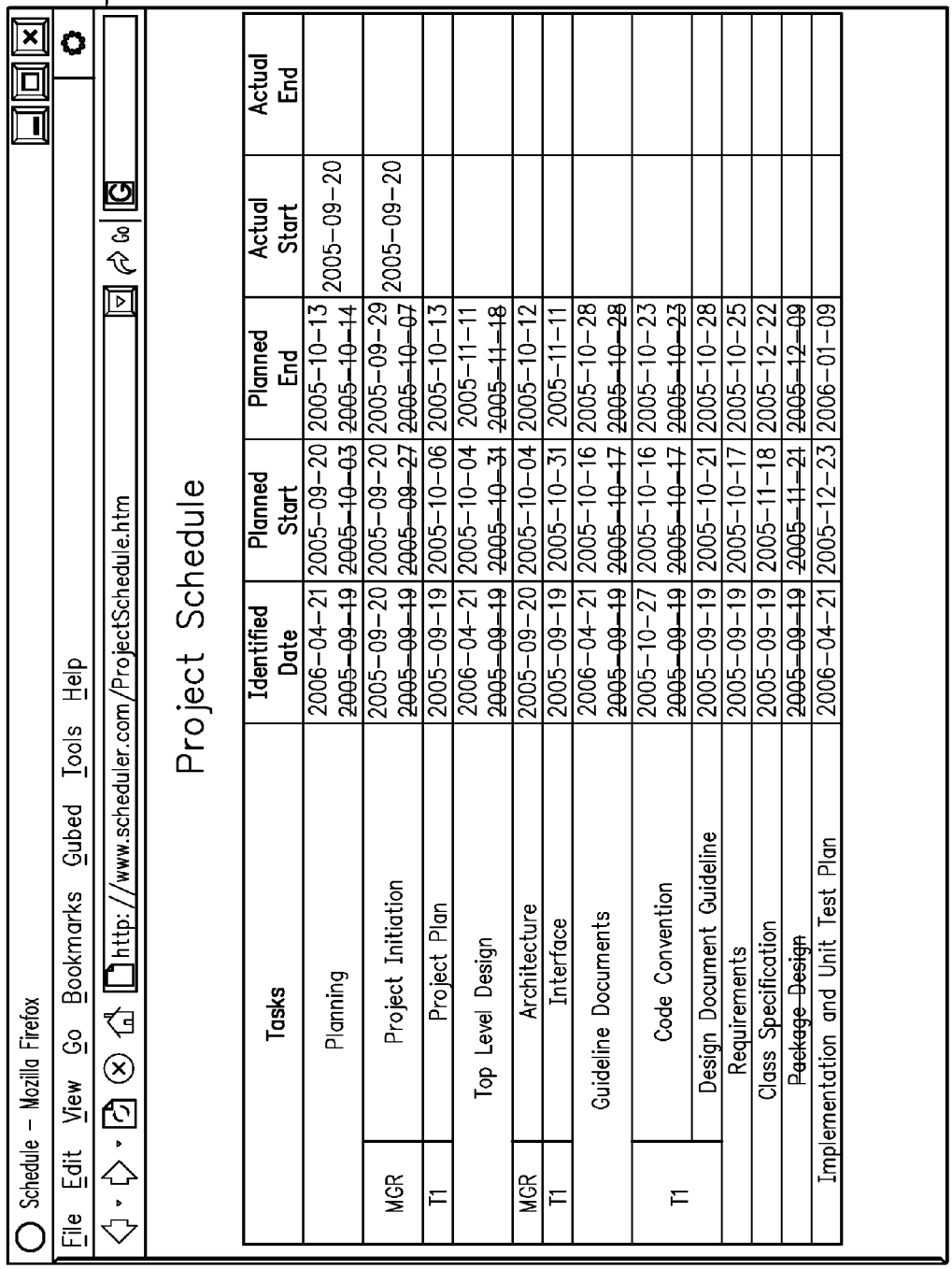
FIG. 2B is a screenshot of a sample of a project schedule Web page.

FIG. 2B is a screenshot of a sample of a project schedule Web page. The project schedule Web page 204 is created for displaying the schedule of the project tasks and its subtasks along with the member to whom a task or subtask is assigned. The project schedule Web page 204 depicts all the previous schedules (e.g., with strikethrough of previous dates) of each project task and subtask so that the project team can see the changes that occur in the schedule of a task. Project schedule information entered and edited via the project schedule editor 202 is displayed in a form in a Web page when displayed in a Web browser. All the project tasks' schedules and the subtasks' schedules are stored within one or more database tables, where each row preferably corresponds to a task, and displayed in the project schedule editor 202 and the project schedule Web page 204.

According to one embodiment, the project schedule editor 202 (FIG. 2A) includes buttons (Add Rows Above, Add Rows Below, Delete, Consolidate, and Finish) which perform various operations. The "Finish" and "Consolidate" buttons complete the project schedule editor session and submit the project task schedule information to be stored and maintained in the database. The "Consolidate" button causes the members' schedules to be consolidated with the project schedule so that the project schedule is updated in the database. The "Consolidate" button causes the project schedule editor to be redisplayed in the project schedule Web page with updated task schedules. The other buttons perform a respective operation on a task that is selected by selecting the checkbox in the row corresponding to the task. The operations can only be performed on project tasks and not the subtasks which are assigned to members. "Add Rows Above" and "Add Rows Below" buttons add rows above and below the row corresponding to the selected project so the manager can add more project tasks and set the schedules for the tasks. The number of rows added is set by the "number of rows" menu selection that is next to the "Add Rows Below" button. The "Delete" button deletes the selected project task.

Member Schedule Editor

Figure 3A:
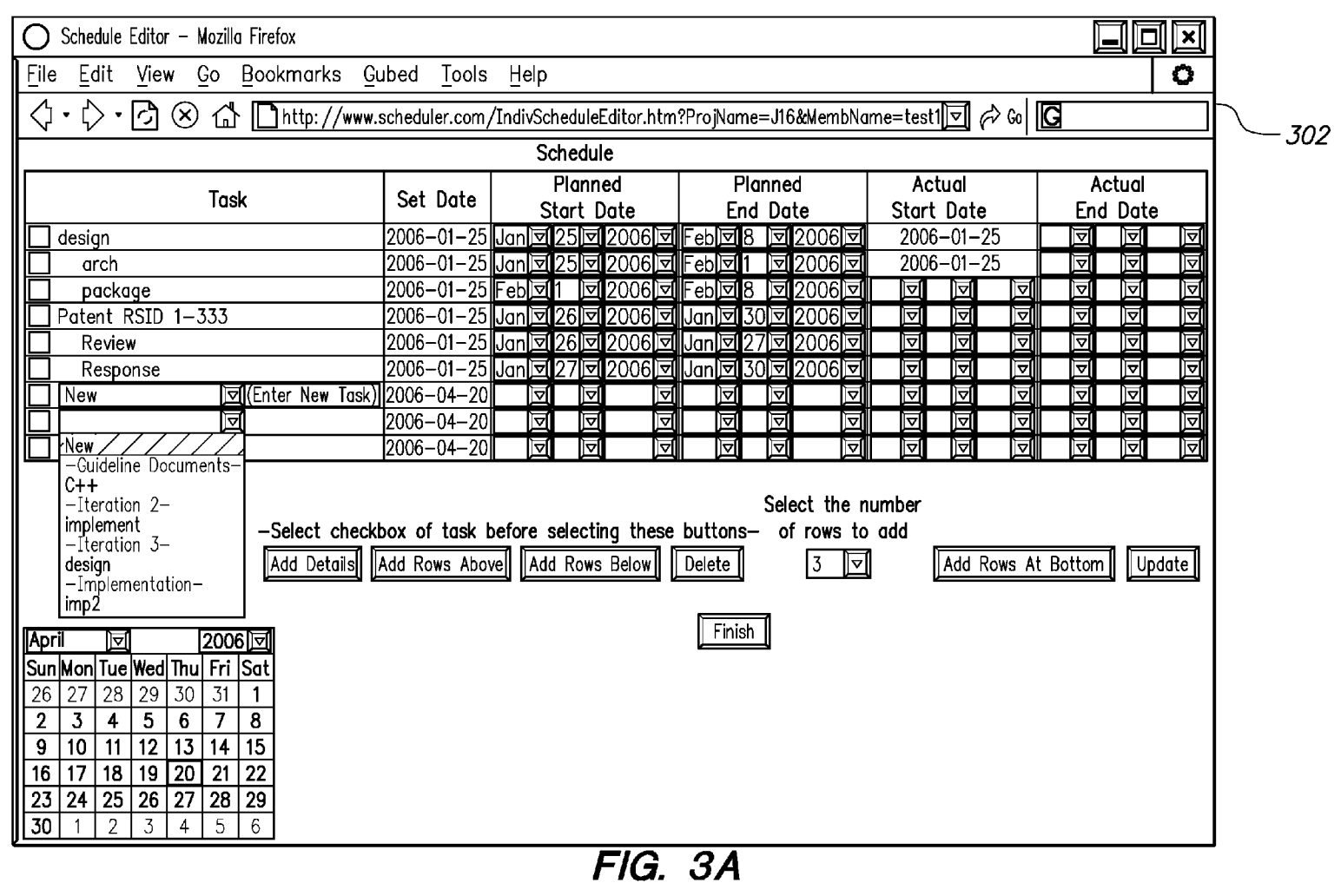

FIG. 3A is a screenshot of a member schedule editor. The member schedule editor 302 (also referred to as "individual schedule editor") is used to create a schedule for an individual project member. According to one embodiment, the member schedule editor 302 displays only uncompleted tasks if the member schedule was previously created. The tasks of a member can be project subtasks and/or tasks unrelated to the project. The member can set the schedule, change the schedule, and update the results for a task via the member schedule editor 302. Each of the tasks of a member can be broken down into lower level tasks to schedule the minute details of the task. The addition or modification of lower level tasks may affect the schedule of the upper level task. Therefore, the upper level tasks schedules are updated when the "Update" button is selected. Information about the scheduling of tasks is stored and maintained in the member schedule editor 302 while the member is adding or modifying task schedules. Upon a member finishing a member schedule editor 302 session, the task schedule information is passed, stored, and maintained in the database. FIG. 3A depicts the assigned tasks in the drop down list.

Figure 3B:
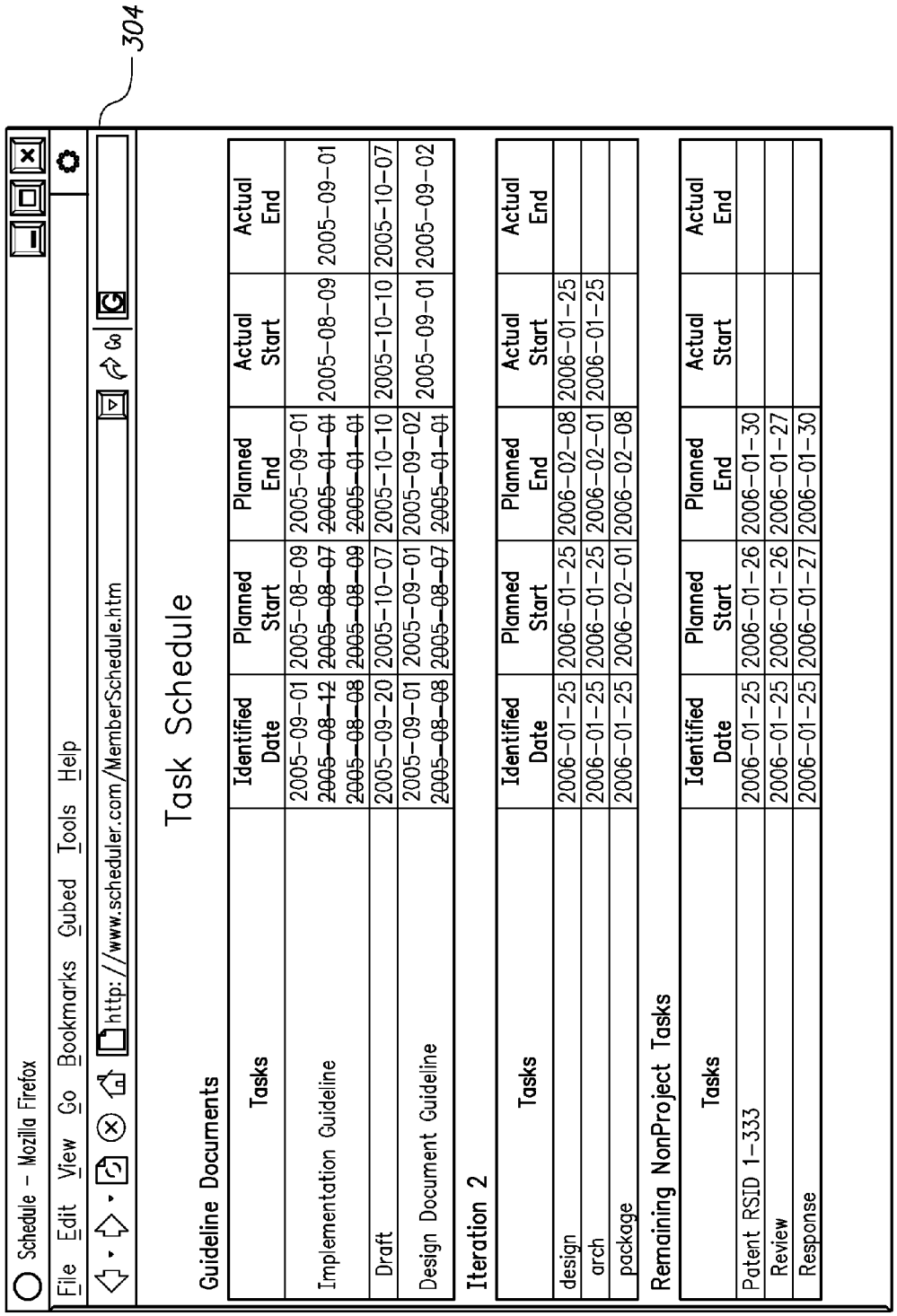
FIG. 3B is a screenshot of a sample of a member's schedule Web page.

In response to completion of a member schedule session, such as in response to a user selecting the "Finish" button on the member schedule editor 302 of FIG. 3A, a member schedule Web page 304 (labeled "Task Schedule" in the screen shot of FIG. 3B) is automatically created, at the Web server, for displaying a table for the member schedule. FIG. 3B is a screenshot of a sample of a member's schedule Web page. Individual schedule information entered and edited via the member schedule editor 302 is displayed in a form in a Web page when displayed in a Web browser. All the tasks' schedules are displayed within a table where each row corresponds to a task. The member schedule Web page 304 depicts the previous schedules (e.g., with strikethrough of previous dates) of each project task and subtask so that the project team can see the changes that occur in the schedule of a task.

In member schedule editor 302, buttons (Add Details, Add Rows At Bottom, Add Rows Above, Add Rows Below, Delete, Update, and Finish) are positioned near the table, which are used to perform various respective operations. The "Finish" button completes the member schedule editor session and submits the task schedule information to be stored and maintained in the database. Except for the "Update" button and the "Add Rows At Bottom" button, the other buttons perform an operation on a task that is selected by selecting the checkbox in the row corresponding to the task. The "Add Details" button adds rows beneath a task so the member can add subtasks (a task one level lower) to a task to give more details of the task. "Add Rows Above" and "Add Rows Below" buttons add rows above and below the row corresponding to the selected task so the member can add more tasks to the schedule at the same level. The number of rows added is set by the "number of rows" menu selection that is next to the "Add Rows Below" button. The "Delete" button deletes the selected task. The "Delete" button also removes a task, and all lower level tasks associated with the task, from the member's schedule. The "Add Rows At Bottom" button adds one or more highest level rows to the bottom of the schedule where the number of rows added is set in the "number of rows" menu selection. The "Update" button updates all the upper level task schedules with the lower level task schedules and updates the display of the member schedule editor 302 to depict the new dates.

The schedule information for a task includes the plan start and end dates and the actual start and end dates. The plan and actual dates can be set and modified for tasks in the member schedule editor 302. However, only the plan dates can be set for the project tasks in the project schedule editor 202 (FIG. 2A) when the task is scheduled for the first time. The plan dates are automatically updated and the actual dates are automatically set based on the information in the members' schedule for the plan and actual dates of the project subtask, when consolidated. Though not shown, the project schedule editor 202 can be modified so that the planned dates can be changed. However, whatever changes are made in the planned dates of the project task will be overridden by the consolidation of the planned dates of the members' schedule of the project subtasks. Information in the database is used to update the actual dates of the project task when the project manager either completes a project editor session or via the "Consolidate" button of the project schedule editor 202.

Figure 4:
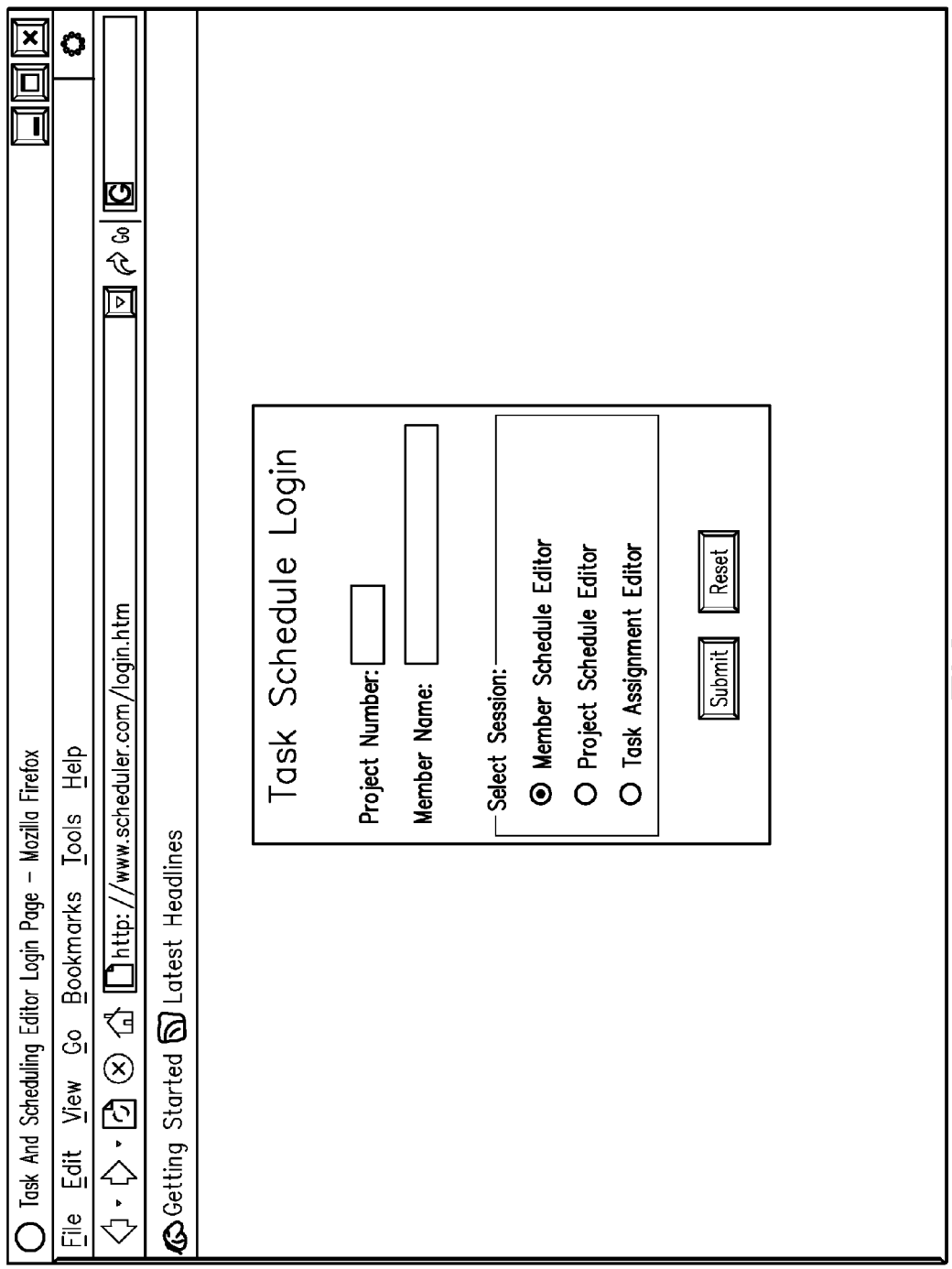
FIG. 4 is a screenshot of a login Web page for a project member to log on to one of the editors (task assignment, project schedule, member schedule).

FIG. 4 is a screenshot of a login Web page for a project member to log on to one of the editors (task assignment, project schedule, member schedule). The member enters the project number, member name, and selects the appropriate editor, and then submits the information to access the editor. The project schedule management system validates the input and determines if the member is a valid member of the project and has an access right for the selected editor. If not, the member will be denied access to the editor. For tighter security, the login Web page and editors can occur over secure HTTP (e.g., HTTPS) and the login page can require a password before logging in.

Project Schedule Management System

Figure 5:
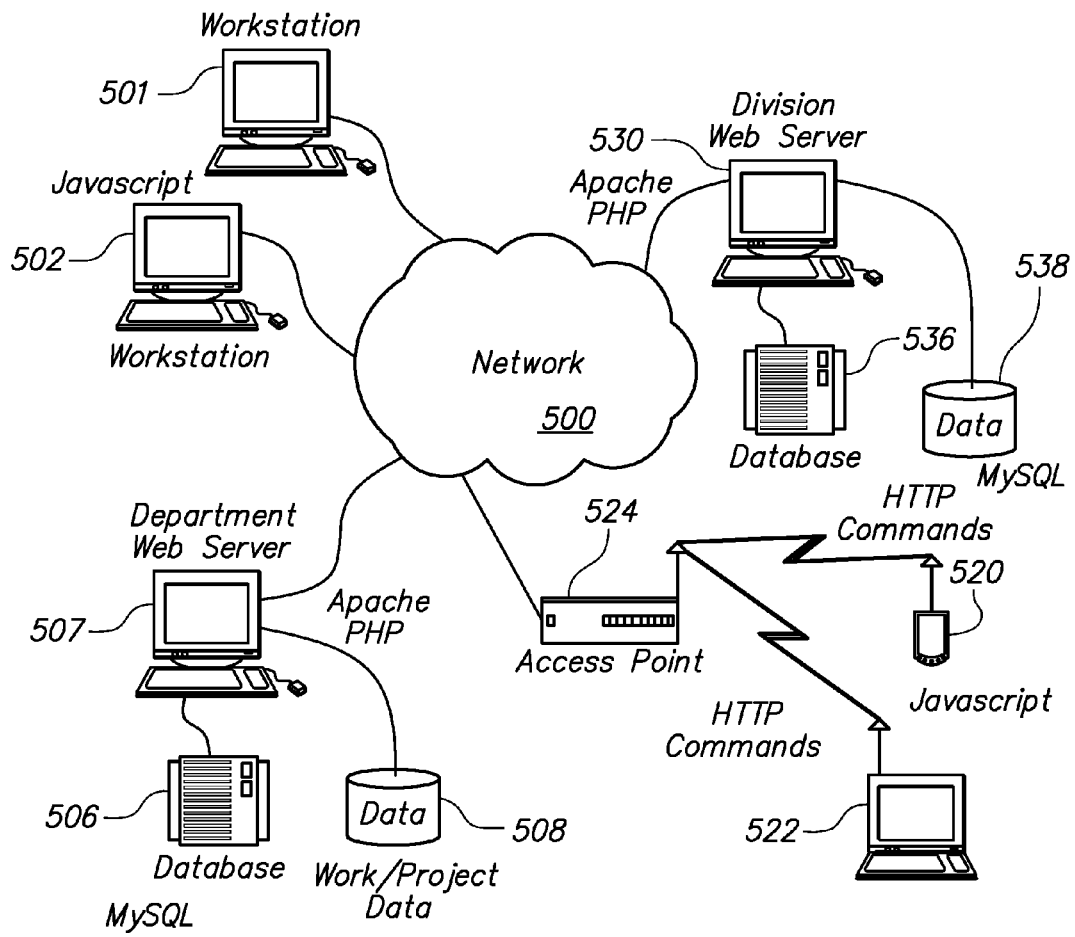
FIG. 5 is a diagram illustrating an operating environment in which an embodiment of the invention may be implemented.

FIG. 5 is a diagram illustrating an operating environment in which an embodiment of the invention may be implemented. The illustrated operating environment is illustrative of an overall system configuration for the project schedule management system described herein. The example operating environment comprises a plurality of workstations, one or more Web servers, and one or more associated databases, which are all connected directly or indirectly to a software development network for communication.

Generally, Web servers 507 and 530 comprise the resources for the display and management of the editors and meeting forms. The Web servers 507, 530 interact with databases 506, 536, respectively, to store, maintain, and manage task assignment, task schedule information, inspection meeting information, e.g., data 508, 538. The depiction of two Web servers and two databases is for purposes of example. Thus, the number of Web servers and databases used in a project management system as described herein may vary from implementation to implementation. Web browsers on computer workstations 501, 502 access the resources on the Web servers 507, 530 to display the editors. Project members or managers can access the editors over the network 500 (LAN or WAN). The project management system can be used to manage projects at different levels within an organization, e.g., at project, department, division, and organization levels.

Figure 15:
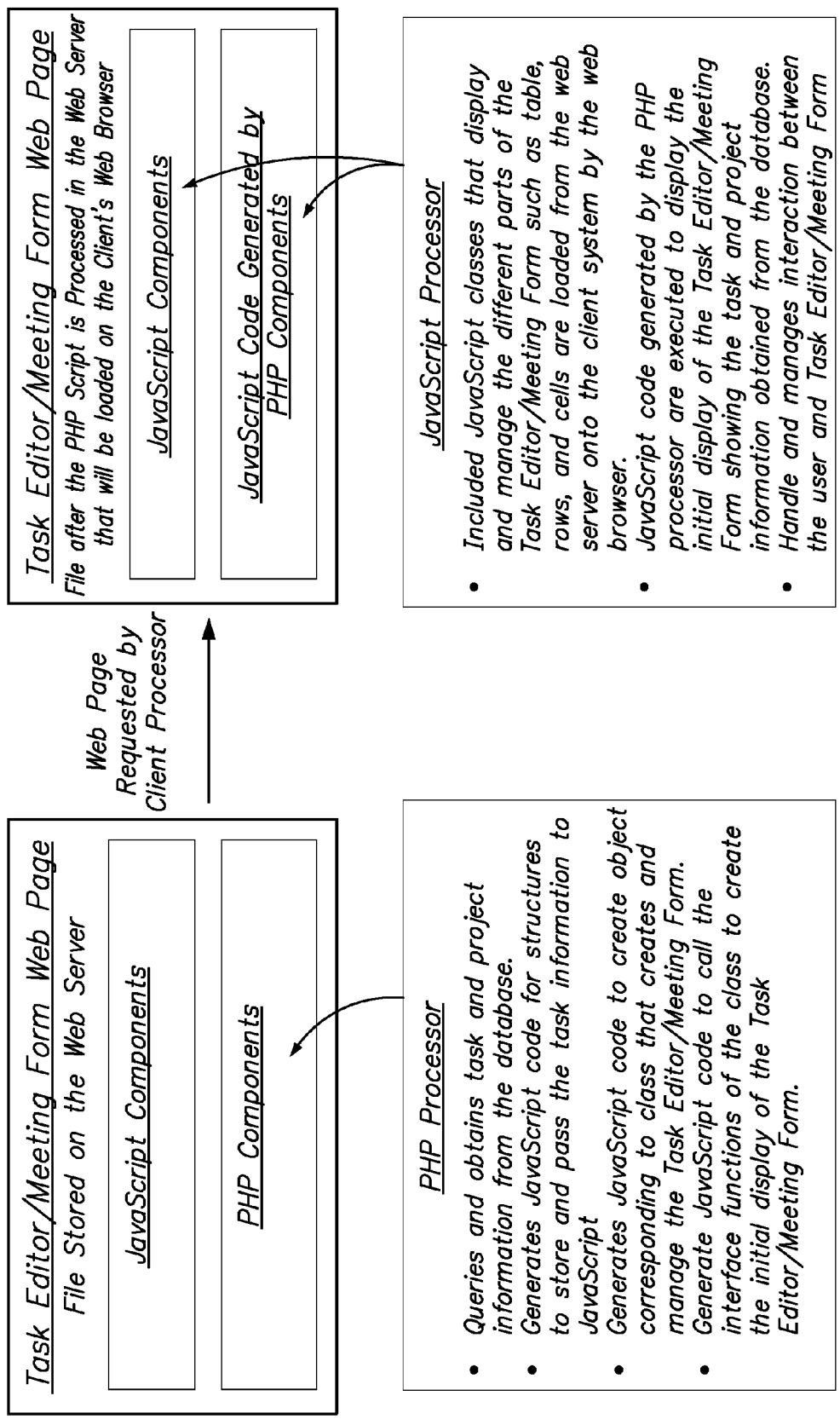
FIG. 15 depicts the components of the Web page for the task editors and meeting forms.

Workstations 501, 502 are typically computer systems configured as illustrated by the computer system 1800 of FIG. 15, with one or more browsers, and are utilized, for example, by the engineers/developers to complete tasks associated with a product development project. Pertinent non-limiting examples of such tasks include initiating projects, preparing and maintaining task schedules, designing software architecture, creating specifications, creating software code, implementing and testing software code, inspecting various task products, etc. In addition, project managers utilize workstations 501, 502 for accessing information to review and manage the progress of the project. The developers and managers transmit communications through the network 500 to the other connected components, e.g., Web servers 507, 530; databases 506, 536; and handheld device 520 and laptop 522, via access point(s) 524. The workstations 501 and 502, handheld devices 520, and laptop 522, which can access the Web pages from the Web servers 507 and 530, can process the JavaScript that the Web page contains to manage the editors in the browser. The browsers can process the JavaScript.

Figure 18:
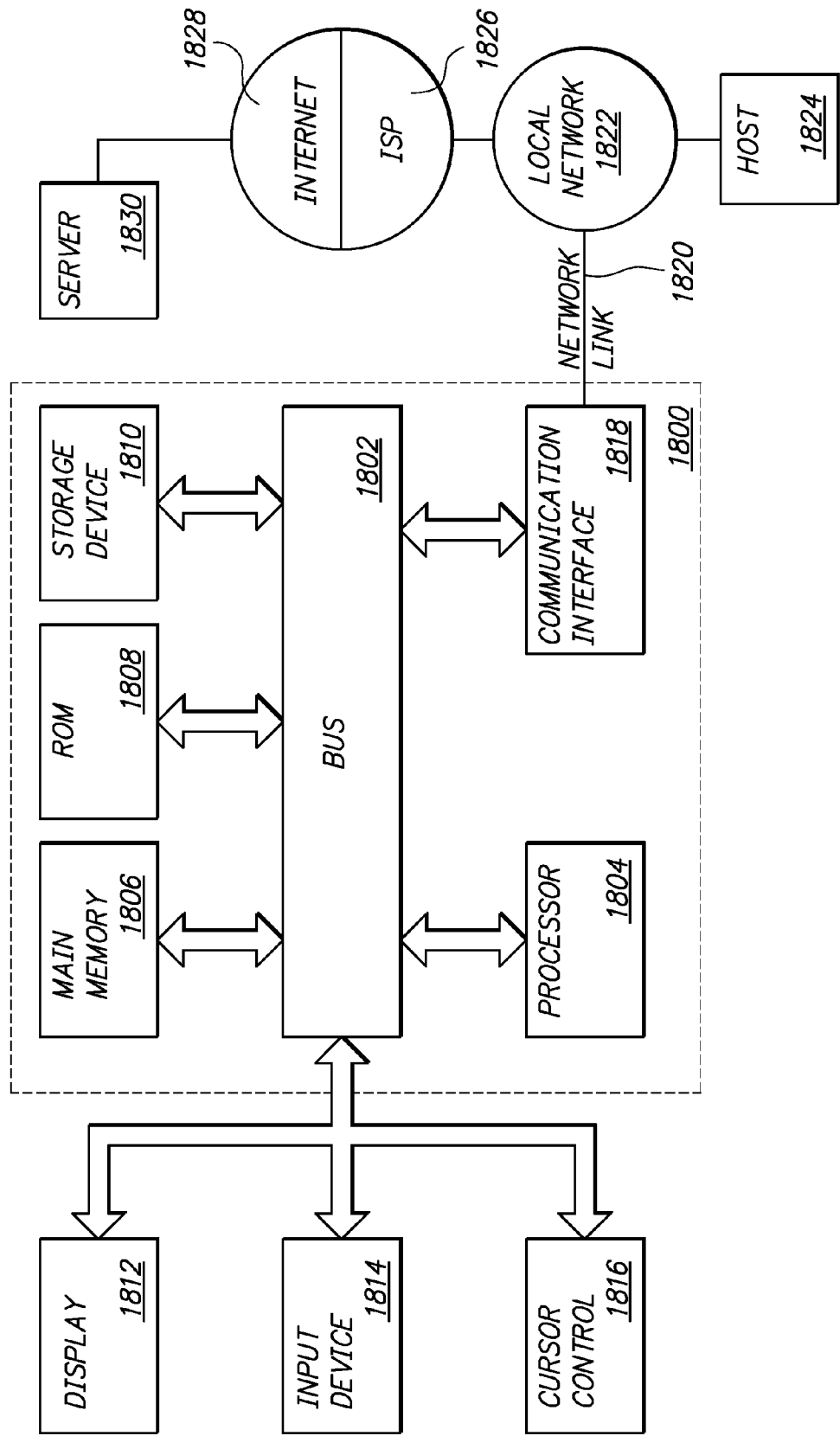
FIG. 18 is a block diagram that depicts a computer system upon which embodiments of the invention can be implemented.

Web servers 507, 530 depict a typical Web server, which is a combination of computer hardware and software that, using the appropriate protocols (e.g., Hypertext Transfer Protocol [HTTP] and Transmission Control Protocol/Internet Protocol [TCP/IP]), serves the files that form Web pages (e.g., Hypertext Markup Language [HTML] or Extensible Markup Language [XML] files), to users, such as developers or managers at a workstation 501, 502. For a non-limiting example, an Apache Web server, which contains modules for the execution of PHP scripts, may be used as the Web server application for the Web server 507 and 530. In general, the majority of information exchanged and managed during the development project life cycle is served by the Web servers 507, 530 over the network 500. Furthermore, aspects of the techniques described herein may be implemented and executed on the Web servers 507, 530, although practice of the invention is not limited to such an implementation. The techniques could also be implemented on any other processing system, such as workstations 501, 502 or a similarly configured computer system as illustrated in FIG. 18.

Databases 506, 536 depict typical databases for storing data 508, 538 related to the development project, thus providing access to the information by authorized individuals at workstations 501, 502, through queries transmitted over the network 500. The type of data stored on databases 506, 536 is effectively limitless, wherein non-limiting examples include project initiation forms, member and project task schedules, specifications, software code, inspection reports, Web page files, and document directories and indexes.

Network 500 depicts a conventional network, e.g., a packet-switched network, for facilitating the exchange of information between and among various connected components, such as workstations 501, 502, Web servers 507, 530, and databases 506, 536. The network 500 may be a Local Area Network (LAN), such as a conventional Ethernet, Fast Ethernet, a token ring, or a wireless LAN such as specified in 802.11a and 802.11b (developed by a working group of the Institute of Electrical and Electronics Engineers [IEEE]), which may be implemented within an enterprise. In addition, network 500 may also be a Wide Area Network (WAN), such as the Internet, for facilitating communication with remote users through a Virtual Private Network (VPN), or the network 500 may represent a combination of a LAN and a WAN. In addition, network 500 can be formed using a variety of different mediums, including but not limited electrical wire or cable, optical, or wireless connections.

Figure 6:
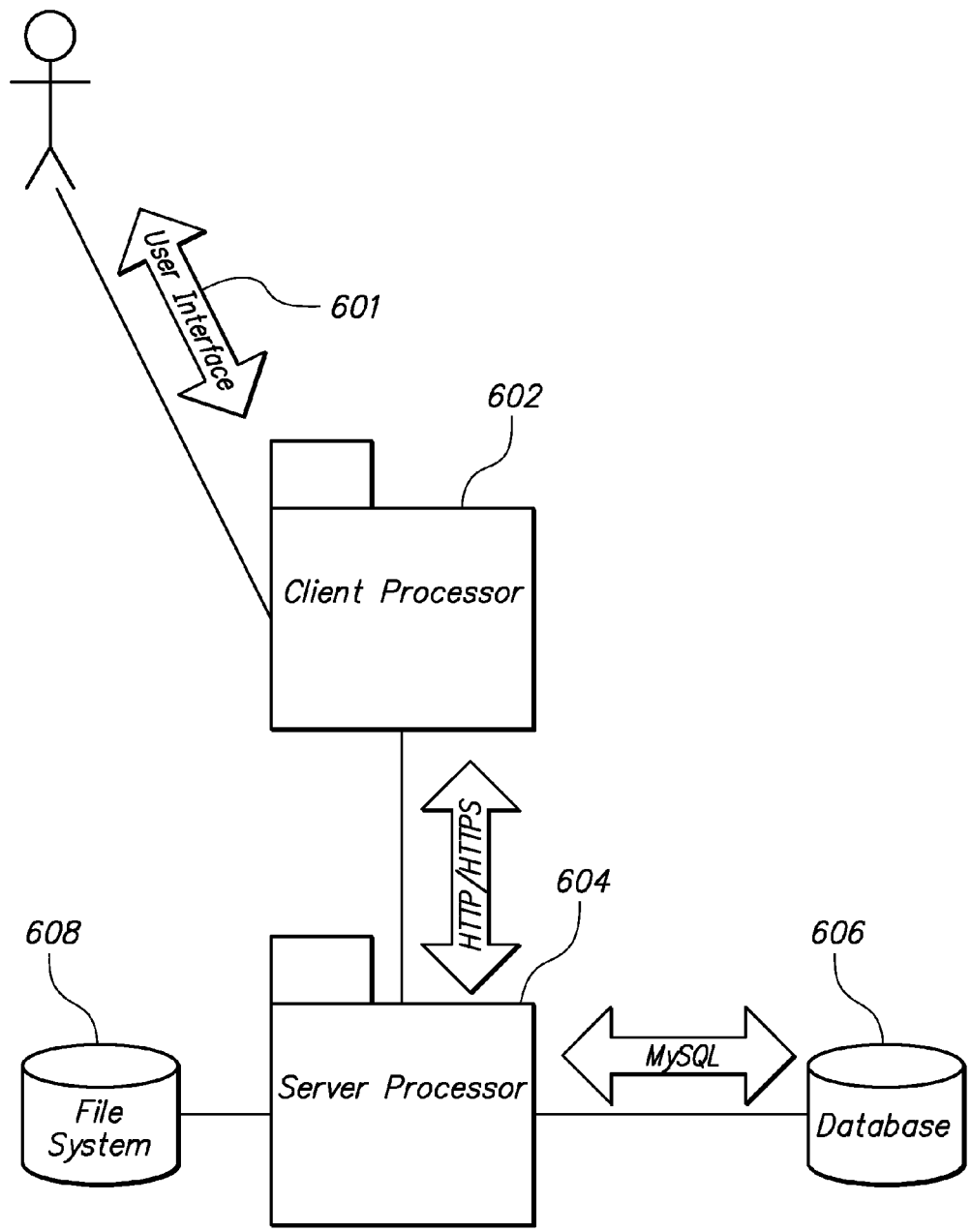
FIG. 6 is a diagram illustrating a communications architecture in which an embodiment of the invention may be implemented, including software components of an automated scheduling and meeting system.

FIG. 6 is a diagram illustrating a communications architecture in which an embodiment of the invention may be implemented, including software components of an automated scheduling system or automated inspection meeting system. The client processor 602 corresponds to a Web browser and the server processor 604 corresponds to a Web server, such as Web servers 507 and 530 (FIG. 5). A project member or manager interacts with the client processor 602 through a user interface 601. The client processor 602 manages and maintains the login Web pages (FIG. 4, 28) and the various editor or meeting form Web pages (FIGS. 1A, 2A, 3A, 29). The client processor 602 handles all events that occur in these Web pages. According to one embodiment, the client processor 602 interacts with the server processor 604 through the HTTP protocol. According to one embodiment, the client processor 602 interacts with the server processor 604 through the secure HTTPS protocol.

The server processor 604 provides information to the client processor 602 to display the login Web pages (FIG. 4, 28) and editor or meeting form Web pages (FIGS. 1A, 2A, 3A, 29). The server processor 604 also processes the information in the login and editor or meeting form Web pages when the client processor 602 submits the information in these pages. The database 606 is a repository of project and task scheduling and inspection information. The server processor 604 interacts with the database 606 to obtain, add, or update information in the databases. According to one implementation, the server processor 604 interacts with the database 606. However, other databases and protocols can be used. For example, the server processor 604 may interact with a file system 608 to store and retrieve various Web pages, such as a member schedule Web page or an inspection meeting document.

Client-Server Interfaces

Figure 7:
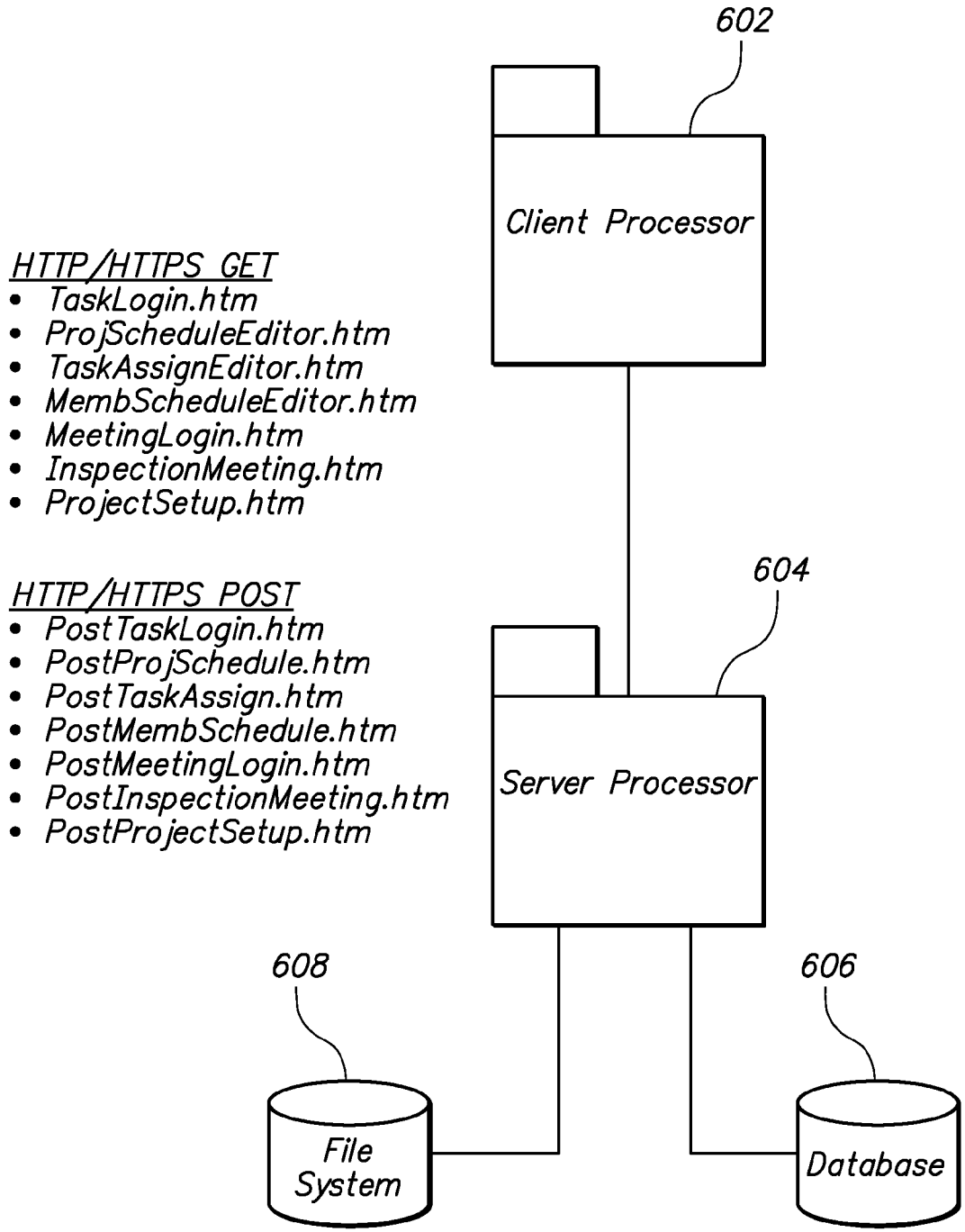
FIG. 7 is a diagram illustrating interfaces between the client processor and the server processor of the system.

FIG. 7 is a diagram illustrating interfaces between the client processor and the server processor of the system. The HTTP/HTTPS GET requests provide for the client processor 602 obtaining the home, task login (FIG. 4), project schedule editor (FIG. 2A), member schedule editor (FIG. 3A), task assignment editor (FIG. 1A), meeting login (FIG. 28), and inspection meeting form (FIG. 29) Web pages from the server processor 604. The HTTP/HTTPS POST requests provide for the client processor 602 submitting information entered in the login (FIG. 4, 28) and editor and meeting form Web pages (FIGS. 1A, 2A, 3A, 29) to the server processor 604 for processing. The applicable HTTP/HTTPS GET and HTTP/HTTPS POST requests are described in greater detail hereafter.

HTTP/HTTPS GET TaskLogin.htm requests cause the server processor 604 to return to the client processor 602 a Web page that allows a project member or manager to log on to one of the editors (project schedule, member schedule, task assignment). The member or manager enters information about the project, member name, and editor session type. FIG. 4 depicts a Web page for logging into to one of the editors.

HTTP/HTTPS GET ProjScheduleEditor.htm requests cause the server processor 604 to return to the client processor 602 a Web page for the project schedule editor, which is used to create or update the project schedule for the current project. A project manager must have access privileges to create the project schedule before the server processor 604 returns the project schedule editor. This privilege is verified when the manager submits the information in the login Web page (FIG. 4). According to one embodiment, ProjScheduleEditor.htm includes Javascripts to display, manage, and handle events in the project schedule editor Web page. According to one embodiment, ProjScheduleEditor.htm includes PHP scripts to obtain information from the databases 506, 536 and pass the information to the Javascripts so the information is displayed in the project schedule editor, an example of which is depicted in FIG. 2A.

HTTP/HTTPS GET TaskAssignEditor.htm requests cause the server processor 604 to return to the client processor 602 a Web page for the task assignment editor, which is used to assign tasks to the project members for the current project. A project manager requires access privileges to assign tasks to the project members before the server processor 604 returns the task assignment editor Web page. This privilege is verified when the manager submits the information in the login Web page (FIG. 4). According to one embodiment, TaskAssignEditor.htm includes Javascripts to display, manage, and handle events in the task assignment editor. According to one embodiment, TaskAssignEditor.htm includes PHP scripts to obtain information from the databases 506, 536 and pass the information to the Javascripts so the information is displayed in the task assignment editor, an example of which is depicted in FIG. 1A.

HTTP/HTTPS GET MembScheduleEditor.htm requests cause the server processor 604 to return to the client processor 602 a Web page for the member schedule editor, which is used to create or update a project member's schedule for the current project. According to one embodiment, the schedule editor displays only uncompleted tasks if the project member's schedule has been previously created. A project member must have privileges to create or edit the schedule before the server processor 604 returns this Web page. This privilege is verified when the member submits the information in the login Web page (FIG. 4). According to one embodiment, MembScheduleEditor.htm includes Javascripts to display, manage, and handle events in the project member's schedule editor. According to one embodiment, MembScheduleEditor.htm includes PHP scripts to obtain information from the databases 506, 536 and pass the information to the Javascripts so the information is displayed in the member schedule editor, an example of which is depicted in FIG. 3A.

Figure 28:
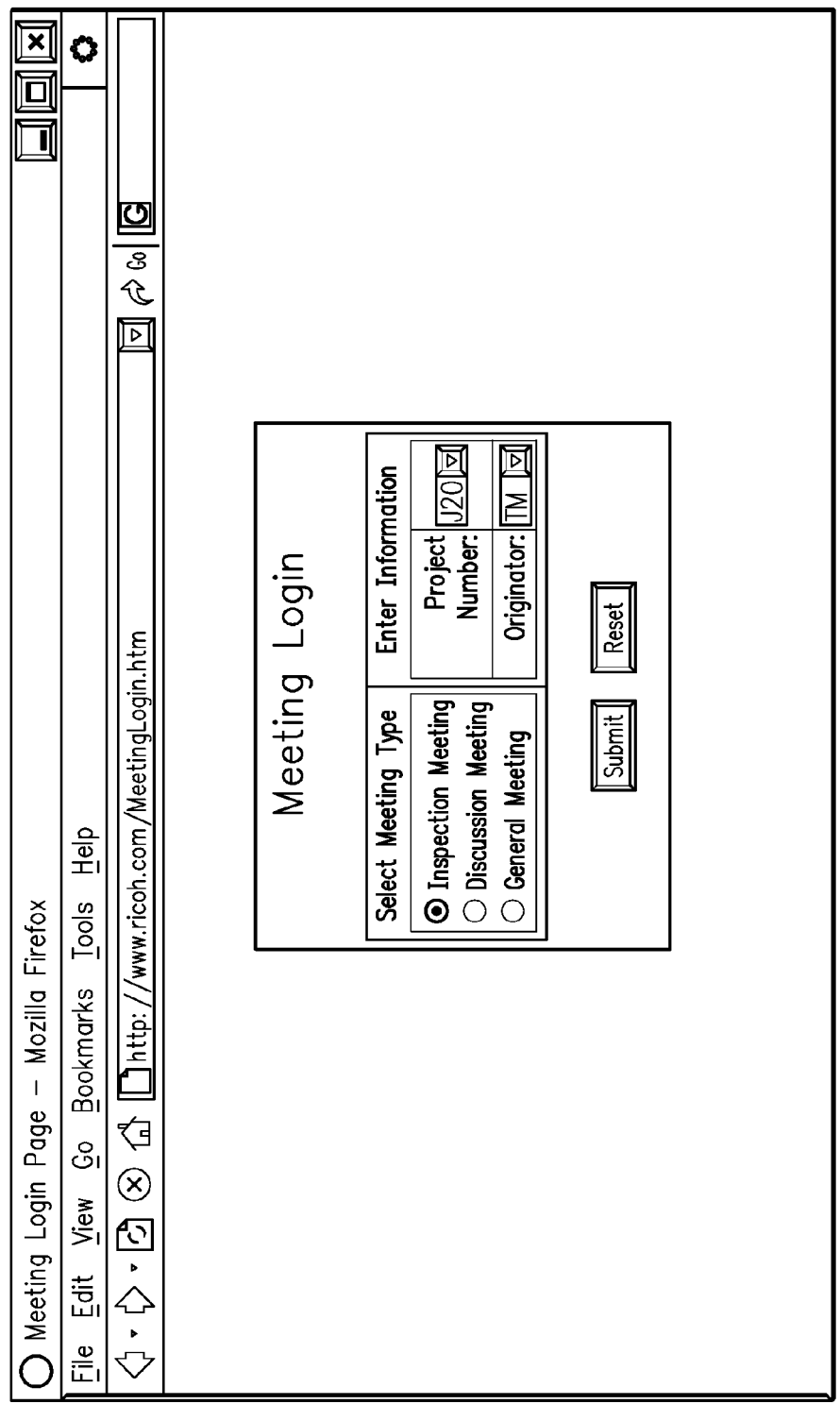
FIG. 28 depicts an example meeting login web page that allows a project member to log on to one of the meeting forms (inspection, discussion, general).

HTTP/HTTPS GET MeetingLogin.htm requests cause the server processor 604 to return to the client processor 602 a Web page for logging into a meeting, for example, an inspection meeting, a discussion meeting or a general meeting. The user enters information about the project, member name, and meeting type. FIG. 28 depicts an example Web page for logging into a meeting.

Figure 29:
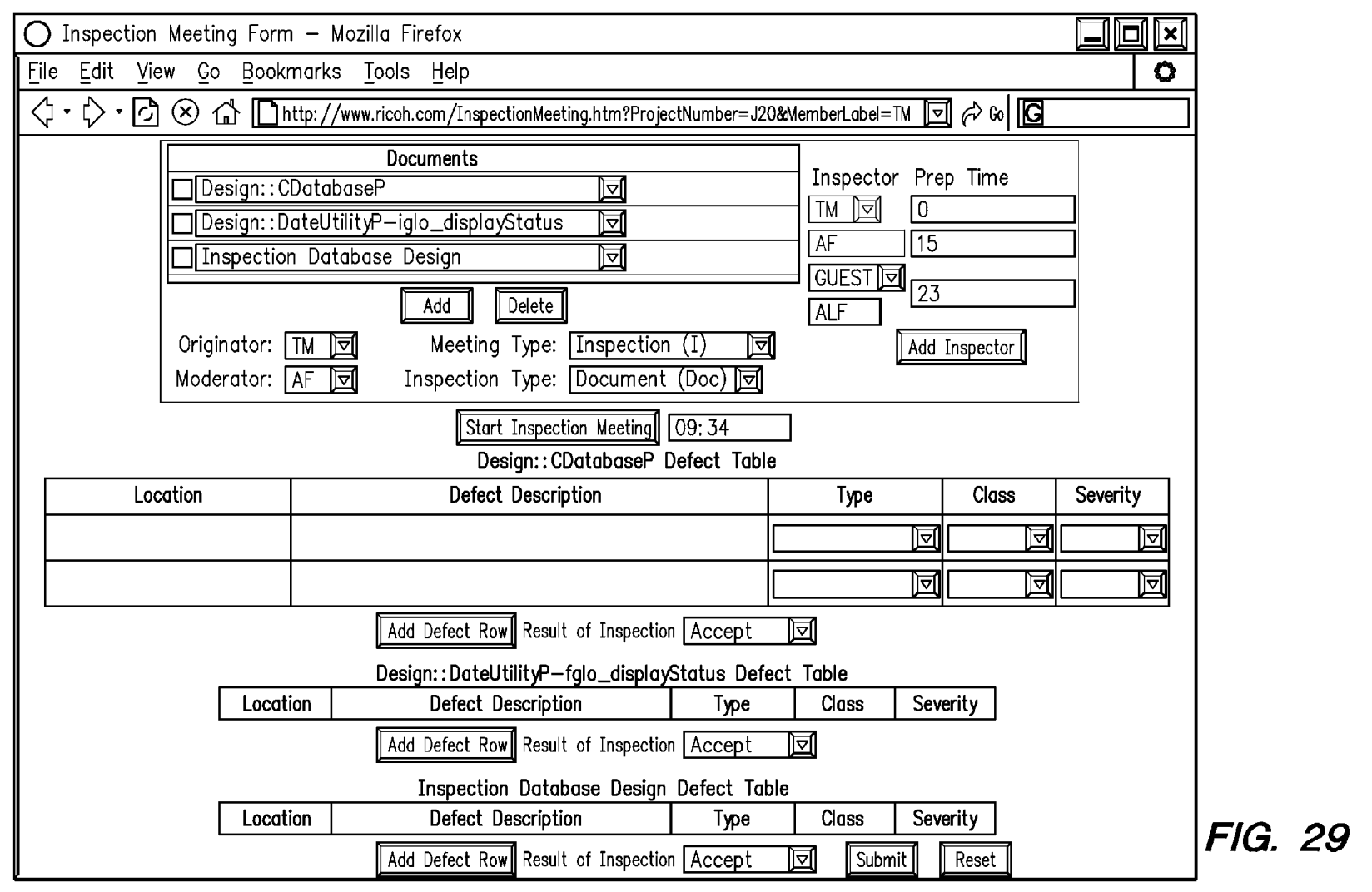

HTTP/HTTPS GET InspectionMeeting.htm requests cause the server processor 604 to return to the client processor 602 a Web page for entering information pertaining to an inspection meeting. FIG. 29 depicts an example Web page for entering information pertaining to an inspection meeting.

HTTP/HTTPS GET ProjectSetup.htm requests cause the server processor 604 to return to the client processor 602 a Web page for entering information pertaining to a project. The Web page allows a user to enter the information to start a new project. FIG. 39 depicts an example Web page for entering information pertaining to set up a new project.

HTTP/HTTPS POST PostTaskLogin.htm interface allow the client processor 602 to access and display the various editors (project schedule, member schedule, task assignment). This interface is called when the "Submit" button is selected from the Web page corresponding to TaskLogin.htm. The information entered in TaskLogin.htm is passed to PostTaskLogin.htm in the server processor 604. The PostTaskLogin.htm uses the information to validate the member for the project, and to determine if the member has access privileges to the requested editor. If the information is invalid or the member does not have access privilege to the editor, then PostTaskLogin.htm returns a message to the client processor 602 that the project member cannot access the requested editor. Otherwise, PostTaskLogin.htm returns the Web page corresponding to one of the editors, i.e., the Web browser is redirected to the Web page corresponding to the requested editor.

HTTP/HTTPS POST PostTaskAssign.htm allows the client processor 602 to submit to the server processor 604 all the information entered in the task assignment editor (FIG. 1A). This interface is called when the "Finish" button is selected from the Web page corresponding to TaskAssignEditor.htm. The information entered in the editor of TaskAssignEditor.htm is passed to PostTaskAssign.htm in the server processor 604. PostTaskAssign.htm adds and updates task assignment information in the appropriate database 506, 536. An appropriate message is displayed if any of the information entered is invalid or if the process fails to access or query the appropriate database. PostTaskAssign.htm also creates the task assignment Web page, an example of which is depicted in FIG. 1B.

HTTP/HTTPS POST PostProjSchedule.htm allows the client processor 602 to submit to the server processor 604 all the information entered in the project schedule editor (FIG. 2A). This interface is called when the "Finish" button is selected from the Web page corresponding to ProjScheduleEditor.htm. The information entered in the editor of ProjScheduleEditor.htm is passed to PostProjSchedule.htm in the server processor 604. PostProjSchedule.htm adds and updates task schedule information in the appropriate database 506, 536. An appropriate message is displayed if any of the information entered is invalid or if the process fails to access or query the appropriate database. PostProjSchedule.htm also creates the project schedule Web page, an example of which is depicted in FIG. 2B.

HTTP/HTTPS POST PostMembSchedule.htm allows the client processor 602 to submit to the server processor 604 all the information entered in the project member's schedule editor (FIG. 3A). This interface is called when the "Finish" button is selected from the Web page corresponding to MembScheduleEditor.htm. The information entered in the editor of MembScheduleEditor.htm is passed to PostMembSchedule.htm in the server processor 604. PostMembSchedule.htm adds and updates task schedule information in the appropriate database 506, 536. An appropriate message is displayed if any of the information entered is invalid or if the process fails to access or query the database. PostMembSchedule.htm also creates the member's schedule Web page, an example of which is depicted in FIG. 3B.

HTTP/HTTPS POST PostMeetingLogin.htm allows the client processor 602 to submit to the server processor 604 all the information entered in the Meeting Login Webpage (FIG. 28). This information includes, for example, the type of meeting requested, such as an inspection meeting, a discussion meeting or a general meeting, a well as a project number and initials of an originator. This interface is called when the "Submit" button is selected from the Web page corresponding to MeetingLogin.htm. The information entered in MeetingLogin.htm is passed to PostMeetingLogin.htm in the server processor 604. PostMeetingLogin.htm returns the Web page corresponding to one of the meeting forms, i.e., the Web browser is redirected to the Web page corresponding to the requested meeting form.

HTTP/HTTPS POST PostInspectionMeeting.htm allows the client processor 602 to submit to the server processor 604 all the information entered in the Inspection Meeting Form (FIG. 29). This information includes, for example, the documents selected for inspection and the details of the inspection, such as the inspector, originator, moderator, etc., the results of the inspection and details about defects identified during the inspection. This interface is called when the "Submit" button is selected from the Web page corresponding to InspectionMeeting.htm. PostInspectionMeeting.htm adds and updates inspection information in the appropriate database 506, 536. An appropriate message is displayed if any of the information entered is invalid or if the process fails to access or query the appropriate database. PostInspectionMeeting.htm also creates the inspection Web page, examples of which are depicted in FIGS. 30, 31, 32.

HTTP/HTTPS POST PostProjectSetup.htm allows the client processor 602 to submit to the server processor 604 all the information entered in the New Project Setup Form (FIG. 39). This information includes, for example, a name, location and title/description of a new project, as well as member information for the new project. The member information may include, for each member, the name, label, directory location, email address and role. This interface is called when the "Submit" button is selected from the Web page corresponding to ProjectSetup.htm. PostProjectSetup.htm adds and updates project information in the appropriate database 506, 536. PostProjectSetup.htm also sets up the web server for the new project.

The Web pages for the various editors (TaskAssignEditor.htm, ProjScheduleEditor.htm, MembScheduleEditor.htm and InspectionMeeting.htm) include files that contain Javascript or PHP script, according to one non-limiting embodiment. The scripting languages used to perform the various functions described herein may vary from implementation to implementation. When a Web browser (e.g., client processor 602) requests the Web page of an editor or meeting form, the editor or meeting form Web page and all the files corresponding to Javascript are passed to the Web browser, whereby the Web browser processes the Javascript. However, the files for the PHP script are not passed to the Web browser. The PHP script are processed in the Web server, such as Web servers 507, 530 of FIG. 5, where only what the PHP script writes onto the Web page is passed to the Web browser.

Sequence Diagrams for Editors

Figure 8:
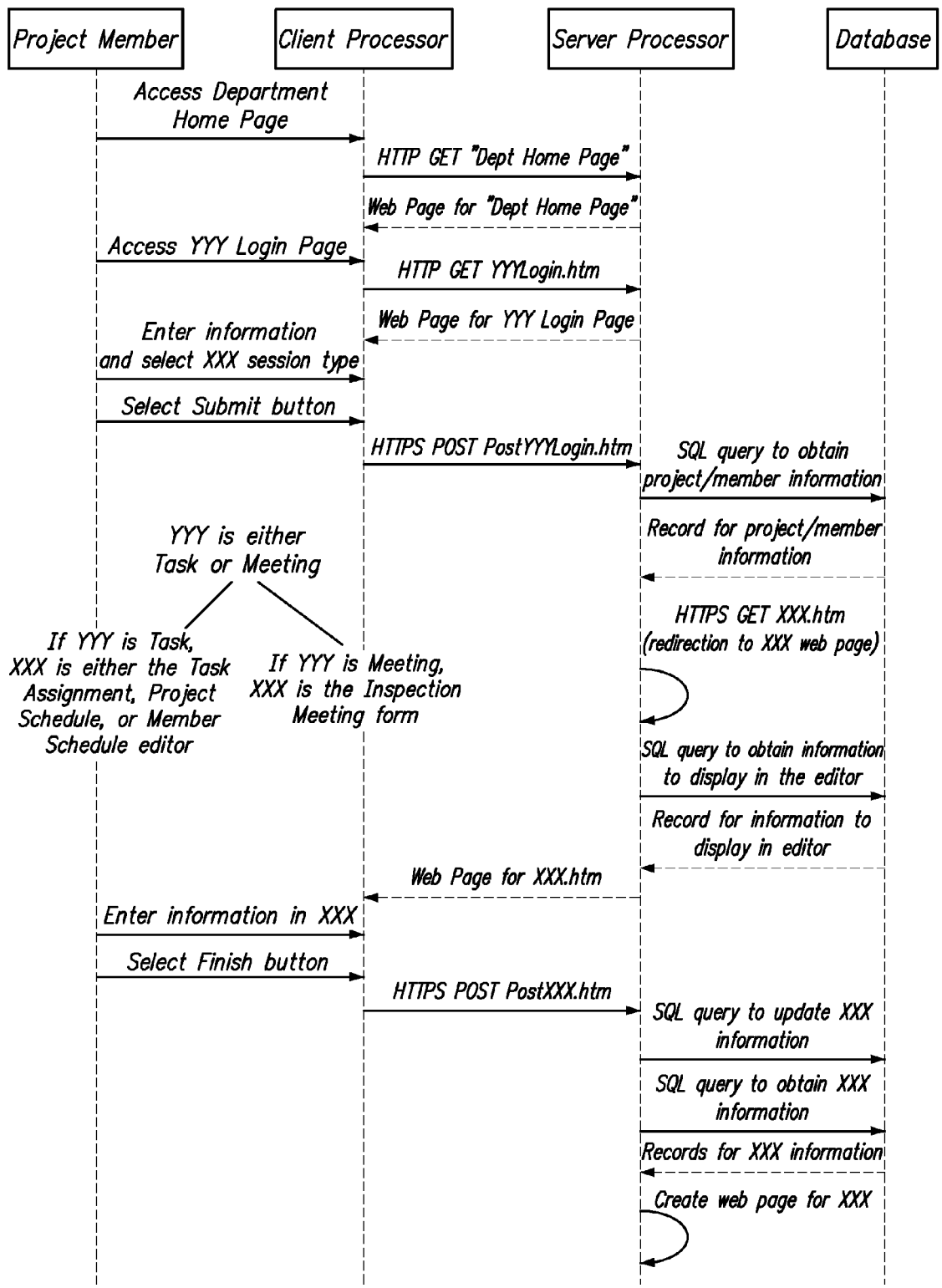
FIG. 8 depicts a sequence diagram for a project member or manager to use the login Web page to log onto one of the task editors or one of the meeting forms (inspection and other forms).

FIG. 8 depicts a sequence diagram for a project member or manager to use the login Web page to log onto one of the task editors or one of the meeting forms (inspection and other forms). FIG. 8 also depicts the sequences involved in displaying the Web page for the task editor or meeting form, interacting with the task editor or meeting form by a user and completing the session, posting the information in the task editor or meeting form into the database and generating the appropriate web pages for the task editor or meeting form. Processing occurs within the client processor 602 to handle all the events that occur on the login, editor, and meeting form Web pages (FIG. 1A, 2A, 3A, 4, 28, 29). Processing occurs within the server processor 604 to validate the information entered in the login Web pages and to verify the access privilege to the editor or meeting form Web pages. The server processor 604 obtains information from the appropriate database 506 or 536 for the verification of access privileges. The server processor 604 obtains information from the appropriate database 506 or 536 that will be used in the task editor or meeting form. The server processor 604 also obtains the information entered in the task editor or meeting form by the project member or manager when the task editor or meeting form is submitted, adds or updates the information in the appropriate database 506 or 536, and generates the appropriate web pages.

Database Schema

Figure 9:
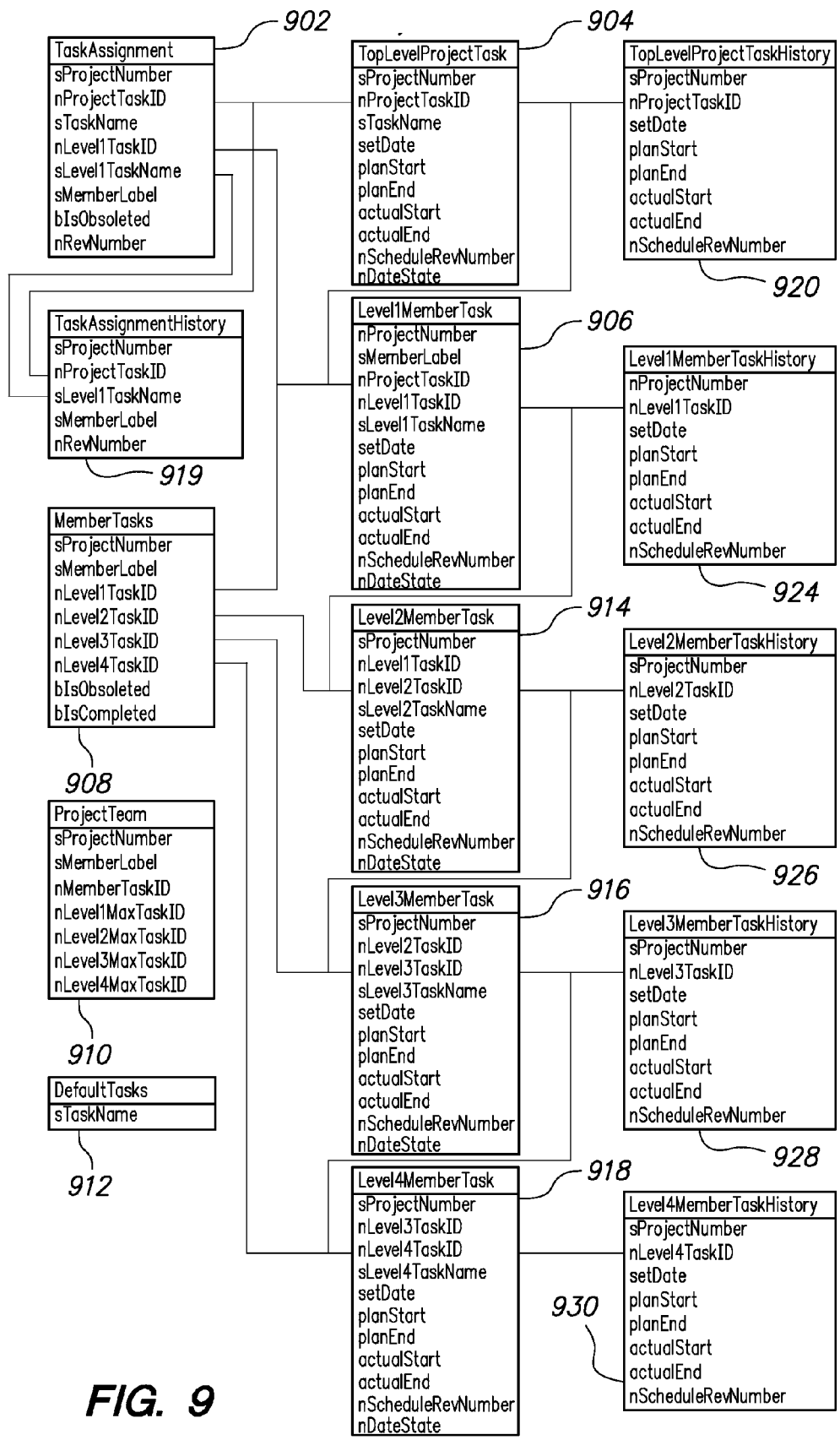
FIG. 9 depicts a schema of database tables used to store and manage task assignment and task schedule information for projects and project members.

FIG. 9 depicts a schema of database tables used to store and manage task assignment and task schedule information for projects and project members. The tables maintain information about the task assignments, the schedule for the project tasks, and the schedules for each project member. The tables are organized and linked such that the task assignments, project schedule, and members' schedule are all related.

The TaskAssignment table 902 stores the project tasks and corresponding subtasks of a project along with the assignment of the subtasks to project members. The TaskAssignmentHistory table 919 stores the history of the assignment of the subtasks to project members. The TopLevelProjectTask table 904 stores the schedule of the project tasks that are in the TaskAssignment table 902. The TopLevelProjectTaskHistory table 920 stores the history of the schedule of the project tasks. The Level1MemberTask table 906 stores the schedule of the member tasks which are assigned in the TaskAssignment table 902 and links to the schedule of its corresponding project task in the TopLevelProjectTask table 904. These links between the tables enable the automatic aggregation of the member schedules with the project schedule. The Level1MemberTask table 906 also stores the schedule of the member tasks that are not related to any project task. The Level1MemberTaskHistory table 924 stores the history of the schedule of the member tasks. The LevelXMemberTask tables (where X is 1, 2, 3, and 4) and the MemberTasks table 908 store and manage links between the various levels of tasks of a member. The lower level tasks are more detailed tasks of the upper level tasks. The organization of these tables maintains the schedule of a member. The LevelXMemberTaskHistory table (926, 928, 930) store the history of the schedule of the lower level tasks. The ProjectTeam table 910 contains information about the project members. The project member information for a project member includes the IDs used for determining the identifier of the member tasks at various levels.

The task assignment editor uses and/or updates information in the tables DefaultTasks 912, TaskAssignment 902, TaskAssignmentHistory 919, TopLevelProjectTask 904, and MemberTasks 908. The project schedule editor uses and/or updates information in the tables DefaultTasks 912, TaskAssignment 902, TopLevelProjectTask 904, TopLevelProjectTaskHistory 920, MemberTasks 908, and Level1MemberTask 906. The member schedule editor uses and/or updates information in the tables ProjectTeam 910, TaskAssignment 902, TopLevelProjectTask 904, MemberTasks 908, LevelXMemberTask, and LevelXMemberTaskHistory. The inspection meeting form uses and/or updates information in the tables ProjectTeam 910, MemberTasks 908, LevelXMemberTask, and LevelXMemberTaskHistory.

Descriptions of the various tables depicted in FIG. 9, and used in an embodiment of the project management system described herein, are as follows. However, the number and structure of the tables described in reference to FIG. 9 may vary from implementation to implementation.

DefaultTasks table 912 contains the names of tasks that are typically tasks for all projects. In the context of software development projects, some examples of default tasks are Project Plans, Requirements, and Top Level Design.

ProjectTeam table 910 contains information about project members for a project. sMemberLabel is a 2 to 4 character string used to identify a project member when displaying the project schedule, which depicts the project tasks and associated member tasks as depicted in FIGS. 1A and 1B. In one embodiment, the initials of the project member are used for sMemberLabel.

nMemberTaskID is a number assigned to a project member that is used to determine the ID of a task for that member. According to one embodiment, the nMemberTaskIDs are used as the start ID for a task. Depending upon the size of the project team, the ID can be MOD 10 (1, 2, . . . , 9) for a small team or MOD 100 (1, 2, . . . , 99) or higher for a large team. The task IDs are increments of the MOD. For example, if the nMemberTaskID of project member 'T1' is 1, then the task IDs of T1's task will be 11, 21, 31, and so forth (or 101, 201, 301, and so forth for a large team). The task ID uniquely identifies a task for a project member even if the names of some of the tasks are the same. The task ID also uniquely identifies a task at all levels. nLevelXMaxTaskID is a number used to maintain the highest task IDs that have been used so far for the different level tasks of a project member. These numbers provide the starting IDs used to determine the task IDs of tasks that are added in the member's schedule editor session. These values are retrieved and updated after each editor session. Except for the values for nLevelXMaxTaskID, the values for the other entries must be set prior to the beginning of a project.

TaskAssignment table 902 contains information about the project tasks and its subtasks that are assigned to project members for a project. sTaskName is used for the names of the tasks and nProjectTaskID are the IDs associated with the tasks. The project start task ID is 0 so that the ID for its tasks will be increments of the MOD (10, 20, 30, . . . for small team). sLevel1TaskName is used for the names of the subtasks (member tasks) associated with the project tasks and nLevel1TaskID is used for the IDs associated with the subtasks. sMemberLabel is used to identify the project members that are assigned the subtasks. bIsObsoleted is used to indicate whether the task has been removed from the project. Even though a task is deleted from the schedule, information about the task is maintained in the database. Values for sTaskName, nProjectTaskID, sLevel1TaskName, and sMemberLabel can be added to the TaskAssignment table 902 through a task assignment editor session. The project schedule editor session can add values for sTaskName and nProjectTaskID. Only the member schedule editor session can add values for nLevel1TaskID. nRevNumber is the revision number of the current assignment of the task. If no members are assigned to the task, nRevNumber is 0.

TopLevelProjectTask table 904 contains information about the most current scheduling of project tasks. sTaskName is used for the names of the tasks and nProjectTaskID is used for the IDs associated with the tasks. planStart and planEnd are used for the expected dates for starting and completing the task. actualStart and actualEnd are used for the actual dates in which the task was started and completed. setDate is used for the date in which the task was added, planned dates were set, or planned dates were modified. If no planned dates are set for the task, then the revision number is 0. nScheduleRevNumber is used for the revision number of the task schedule. The most current revision number of a project task is maintained in the TopLevelProjectTask table 904. The revision is incremented only when the planned dates are changed in the project schedule editor on different days. All values for nProjectTaskID, sTaskName, dates, and nScheduleRevNumber are added or updated in the TopLevelProjectTask table 904 through a project schedule editor session or a task assignment editor session. nDateState indicates the current state of a task. A variety of values may be used to represent the state of a task, depending upon a particular implementation. One set of example values for nDateState are as follows:

4 indicates that the task was completed. All the dates have been set.

3 indicates that the task was started. All the dates except the actualEnd have been set.

2 indicates that the task was planned. Only the planStart and planEnd have been set.

1 indicates that the task was planned start-only. Only the planStart has been set.

0 indicates that the task was not scheduled. This task is a to-do list task. This task was added to the member schedule but not actually scheduled. The setDate is set to the date that the task was added to the schedule. When the member logs back into the member schedule editor or views his/her member schedule web page, the task is listed to remind the member to schedule the task.

The nDateState field simplifies and reduces the number of queries needed to obtain information in the desired order from the database. To obtain tasks listed in order of completed tasks with ascending actual end dates, started tasks with ascending actual start dates, planned tasks with ascending plan end dates, planned start-only tasks with ascending plan start dates, and unscheduled tasks with ascending set dates, five separate queries are needed to obtain the tasks in this order (one query for each type of task) in the previous system. For example, to obtain task information for started tasks from project "J20" is "SELECT*FROM Level1MemberTask WHERE sProjectNumber='J20' AND actualEnd IS NULL AND actualStart IS NOT NULL ORDER BY actualStart". Similar queries are needed for other groups of tasks. With the new field, one query will obtain the tasks in the listed order of completed, started, planned, planned start-only, and unscheduled. For example, the query to obtain task information in the desired order for project "J20" is "SELECT*FROM Level1MemberTasks WHERE sProjectNumber='J20' ORDER BY nDateState DESC, actualEnd, actualStart, planEnd, planStart, setDate". The purpose of nDateState is to provide a simple query to obtain the task in a desired order so that it may be displayed in a form or a web page in that order. At the same time, nDateState indicates the status of a task.

MemberTasks table 908 contains information about all the tasks (tasks at all levels) for all the project members. Associated with each member of a project are the task Ids, nLevelXTaskID, which identify all the tasks and their relationship with one another. As with the TaskAssignment table, bIsObsoleted indicates if the task has been removed from the project member's schedule. bIsCompleted indicates if the tasks is completed. nLevelXTaskID is used for the tasks which are added to the MemberTasks table 908 and are determined from the nLevelXMaxTaskID of the ProjectTeam table 910 when new tasks are added in the member's schedule editor session. Values in the table can be updated or modified (bIsObsoleted or bIsCompleted) from the results of any of the three editor sessions (member schedule, project schedule, task assignment). The MemberTasks table 908 is important to provide a link between the lower level task schedules with the upper level task schedules.

LevelXMemberTask table (e.g., Level1MemberTask table 906, Level2MemberTask table 914, Level3MemberTask table 916, Level4MemberTask table 918) contains information about the most current scheduling of member tasks. sLevelXTaskName is used for the name of the tasks and nLevelXTaskID is used for the IDs associated with the tasks. nLevelXTaskID for the tasks which are added to the table are determined from the nLevelXMaxTaskID of the ProjectTeam table 910 when new tasks are added in the member's schedule editor session. planStart and planEnd are used for the expected dates for starting and completing the task. actualStart and actualEnd are used for the actual dates in which the task was started and completed. setDate is used for the date in which the task was added, planned dates were set, or planned dates were modified. If no planned dates are set for the task, then the revision number is 0. nScheduleRevNumber is used for the revision number of the task schedule. The most current revision number of a member task is maintained in the LevelXMemberTask table. According to one embodiment, the revision is incremented only when the planned dates are changed in the member schedule editor on different days. Each LevelXMemberTask table contains a task ID for upper level tasks (except for level 1, where a task either has a project task as its parent or no parent task). This provides for a task a link to its parent task and its child tasks. All values for parent task ID, sLevelXTaskName, nLevelXTaskID, dates, and nScheduleRevNumber are added or updated in the table through the member schedule editor session. Only Level1MemberTask table 906 contains the sMemberLabel to provide a link to the TaskAssignment table 902.

FIG. 9 depicts only lower levels down to level 4 for purposes of explanation. However, the database can be modified to include lower levels for greater details in the task schedule.

TaskAssignmentHistory table 919 contains information about the history of the assignment to project members of tasks associated with project tasks. This table maintains information about the project members that were previously assigned the tasks before the tasks were reassigned to other project members. nProjectTaskID are the IDs associated with the tasks. sLevel1TaskName are the names of the subtasks (member tasks) associated with the project. sMemberLabel are the project members that are assigned the subtasks. nRevNumber is the revision numbers of the assignment of tasks to project members. The nRevNumber depicts the reassignment of the tasks in the project. The task assignment editor 102 (FIG. 1A) uses and/or updates information in the TaskAssignmentHistory table 919.

The TopLevelProjectTaskHistory table 922 contains information about the history of the schedule of project tasks. This table maintains all prior planned schedules of the project tasks. nProjectTaskID is used for the IDs associated with the tasks. planStart and planEnd are used for the expected dates for starting and completing the task. actualStart and actualEnd are used for the actual dates in which the task was started and completed. setDate is used for the date in which the task was added, planned dates were set, or planned dates were modified. If no planned dates are set for the task, then the revision number is 0. nScheduleRevNumber is used for the revision number of the task schedule. The more recent scheduling for a project task corresponds to the higher revision numbers. All previous scheduling of a project task are maintained in the TopLevelProjectTaskHistory table 922 to track the changes in the project task's schedule. The TopLevelProjectTask table 904 contains the current schedule of all the tasks in the TopLevelProjectTaskHistory table 904.

LevelXMemberTaskHistory tables (e.g., Level1MemberTaskHistory table 924, Level2MemberTaskHistory table 926, Level3MemberTaskHistory table 928, Level4MemberTaskHistory table 930) contain information about the history of the schedule of member tasks. These tables maintain all prior planned schedules of the member tasks. nLevelXTaskID is used for the IDs associated with the tasks. planStart and planEnd are used for the expected dates for starting and completing the task. actualStart and actualEnd are used for the actual dates in which the task was started and completed. setDate is used for the date in which the task was added, planned dates were set, or planned dates were modified. If no planned dates are set for the task, then the revision number is 0. nScheduleRevNumber is used for the revision number of the task schedule. The more recent scheduling for a member task corresponds to the higher revision numbers. All previous scheduling of a member task are maintained in the LevelXMemberTaskHistory tables to track the changes in the member task's schedule. The LevelXMemberTask tables contain the current schedule of all the tasks in the LevelXMemberTaskHistory tables.

Figure 10:
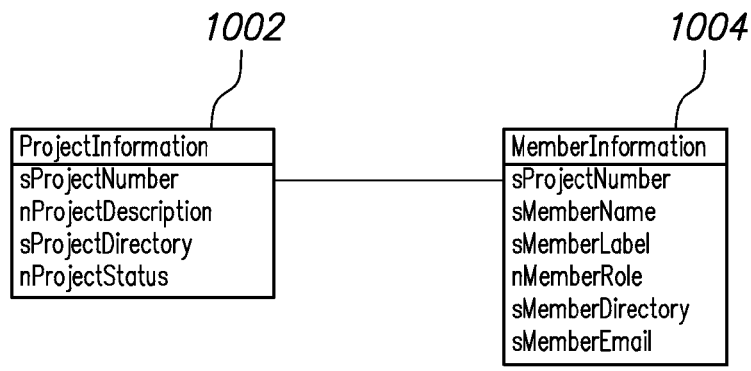
FIG. 10 depicts an example schema of database tables used to store and manage information about a project and the members of the project.

FIG. 10 depicts an example schema of database tables used to store and manage information about a project and the members of the project that is needed to setup the project for the project management system and setting up the web site for the project. The log in process uses information in the database tables to determine access privileges to a requested editor or meeting form before displaying the editor or meeting form. In FIG. 10, the ProjectInformation table 1002 contains information about the project number, the title or description of the project, the directory where the web pages for the project are located, and the status of the project. The MemberInformation table 1004 contains member information for a given project. Member information includes member name, label such as initials for the member, role of member, the directory of the home page of the member where all the member's web pages are located, and the member's email address.

Various values may be used for the nProjectStatus field to indicate the status of a project. Example values are as follows:
 0 indicates the project has not started
 1 indicates that the project has started
 10 indicates that the project is completed.
New numbers can be added to indicate other possible status of the project such as abandoned or reassigned.

Various values may also be used for the nMemberRole field to indicate the role of a member. Example values are as follows:
 1 for manager
 2 for member
 3 for manager-member.
These roles are example roles provided for explanation purposes and the invention is not limited to these particular roles. Additional roles may be added, for example, project leader, developer, or tester.

Figure 11:
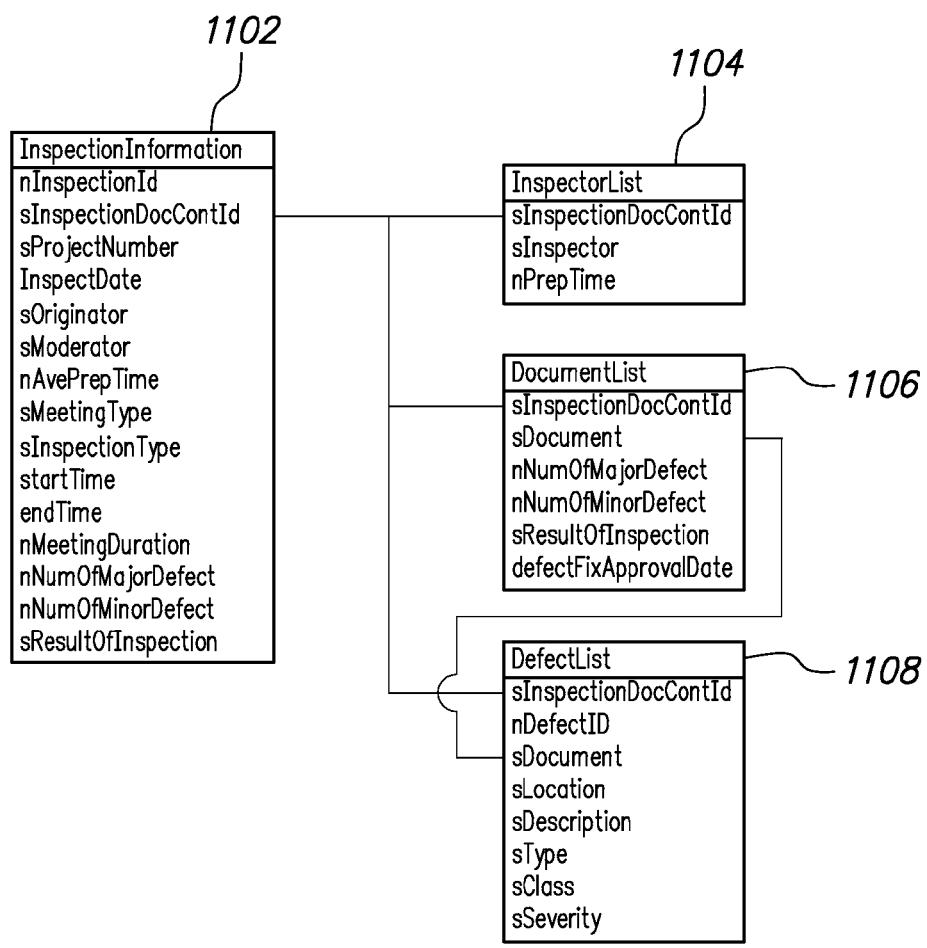
FIG. 11 depicts an example schema of database tables used to store information about the inspection meetings of a project.

FIG. 11 depicts an example schema of database tables used to store information about the inspection meetings of a project. An inspection meeting is the inspection of inspection material for defect by project members. The inspection material may be project documents such as requirements or design or code. Other possible inspection material may include devices, electronic components, or user interface. An inspection meeting form of the project management system allows project members to enter information through a web browser for an inspection meeting. When the inspection meeting form is submitted, the HTML document for the meeting is generated and the inspection meeting information is stored in the database so that reports can be easily generated for statistical information related to all the inspection meetings of a project after each inspection meeting.

In FIG. 11, an InspectionInformation table 1102 contains general information about all the inspections. nInspectionId and sInspectionDocContId are assigned to the inspection meeting which uniquely identifies the inspection for a project. nInspectionId is a number that may be used to identify types of inspection based upon various conditions. For example, an nInspectionId value between 1 and 99 may be used to indicate that these inspection sessions occurred before the actual start of the project. Some material may require inspection prior to the start of a project. An nInspectionId value between 101 and 1099 may be used to indicate that the inspection sessions occurred during the project.

sInspectionDocContId is also used for the filename of the HTML document for the meeting. inspectDate is the date of the inspection and startTime and endTime is the time in which the inspection starts and ends. sOriginator is the member label of the member who is the author of the inspection material. sModerator is the member label of the member who presides over the inspection meeting and enters information in the inspection form. nAvePrepTime is the average time of all the time spent by the inspectors in preparing for the inspection. sMeetingType is the inspection meeting type which can be inspection, re-inspection, or maintenance. More meeting types may be added. sInspectionType is the type of inspection material which can be document, code, or others. More inspection types may be added. nMeetingDuration is the length of the inspection meeting. nNumOfMajorDefect and nNumOfMinorDefect is the total number of major and minor defects discovered for all the inspection material. sResultOfInspection is the sum of the results of the inspection of all the inspection material which can be either Accepted, Conditional, or Re-Inspect. If the result of any inspection material is Re-Inspect, then sResultOfInspection is Re-Inspect. If the result of any inspection material is Conditional and none are Re-Inspect, then sResultOfInspection is Conditional. If the results of all inspection material are Accepted, then sResultOfInspection is Accepted. More results can be added.

The InspectorList table 1104 contains all the inspector information for all the inspections. sInspector is the member label of the member who inspected the inspection material. nPrepTime is the time spent by the inspector in inspecting the material.

The DocumentList table 1106 contains all the inspection material for all the inspections. sDocument is the name of the inspection material. nNumOfMajorDefect and nNumOfMinorDefect is the total number of major and minor defects discovered in the inspection material. sResultOfInspection is the results of the inspection of the inspection material which can be either Accepted, Conditional, or Re-Inspect. Usually if there are one or more major defects for inspection material, then sResultOfInspection for the inspection material is Re-Inspect. If there are one or more minor defects without any major defects for inspection material, then sResultOfInspection for the inspection material is Conditional. If there are no defects for inspection material, then sResultOfInspection for the inspection material is Accepted. More results can be added. defectFixApprovalDate is the date that the correction of the defects discovered in the inspection meeting for the inspection material was approved.

The DefectList table 1108 contains all the defect lists for all the inspection material for all the inspections. nDefectID is assigned to the defect discovered for inspection material of an inspection meeting which uniquely identifies the defect for the inspection material. sLocation is a description of where the defect was discovered in the inspection material. sDescription is a description of the defect discovered. sType is the type of defect that includes Data, Documentation, Functionality, Interface, Logic, Input/Output, Human Factors, Maintainability, Performance, syntax, Standards, and Other. More types can be added. sClass is the class of defect that includes Missing, Wrong, Extra, or Unclear. More classes can be added. sSeverity is the severity of the defect that includes Minor or Major. More severity types can be added.

Programming Package Diagrams for the Server

Figure 12:
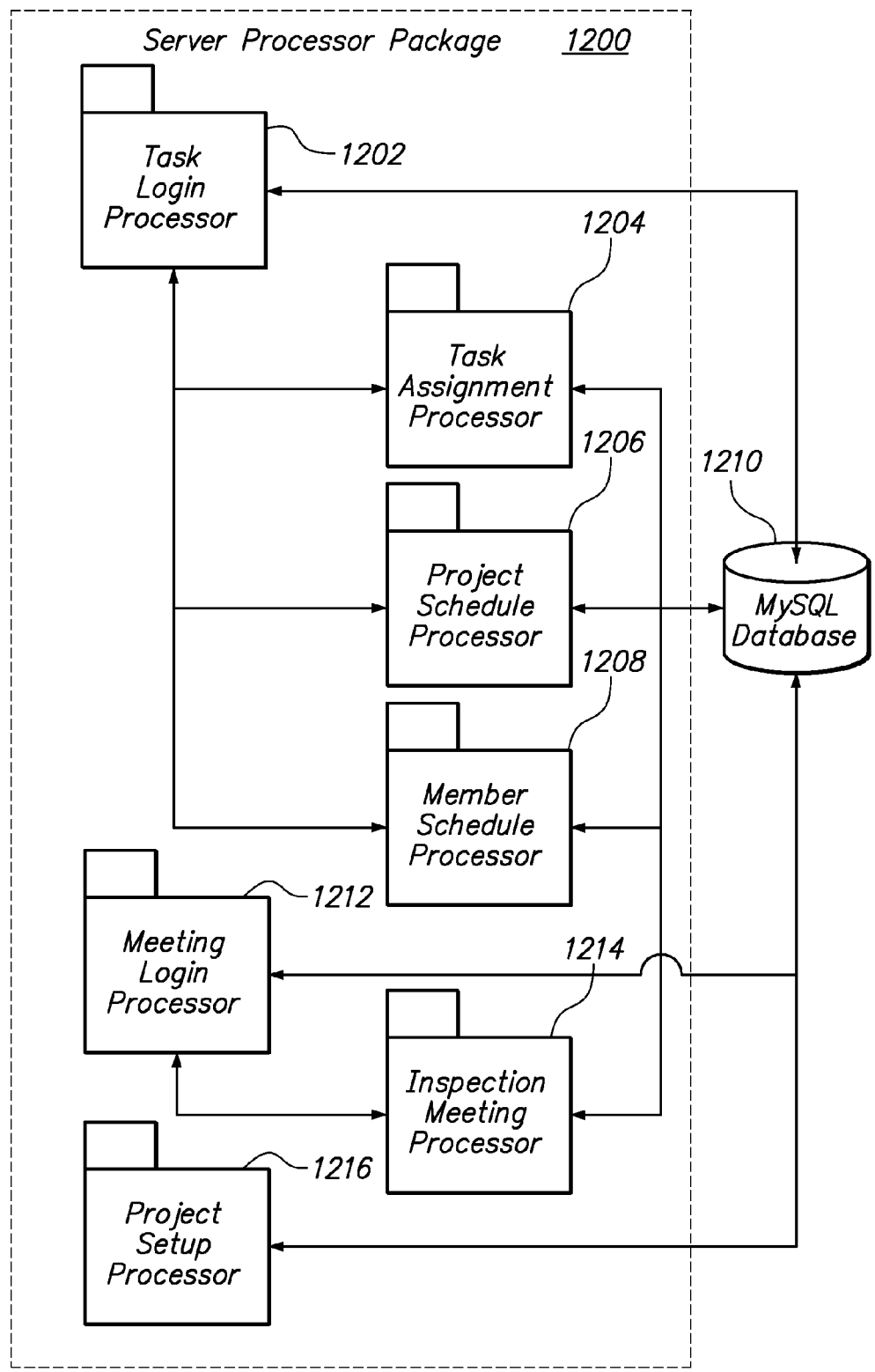
FIG. 12 is a diagram depicting a programming package diagram of the server processor of FIG. 6.

FIG. 12 is a diagram depicting a programming package diagram of the server processor 604 of FIG. 6. The server processor package 1200 contains seven packages, wherein each package corresponds to a Web page that is displayed to the user on the client processor 602 and through which the information entered by the user is processed when the user completes the login, editor, meeting or project setup session.

The TaskLoginProcessor 1202 package provides the Web page to display the form that allows a project member to log in to one of the editors. When the member submits the form, the LoginProcessor 1202 package processes the information entered by the member to validate the information. If the information is valid and if the member has the appropriate access privilege, the LoginProcessor 1202 package redirects the system to one of the packages corresponding to the editors.

The TaskAssignmentProcessor 1204 package provides the Web page to display the task assignment editor 102 (FIG. 1A), which is used to add or modify the assignment of project tasks to project members. When the task assignment editor 102 is submitted, the TaskAssignmentProcessor 1204 package processes and stores the information from the task assignment editor 102 and creates the Web page for the latest task assignment.

The ProjectScheduleProcessor 1206 package provides the Web page to display the project schedule editor 202 (FIG. 2A), which is used to add or modify the schedule of project tasks. When the project schedule editor 202 is submitted, the ProjectScheduleProcessor 1206 package processes and stores the information from the project schedule editor 202 and creates the Web page for the latest project schedule.

The MemberScheduleProcessor 1208 package provides the Web page to display the member schedule editor 302 (FIG. 3A), which is used to add or modify the schedule of member tasks. When the member schedule editor 302 is submitted, the MemberScheduleProcessor 1208 package processes and stores the information from the member schedule editor 302 and creates the Web page for the latest member schedule.

The MeetingLoginProcessor 1212 package provides the Web page to display the form (FIG. 28) that allows a project member to log in to an inspection meeting or other meeting forms. When the member submits the login form, the MeetingLoginProcessor 1212 package processes the information entered by the member to validate the information. If the information is valid and if the member has the appropriate access privilege, the MeetingLoginProcessor 1212 package redirects the system to the InspectionMeetingProcessor 1214 package. Packages for other types of meeting can be added to the server processor package. Other types of meeting include discussion meeting or general meeting. The MeetingLoginProcessor 1212 package can redirects the system to these other packages.

The InspectionMeetingProcessor 1214 package provides the Web page to display the inspection meeting form (FIG. 29), which is used for entering information pertaining to an inspection meeting. When the inspection meeting form is submitted, the InspectionMeetingProcessor 1214 package processes and stores the inspection meeting data from the inspection meeting form into the database 1210. The InspectionMeetingProcessor 1214 package also generates the inspection meeting document (FIG. 30), the inspection index document (FIG. 31) and the inspection statistics report (FIG. 32).

The ProjectSetupProcessor 1216 package provides the Web page to display the new project setup form (FIG. 39), which is used for entering information pertaining to a new project. When the new project setup form is submitted, the ProjectSetupProcesor 1216 package processes and stores the new project data from the new project setup form into the database 1210. The ProjectSetupProcessor 1216 package will set up the website for the new project.

Except for the redirection of the TaskLoginProcessor 1202 package to the editor packages and the redirection of the MeetingLoginProcessor 1212 package to the Inspection-MeetingProcessor 1214 package or other meeting type packages, the processor packages are independent of each other and, generally, there is no interaction between the editor packages or meeting packages. Each of the processor packages 1202-1216 interacts with a database 1210 (e.g., databases 506, 536 of FIG. 5) to obtain, add, or update information. The Login Processors 1202 and 1212 packages access the database 1210 to obtain project information to display in the login form and determine if the member has access privileges to the editor or meeting form. Each of the other processor packages 1204-1208 and 1214 accesses the database 1210 to obtain task or inspection information to display in the corresponding editors or meeting forms and in the corresponding Web page it generates, and to add or update corresponding task or inspection information. The project setup processor 1216 package accesses the database 1210 to obtain project and project member information to display in the project setup form and to setup the project website for the new project. For a non-limiting example, the database 1210 may be implemented using MySQL; however, the database 1210 is not limited to implementation using MySQL.

According to an embodiment, each of the processor 1204-1216 packages comprises PHP script files, JavaScript files, and HTML files. The PHP script files obtain project, task, and inspection information from the database 1210 and generate the JavaScript that displays the editor, meeting form, or project setup form on the client processor 602 (FIG. 6). This allows the PHP script to interface with the JavaScript. JavaScript will create the editor, meeting form, or project setup form web page and manage all the interactions between the web page and a project member. When data from an editor or a form is submitted, the PHP script files process the data and add or update the data in the database 1210, and create the Web page corresponding to the editor or form.

Figure 13:
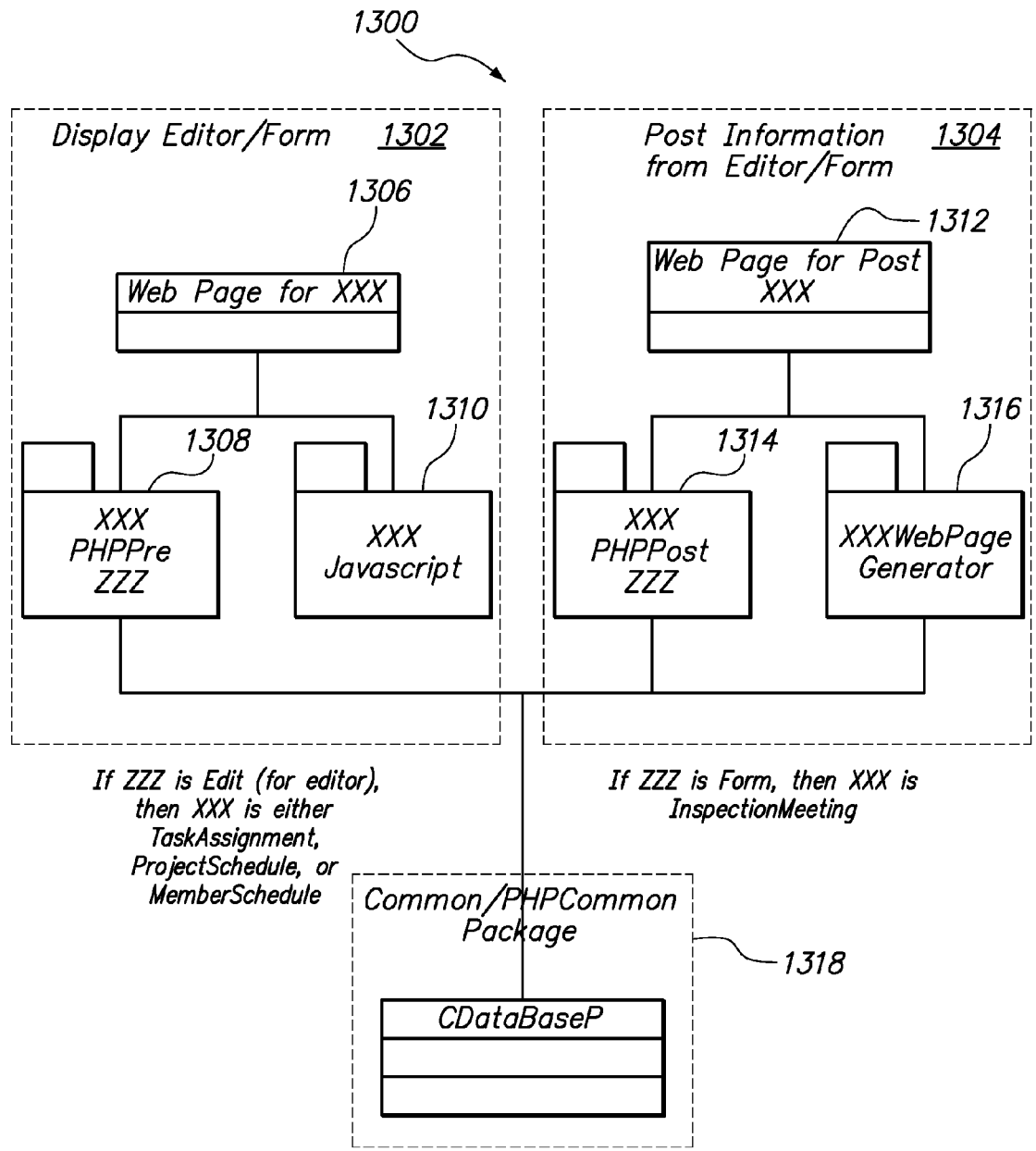
FIG. 13 is a diagram depicting a programming package diagram of the processor packages.

FIG. 13 is a diagram depicting a programming package diagram of the processor 1204-1208 and 1212 packages. According to an embodiment, the TaskAssignmentProcessor 1204, ProjectScheduleProcessor 1206, MemberScheduleProcessor 1208, and InspectionMeetingProcessor 1214 packages all use the package diagram depicted in FIG. 13. The package is divided into two major parts, the display editor/form 1302 being responsible for the display and management of the editor/form and the post information from editor/form 1304 being responsible for posting information in the editor/form and generating the Web page.

The Web Page for XXX 1306 (where "XXX" refers to either TaskAssignment, ProjectSchedule, MemberSchedule, or InspectionMeeting) integrates two packages to display the editor/form. The Web page 1306 includes all the PHP script files of a XXXPHPPreZZZ 1308 package and all the javascript files of a XXXJavaScript 1310 package to display and manage the editor/form. Note that if ZZZ is Edit (for editor), then XXX is either TaskAssignment, ProjectSchedule or MemberSchedule and if ZZZ is Form, then XXX is InspectionMeeting. All the PHP script files are processed on the Web server (e.g., Web server 507, 530 of FIG. 5) to obtain the task or inspection information from the database, and generate the Javascript that will interface with the XXXJavaScript 1310 package. All the Javascript is executed in the Web browser of the client processor 602 (FIG. 6) to provide for the initial display of the editor/form. All the JavaScript files are passed to the Web browser of the client processor 602 to manage the editor/form, i.e., to handle all corresponding events.

The Web Page for PostXXX 1312 integrates two packages that post the information and generate the Web page. The Web Page for PostXXX 1312 includes all the PHP script files of XXXPHPPostZZZ 1314 package to post the information from the editor/form and all the PHP script files of XXX-WebPageGenerator 1316 package to create the Web page. The XXXPHPPostZZZ 1314 package obtains all the task or inspection information from the editor/form and adds or updates the task or inspection information in the database. The XXXWebPageGenerator 1316 package obtains task or inspection information from the database to generate the appropriate Web page.

Each of the packages of FIG. 13 provides a class that provides the interface for the package and manages the classes within the package. This allows the design within the package to be easily changed without affecting the other packages. The CDataBaseP class 1318 allows access to any database including the three databases of FIGS. 9 through 11.

Editor Web Page Components

Figure 14:
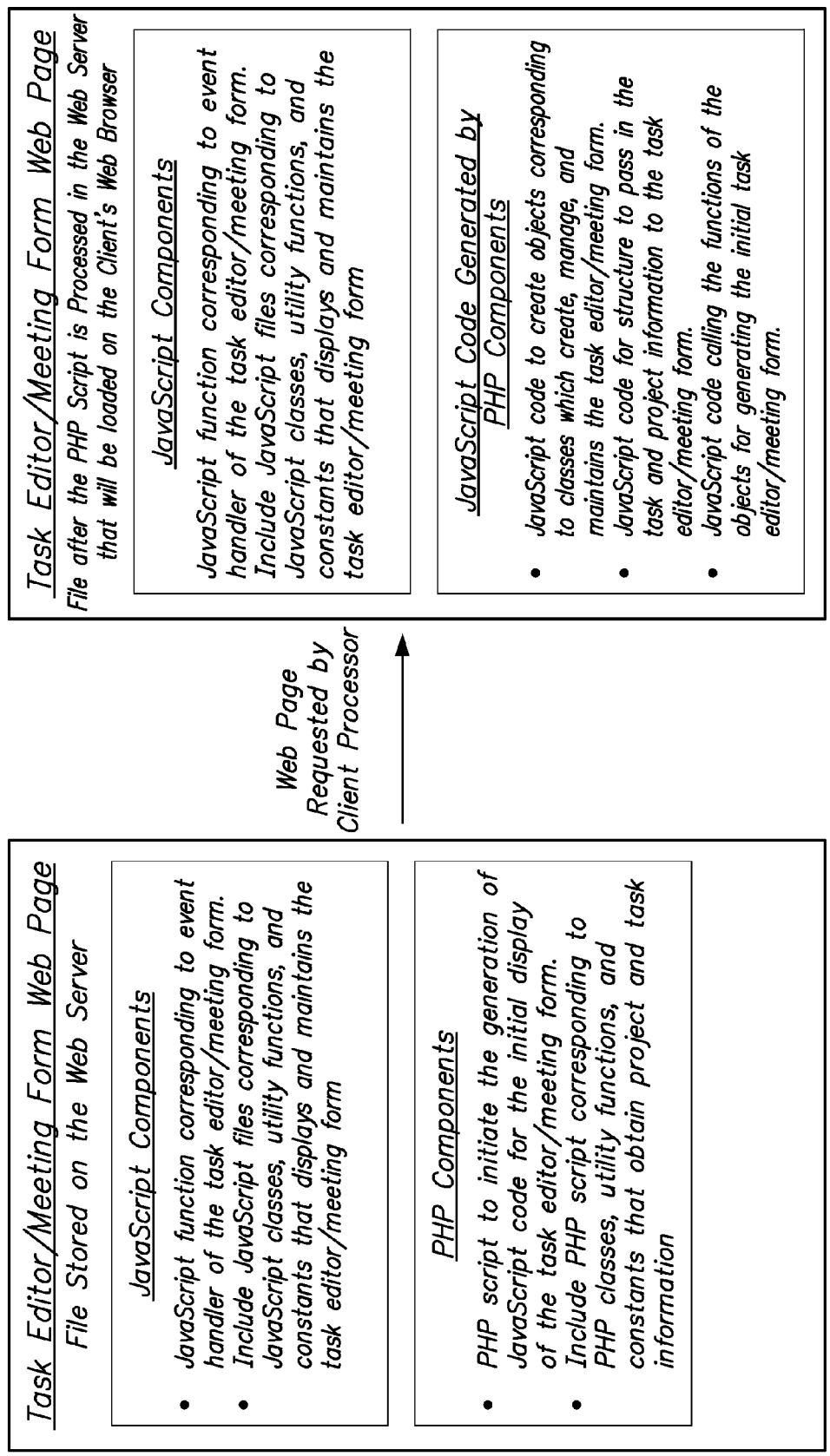
FIG. 14 depicts the components of the Web page for the task editors and meeting forms.

FIG. 14 depicts the components of the Web page for the task editors and meeting forms. The Web page is a file stored in the server processor 604 (FIG. 6), such as a Web server. The Web page contains a JavaScript component and a PHP component. The JavaScript component contains JavaScript functions that handle events that occur in the editor. The JavaScript component includes other JavaScript files that correspond to classes, utilities, and constants for the display, management, and maintenance of the editor. The PHP component of the Web page contains PHP script to initiate the generation of JavaScript code that will display, in the editor/form, task assignment/schedule/inspection information obtained from the database. The PHP component includes files with PHP script that correspond to classes, utilities, and constants to obtain task assignment/schedule/inspection information from the database and to generate the JavaScript code for the editor/form.

When the Web page is requested by the client processor 602 (FIG. 6), such as a Web browser requesting an editor Web page or a meeting form, only the PHP component of the Web page is processed by the server processor 604. For example, the PHP script is executed in the Web server, such as Web servers 507 and 530 (FIG. 5). The PHP script accesses and obtains task assignment/schedule/inspection information from the database. The PHP script generates structures in JavaScript code to store and pass the task/inspection information to JavaScript. The PHP script generates JavaScript code that will create the object of a JavaScript class that creates, manages, and maintains the editor or meeting form, and calls the member functions of the object to create the initial display of the editor or meeting form with the task/inspection information. The JavaScript code generated by the PHP script is added to the editor or meeting form Web page as the Web page is passed to the client processor 602. The PHP code will not be in the Web page as it is passed to the client processor 602. The client processor executes all the JavaScript code in the Web page to display the initial editor or meeting form and to manage and maintain the editor or meeting form as the user interacts with the editor or meeting form. The PHP script is not passed to the client processor 602, but is server-side code.

FIG. 15 depicts components of the Web page for the task editors and meeting forms, along with the processors that process the components of the Web page. The PHP processor occurs on the server side and the JavaScript processor occurs on the client side. The PHP processor on the server executes the PHP components to generate the JavaScript code that will be executed by the JavaScript processor on the client.

Figure 16:
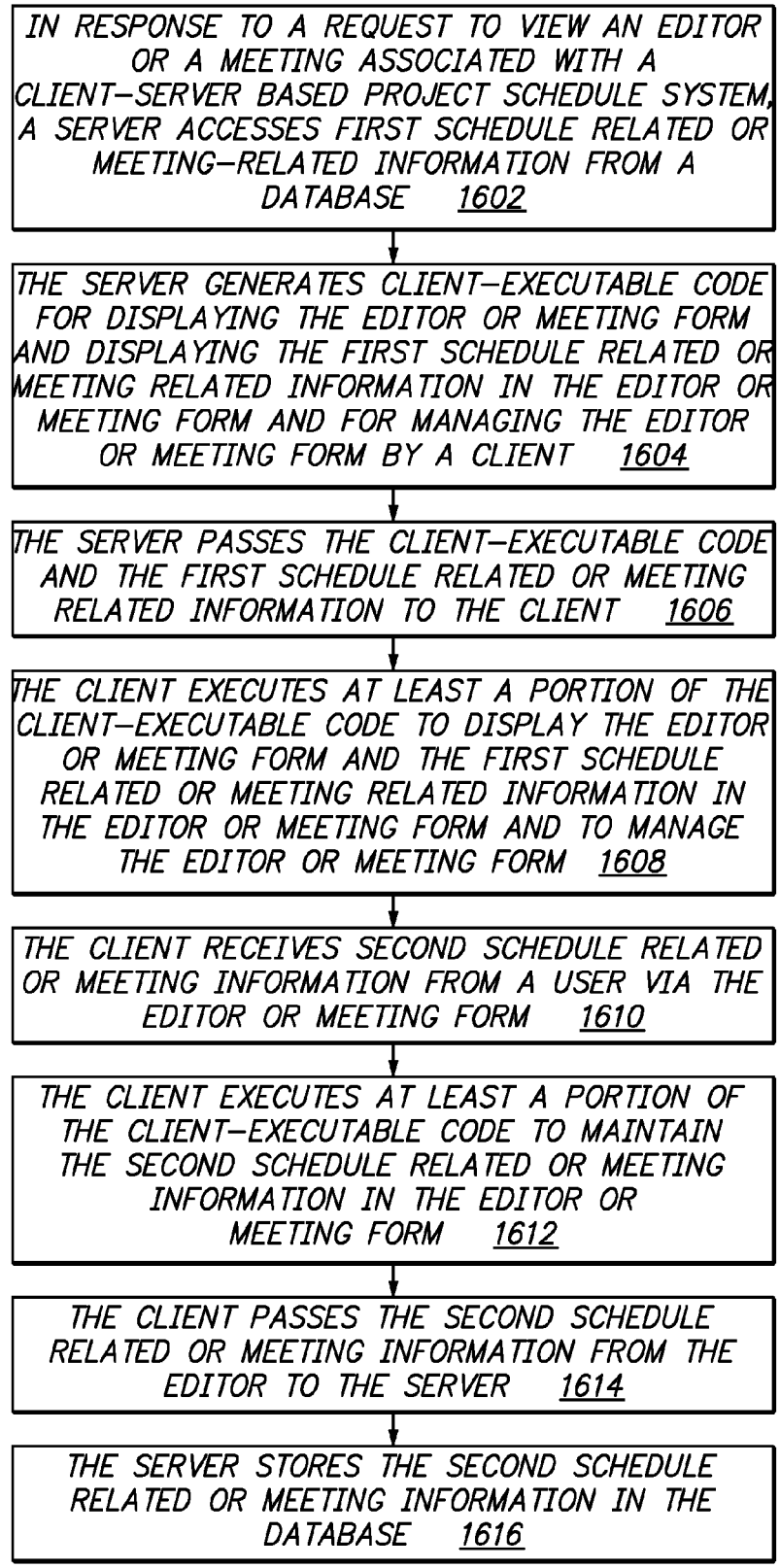
FIG. 16 is a flow diagram illustrating a method for managing a project schedule or meeting with a client-server based project management system.

A Method for Managing A Project Schedule or Meeting With A Client-Server Based Project Schedule System FIG. 16 is a flow diagram illustrating a method for managing a project schedule or meeting with a client-server based project management system. An embodiment of the method depicted in FIG. 16 is implemented as a computer and/or machine-implemented method in which a computer or machine performs the method steps, such as by one or more processors executing instructions. For example, the method may be performed on or by a computer system such as computer system 1800 of FIG. 18.

At block 1602, in response to a request to view an editor or a meeting form associated with a client-server based project management system, a server accesses first schedule-related or meeting-related (i.e. inspection information) information from a database. For example, a user at client processor 602 (FIG. 6) interacts with a user interface to request one of the task assignment editor 102 (FIG. 1A), member schedule editor 302 (FIG. 3A), project schedule editor 202 (FIG. 2A) or inspection meeting form (FIG. 29). In response to the request, server processor 604 (FIG. 6) accesses data from a database, such as data 508 (FIG. 5) from database 506 (FIG. 5) and/or data 536 (FIG. 5) from database 538 (FIG. 5). For example, server processor 604 executes PHP script code to retrieve the appropriate data from the database for populating the requested editor or meeting form specifically for the requesting user and corresponding project. The data that the server retrieves from the database is specific to the editor or meeting form that the user requested, and specific to various information input by the user in association with the request, such as the user id and project id. The data that the server retrieves from the database in response to a request for an editor or meeting form includes initial information, if any, for populating fields in the requested editor or meeting form.

At block 1604, the server generates client-executable code for execution by the requesting client. This client-executable code generated by the server is for displaying the requested editor or meeting form at the client, displaying the retrieved information in the appropriate fields of the editor or meeting form, and for managing the editor or meeting form at the client. For example, server processor 604 (FIG. 6) executes PHP script code to convert the retrieved data into a format that the client processor 602 (FIG. 6) can use. For example, the client processor 602 does not understand server script code so the server needs to process the retrieved information into a format that the client does understand and can use, such as wrapping the information in JavaScript code executable by the client processor 602. At block 1606, the server passes the client-executable code and the first schedule-related or meeting-related information to the client for execution.

The editor/form pages are stored in the server processor 604, such as Web servers 507, 530 (FIG. 5). When the client processor 602, such as a Web browser, accesses the editor/form pages, the PHP script is executed in the server processor 604 and the entire PHP script is replaced with JavaScript code that the PHP script generates. All the JavaScript code, including that generated by the PHP script, is passed to the client processor 602 for execution.

At block 1608, the client executes the client-executable code, or at least some of such code, in order to display the first schedule-related or meeting-related information in the requested editor or meeting form and to manage the data, editor and meeting form, generally. Thus, initial display of the requested editor/form is now complete, based on the foregoing actions associated with each of the client and server processors.

Once the editor or meeting form page is loaded at the client by executing the client-executable code (e.g., JavaScript) generated by the server, the user can begin to edit and/or add information associated with the editor or meeting. Thus, at block 1610, the client receives second schedule-related or meeting-related information from a user via the editor/form. For example, depending on the particular editor or meeting, the client processor 602 (FIG. 6) receives task assignment information, member schedule information, project schedule information or meeting-related information from a user that was input via the editor or the meeting form.

At block 1612, the client executes at least some of the client-executable code to manage and/or maintain the second schedule-related or meeting-related information in the editor or meeting form at the client side. For example, execution of the code creates data structures and associations for managing the new or updated data at the client prior to submission of such data to the server, and provides the functionalities embodied in the editor or form page objects (e.g., HTML buttons, text entry objects, etc.).

At block 1614, the client passes the second schedule-related or meeting-related information from the editor/form to the server. Thus, at block 1616, the server stores the second schedule-related or meeting-related information in the database, from which it can be subsequently accessed for passing back to clients in response to requests. For example, schedule-related or meeting-related information may be passed from the server to a client in response to a request for a respective editor/form page (e.g., FIGS. 1A, 2A, 3A, 29) or a request for a Web page associated with a respective editor/form (e.g., FIGS. 1B, 2B, 3B, 30, 31, 32).

A Method for Managing Tasks in A Project Schedule System

Figure 17:
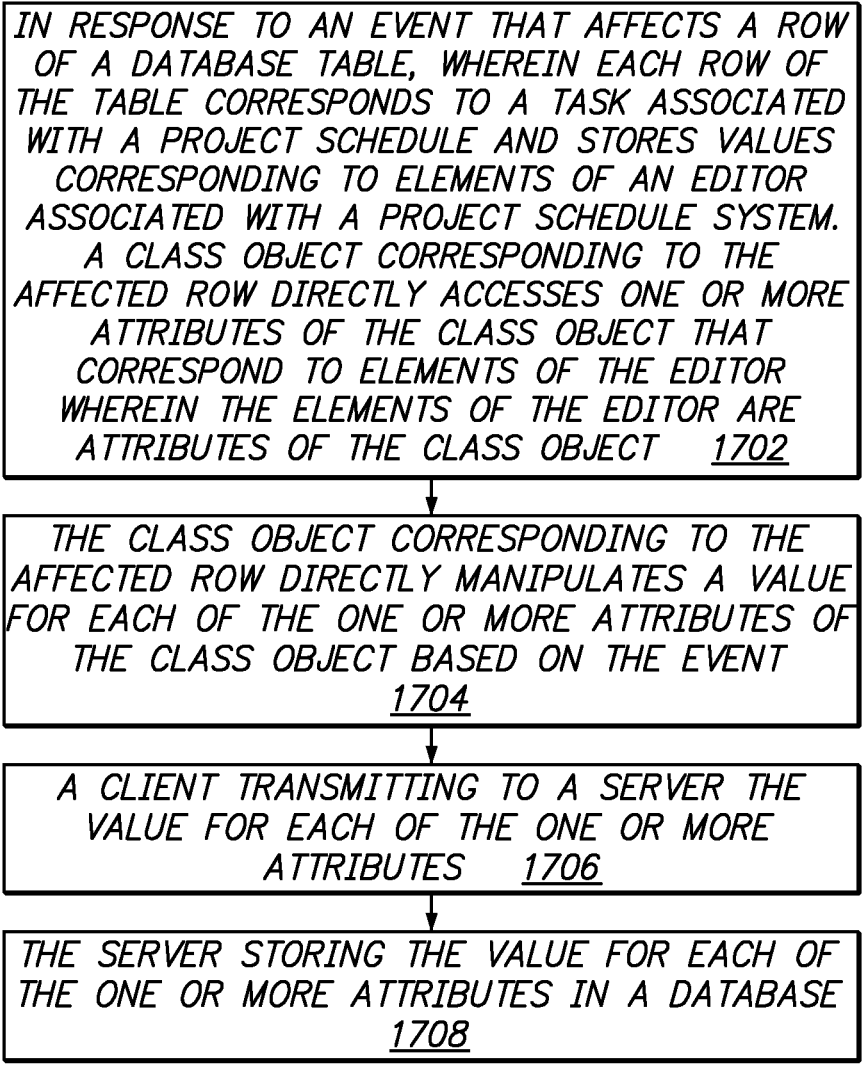
FIG. 17 is a flow diagram illustrating a method for managing tasks in a project management system.

FIG. 17 is a flow diagram illustrating a method for managing tasks in a project schedule management system. An embodiment of the method depicted in FIG. 17 is implemented as a computer and/or machine-implemented method in which a computer or machine performs the method steps, such as by one or more processors executing instructions. For example, the method may be performed on or by a computer system such as computer system 1800 of FIG. 18.

At block 1702, in response to an event that affects a row of a display table of an editor, a class object corresponding to the affected row directly accesses one or more attributes, of the class object, which correspond to elements of an editor associated with a project schedule system. Each row of the display table corresponds to a schedule task associated with a project schedule and displays values corresponding to elements of the editor. Significantly, the class object can directly access the attributes because the elements of the editor are configured as attributes of the class object. Thus, the class object does not have to construct the element id for the affected elements of the affected row and does not have to obtain such elements.

For example, a user edits schedule data for a particular task via the member schedule editor 302 (FIG. 3A). The user edit comprises an event that affects a row in the table of the member schedule editor. A member function of a class for the member schedule editor 302 has direct access to the elements, as attributes of an object of the class, for modifying the properties of the elements as appropriate based on the event.

The elements maintain information about the task in the row that can be passed to the server processor when the editor session is completed.

At block 1704, the class object corresponding to the affected row directly manipulates a value for each of the one or more attributes of the class object based on the event. Continuing with the example, a member function of an object of class for the member schedule editor 302 sets the values of attributes of the object and thereby manipulates the values of elements of the member schedule editor 302.

At block 1706, a client transmits to a server the value for each of the one or more attributes, including the values for the attributes that were manipulated at block 1704. For example, the client processor 602 (FIG. 6), which comprises the XXX-JavaScript 1310 for the member schedule editor 302, posts the manipulated data to the server processor 604 (FIG. 6). At block 1708, the server stores the value for each of the one or more attributes in a database. For example, the server processor 604 stores the data back in a database such as databases 506, 536 (FIG. 5). When the editor session is completed, the tasks for which the event on the rows of a table changed, or added information about the tasks, are updated or added to the database.

FIG. 18 is a block diagram that depicts an example computer system 1800 upon which embodiments of the invention may be implemented. Computer system 1800 includes a bus 1802 or other communication mechanism for communicating information, and a processor 1804 coupled with bus 1802 for processing information. Computer system 1800 also includes a main memory 1806, such as a random access memory (RAM) or other dynamic storage device, coupled to bus 1802 for storing information and instructions to be executed by processor 1804. Main memory 1806 also may be used for storing temporary variables or other intermediate information during execution of instructions to be executed by processor 1804. Computer system 1800 further includes a read only memory (ROM) 1808 or other static storage device coupled to bus 1802 for storing static information and instructions for processor 1804. A storage device 1810, such as a magnetic disk or optical disk, is provided and coupled to bus 1802 for storing information and instructions.

Computer system 1800 may be coupled via bus 1802 to a display 1812, such as a cathode ray tube (CRT), for displaying information to a computer user. An input device 1814, including alphanumeric and other keys, is coupled to bus 1802 for communicating information and command selections to processor 1804. Another type of user input device is cursor control 1816, such as a mouse, a trackball, or cursor direction keys for communicating direction information and command selections to processor 1804 and for controlling cursor movement on display 1812. This input device typically has two degrees of freedom in two axes, a first axis (e.g., x) and a second axis (e.g., y), that allows the device to specify positions in a plane.

The invention is related to the use of computer system 1800 for implementing the techniques described herein. According to one embodiment of the invention, those techniques are performed by computer system 1800 in response to processor 1804 executing one or more sequences of one or more instructions contained in main memory 1806. Such instructions may be read into main memory 1806 from another computer-readable medium, such as storage device 1810. Execution of the sequences of instructions contained in main memory 1806 causes processor 1804 to perform the process steps described herein. In alternative embodiments, hard-wired circuitry may be used in place of or in combination with software instructions to implement the invention. Thus, embodiments of the invention are not limited to any specific combination of hardware circuitry and software.

The term "computer-readable medium" as used herein refers to any medium that participates in providing data that causes a computer to operation in a specific manner. In an embodiment implemented using computer system 1800, various computer-readable media are involved, for example, in providing instructions to processor 1804 for execution. Such a medium may take many forms, including but not limited to, non-volatile media and volatile media. Non-volatile media includes, for example, optical or magnetic disks, such as storage device 1810. Volatile media includes dynamic memory, such as main memory 1806. Common forms of computer-readable media include, for example, a floppy disk, a flexible disk, hard disk, magnetic tape, or any other magnetic medium, a CD-ROM, any other optical medium, a RAM, a PROM, and EPROM, a FLASH-EPROM, any other memory chip or memory cartridge, or any other medium from which a computer can read.

Various forms of computer-readable media may be involved in carrying one or more sequences of one or more instructions to processor 1804 for execution. For example, the instructions may initially be carried on a magnetic disk of a remote computer. The remote computer can load the instructions into its dynamic memory and send the instructions over a telephone line using a modem. A modem local to computer system 1800 can receive the data on the telephone line and use an infra-red transmitter to convert the data to an infra-red signal. An infra-red detector can receive the data carried in the infra-red signal and appropriate circuitry can place the data on bus 1802. Bus 1802 carries the data to main memory 1806, from which processor 1804 retrieves and executes the instructions. The instructions received by main memory 1806 may optionally be stored on storage device 1810 either before or after execution by processor 1804.

Computer system 1800 also includes a communication interface 1818 coupled to bus 1802. Communication interface 1818 provides a two-way data communication coupling to a network link 1820 that is connected to a local network 1822. For example, communication interface 1818 may be an integrated services digital network (ISDN) card or a modem to provide a data communication connection to a corresponding type of telephone line. As another example, communication interface 1818 may be a local area network (LAN) card to provide a data communication connection to a compatible LAN. Wireless links may also be implemented. In any such implementation, communication interface 1818 sends and receives electrical, electromagnetic or optical signals that carry digital data streams representing various types of information.

Network link 1820 typically provides data communication through one or more networks to other data devices. For example, network link 1820 may provide a connection through local network 1822 to a host computer 1824 or to data equipment operated by an Internet Service Provider (ISP) 1826. ISP 1826 in turn provides data communication services through the world wide packet data communication network now commonly referred to as the "Internet" 1828. Local network 1822 and Internet 1828 both use electrical, electromagnetic or optical signals that carry digital data streams.

Computer system 1800 can send messages and receive data, including program code, through the network(s), network link 1820 and communication interface 1818. In the Internet example, a server 1830 might transmit a requested code for an application program through Internet 1828, ISP 1826, local network 1822 and communication interface 1818.

The received code may be executed by processor 1804 as it is received, and/or stored in storage device 1810, or other non-volatile storage for later execution.

Figures 2, 19A:
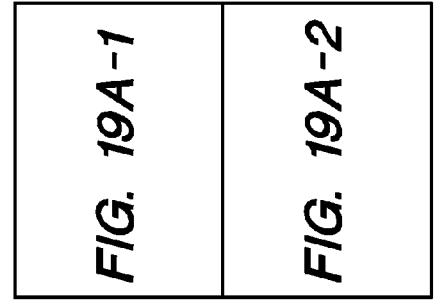

FIGS. 19A-19D depict example entries in the Level1MemberTask, Level3MemberTask, Level3MemberTask, and Level4MemberTask tables of the schedule database depicted in FIG. 9. The entries correspond to project "J20" for the members having labels "AF" and "TM". By querying the tasks in the database by order of descending nDateState, the task are grouped in order of completed tasks, started tasks, planned tasks, planned started-only tasks, and unscheduled tasks. By including more ordering restrictions, each group of tasks may be further ordered. The entries depicted in FIG. 19A are ordered based on ascending order of sMemberLabel and descending order of nDateState to see the grouping of task by members. The entries depicted in FIGS. 19B, 19C and 19D are ordered in descending order based upon the value of nDateState.

FIGS. 20A and 20B depict example entries in the ProjectInformation and MemberInformation tables of the ProjectTeam database depicted in FIG. 10. The tables depict the project information and member information for five projects. Projects J01 and J02 have been completed. Projects J19 and J20 have been started but not completed. Project J21 has not yet been started.

FIGS. 21A through 21D depict sample entries in InspectionInformation, InspectorList, DocumentList, and DefectList tables of the inspection database depicted in FIG. 11. The table depicts only inspection meetings that have taken place during project J20. Two inspections were assigned an nInspectionId value of 1 and 2 to indicate that the inspections occurred prior to the start of the project. The corresponding nInspectionDocContIds contain "PRE01" and "PRE02" respectively to indicate that the inspections occurred prior to the start of the project. The nInspectionDocContIds are used for the filename of the inspection meeting web page to uniquely identify the file for the inspection. Once the project has started, the value of nInspectionId starts at 101 and is incremented by 1 for each inspection. The corresponding nInspectionDocContIds contain a number starting at 001 and is incremented by 1 for each inspection.

Figure 22:
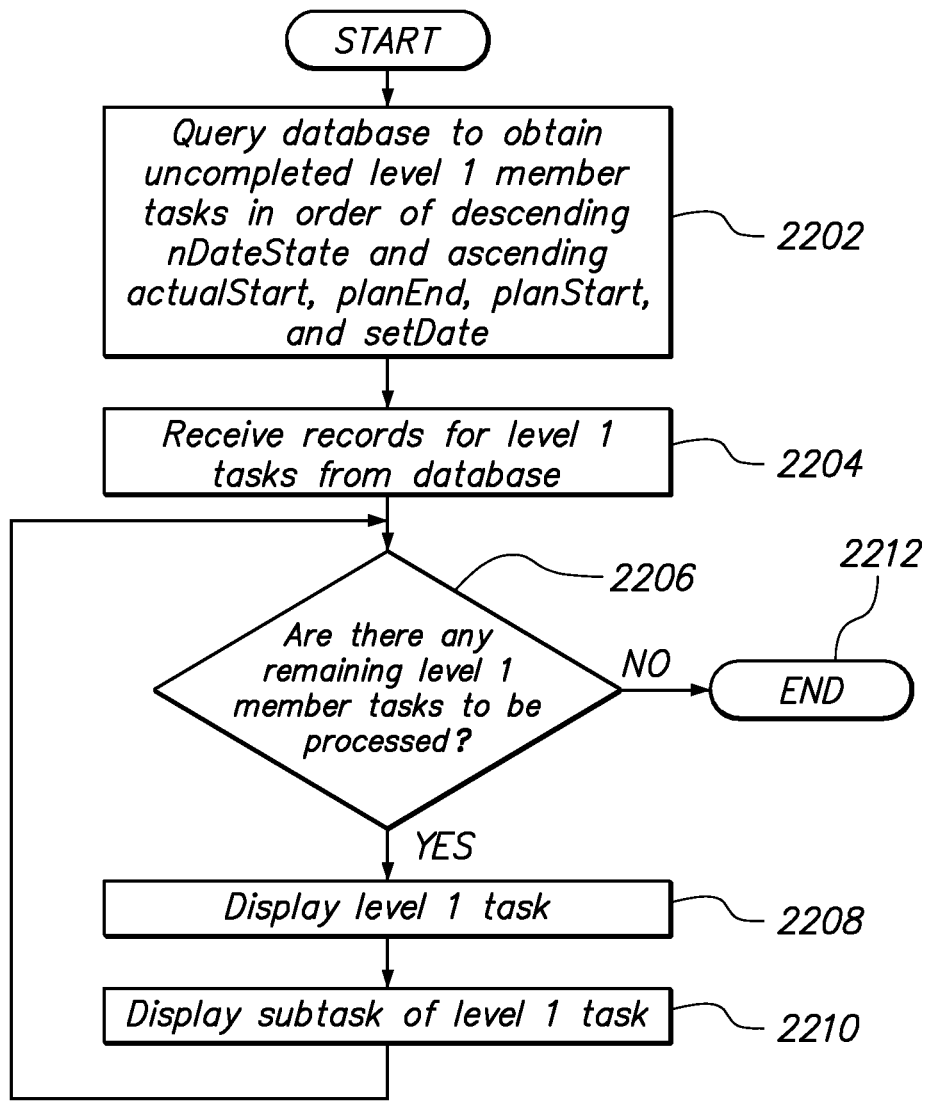
FIG. 22 is a flow diagram that depicts how the level 1 member tasks that are to be displayed in the member schedule editor are retrieved from the schedule database.
Figure 24:
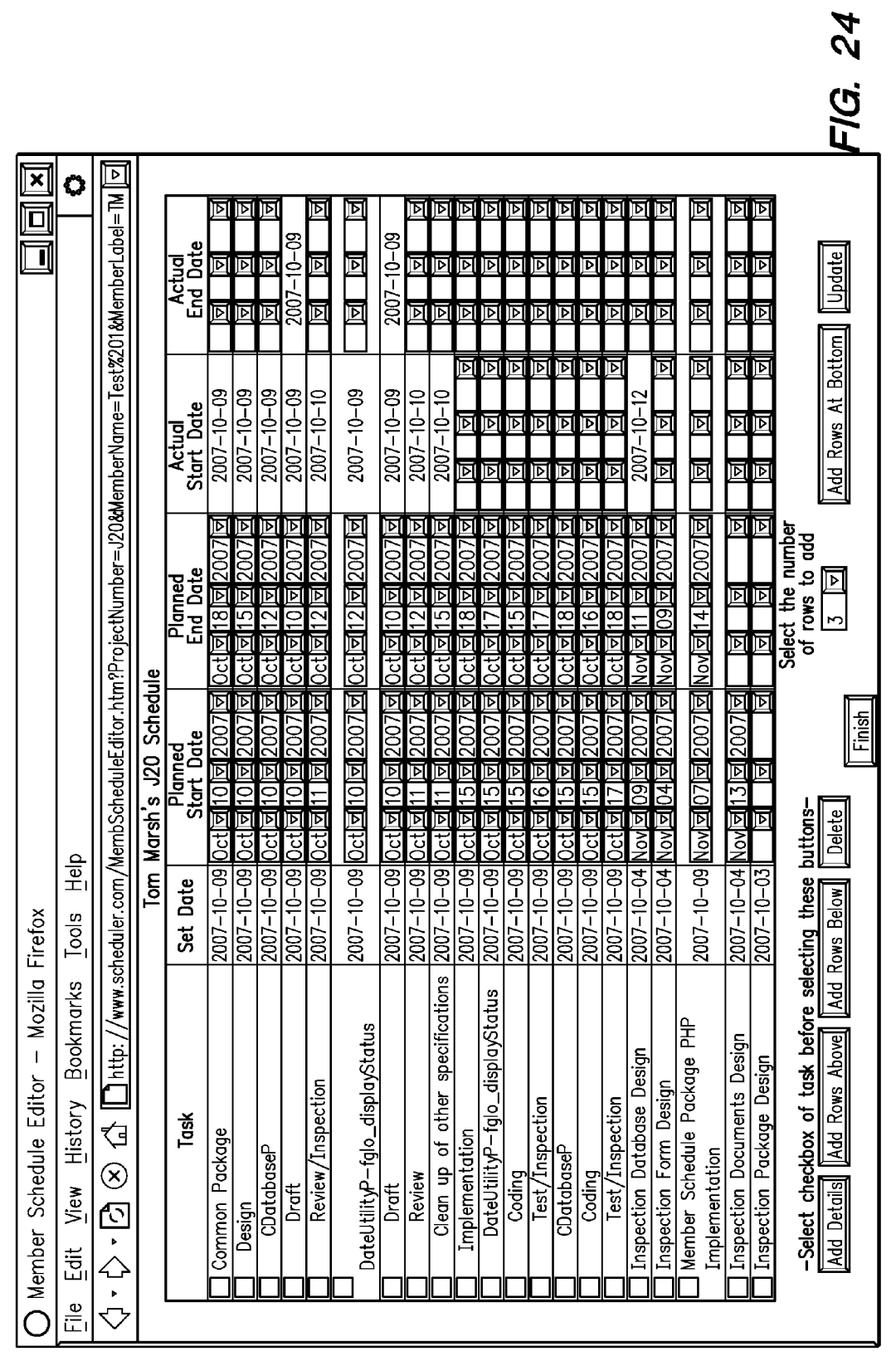

FIG. 22 is a flow diagram 2200 that depicts how the level 1 member tasks that are to be displayed in the member schedule editor, such as the one depicted in FIG. 24, are retrieved from the schedule database, such as the one depicted in FIG. 9. The member schedule editor displays only uncompleted level 1 member tasks. Tasks may be displayed in a particular manner, depending upon a particular implementation, to improve the user experience. For example, according to one embodiment of the invention, tasks are displayed in following order— started tasks, planned tasks (both plan start and plan end have been set), planned start only tasks, and unscheduled task (or to-do list tasks).

In step 2202, the database is queried to obtain the uncompleted level 1 member tasks. A SELECT query to obtain the uncompleted level 1 tasks may use an ORDER BY clause to organize the tasks in the order described using nDateState of Level1MemberTask. An example query to obtain the uncompleted level 1 tasks for project "J20" and project member "TM" is "SELECT*FROM Level1MemberTask WHERE sProjectNumber='J20' AND sMemberLabel='TM' AND nDateState<4 ORDER BY nDateState DESC, actualStart, planEnd, planStart, setDate ASC". The condition that nDateState<4 prevents the completed tasks from being obtained. Ordering in descending order of nDateState obtains all tasks with an nDateState value of 3 first, followed by values of 2, 1, and 0.

After querying the database for the level 1 tasks, in step 2204 the database records for the level 1 tasks that satisfy the query are received. In step 2206, a determination is made whether there are any remaining level 1 member tasks to be processed. If so, then in step 2208 the next level 1 task is displayed in the editor. After the level 1 task is displayed, in step 2210 the subtasks of the level 1 task are displayed in the editor. The process to display the subtasks in the editor is depicted in the flow diagram of FIG. 23 and described in more detail hereinafter. After displaying the subtasks in the editor, control returns to step 2206 and a determination is again made whether there are any remaining level 1 member tasks to be processed. If so, then steps 2208 and 2210 are performed for the next level 1 task. If there are no remaining level 1 tasks to be processed, then the editor contains the display of all the tasks and the process is complete in step 2212.

Figure 23:
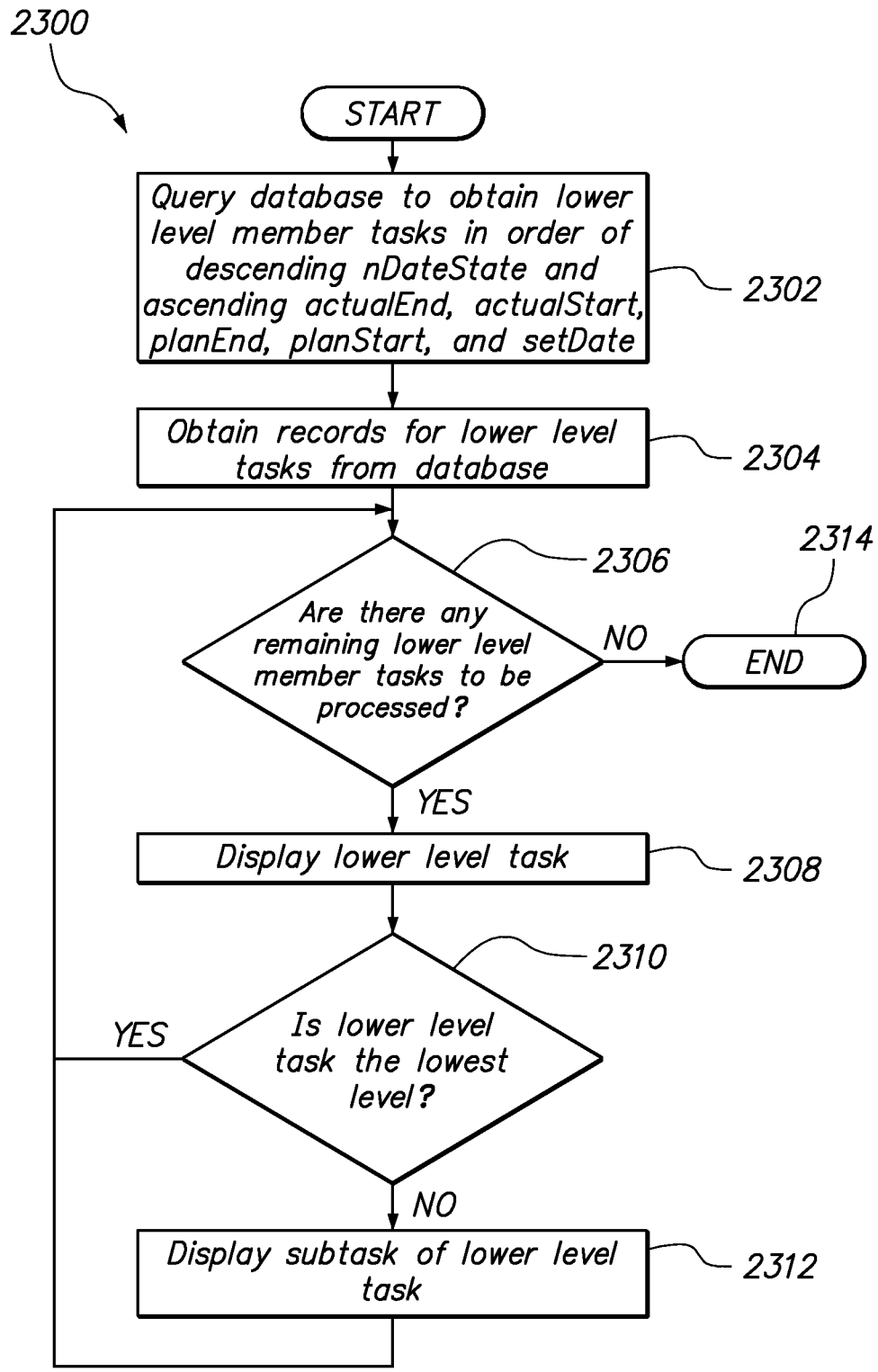
FIG. 23 is a flow diagram that depicts how lower level member tasks that are to be displayed in the member schedule editor are obtained from the schedule database.

FIG. 23 is a flow diagram 2300 that depicts how the lower level member tasks (level 2, 3, and 4) that are to be displayed in the member schedule editor, such as the one depicted in FIG. 24, are obtained from the schedule database, such as the one depicted in FIG. 9. Unlike level 1 member tasks, the member schedule editor displays completed lower level tasks since it is helpful for users to see all the lower level tasks associated with the parent tasks. Lower level tasks may be displayed in a particular manner, depending upon a particular implementation, to improve the user experience. For example, according to one embodiment of the invention, lower level tasks are displayed in following order—completed tasks, started tasks, planned tasks (both plan start and plan end have been set), planned start only tasks, and unscheduled task (or to-do list tasks).

In step 2302, the database is queried to obtain the lower level member tasks. A SELECT query to obtain the lower level tasks may use an ORDER BY clause to organize the tasks in the order described using nDateState of LevelXXXMemberTask (where the value of XXX is 2, 3, or 4). An example query to obtain the lower level tasks for project "J20", level 3 tasks, and parent task id "101" is "SELECT*FROM Level3MemberTask WHERE sProjectNumber='J20' AND nLevel2TaskID=101 ORDER BY nDateState DESC, actualEnd, actualStart, planEnd, planStart, setDate ASC".

After querying the database for the lower level tasks, in step 2304, the database records for the lower level tasks that satisfy the query are received. In step 2306, a determination is made whether there are any remaining lower level member tasks to be processed. If so, then in step 2308, the next lower level member task is displayed in the editor. After the lower level task is displayed, in step 2310, a determination is made whether the task level is the lowest task level (meaning there are no subtasks for task at the lowest level). If the task level is at its lowest level, then control returns to step 2306 and a determination is again made whether there are any remaining lower level member tasks to be processed. If so, then steps 2308 to 2312 are performed for the next lower level task. If the task level is not at its lowest level, then in step 2312, the subtasks of the lower level task are displayed in the member schedule editor. The process to display the subtasks in the member schedule editor for the lower level task repeats the entire process of flow diagram 2300. After displaying the subtasks in the member schedule editor, the next lower level task is obtained for displaying in the member schedule editor.

If, in step 2306, there are no remaining lower level tasks to be processed, then the process is complete in step 2314. Although embodiments of the invention are depicted in the figures and described herein in the context of lower level tasks up to level 4, the invention is not limited to any particular number of lower level tasks and any number of lower level tasks may be used.

FIG. 24 depicts an example member schedule editor. Note the organization of the level 1 tasks. Started tasks (Common Package and Inspection Database Design) appear first and are ordered by ascending actual start dates. Planned tasks (Inspection Form Design and Member Schedule Package PHP Implementation) follow the started task and are ordered by ascending planned end dates. The planned start only tasks (Inspection Documents Design) follow the planned tasks and are ordered by ascending planned start dates. The unscheduled tasks (Inspection Package Design) follow the planned start only tasks and are ordered by ascending set dates. The same ordering is true for the lower level tasks except that completed tasks are included. For example, the level 3 tasks under CDatabaseP of Design are Draft and Review/Inspection. The completed task Draft appears before the started task Review/Inspection.

Figure 25:
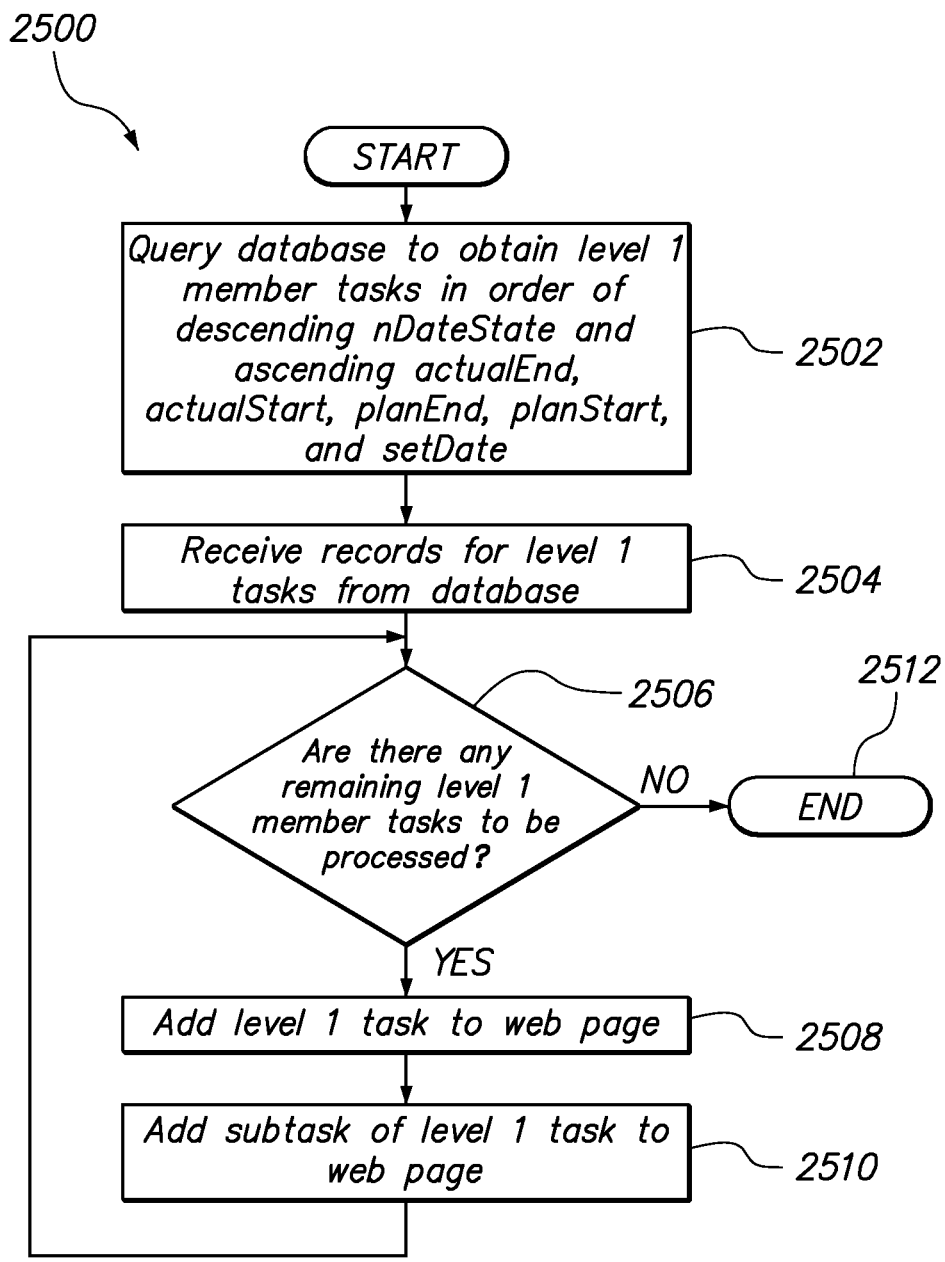
FIG. 25 is a flow diagram that depicts how level 1 member tasks to be displayed in the member schedule web page are obtained from the schedule database.
Figure 27:
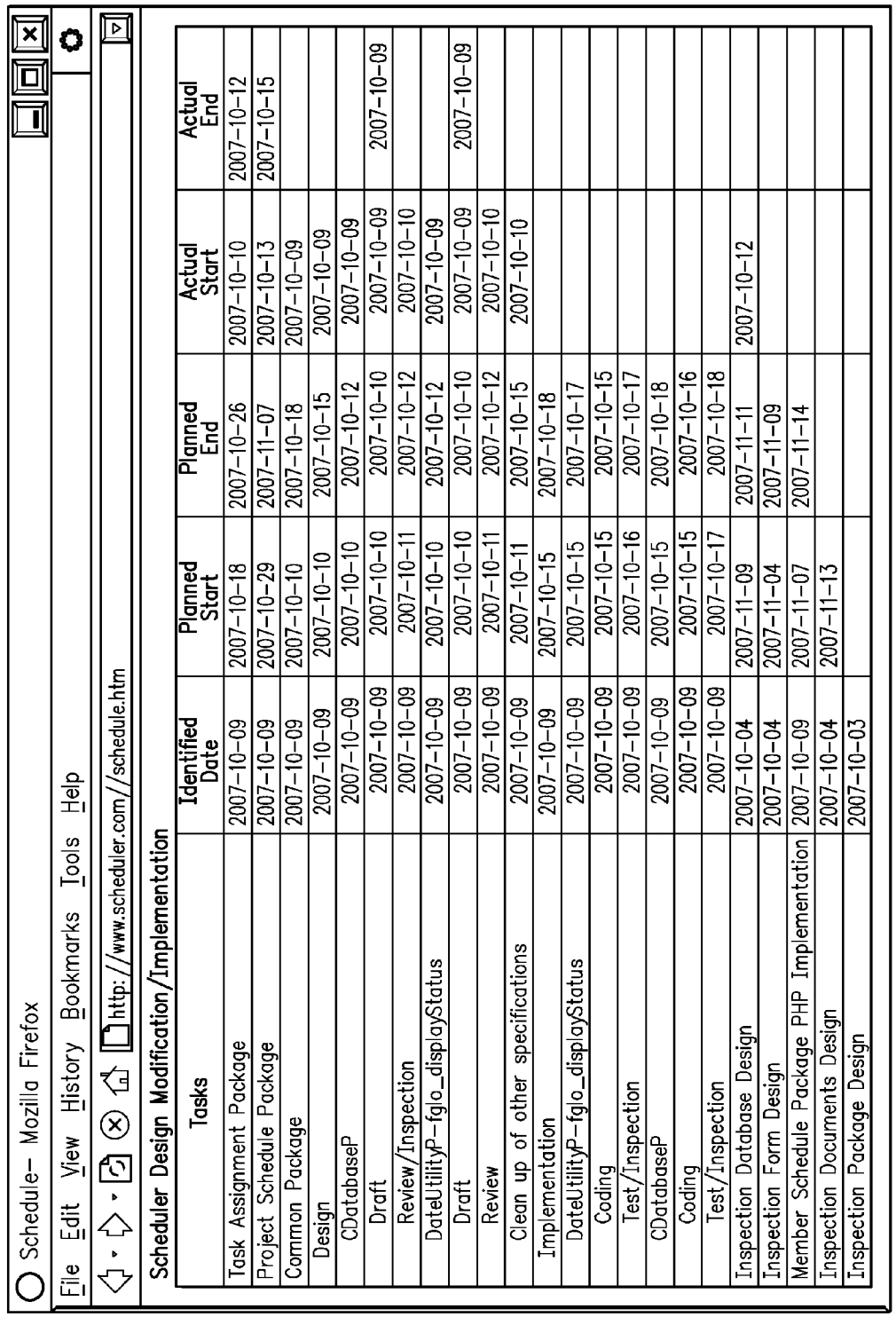
FIG. 27 depicts an example member schedule web page.

FIG. 25 is a flow diagram 2500 that depicts how the level 1 member tasks to be displayed in the member schedule web page, such as the one depicted in FIG. 27, are obtained from the schedule database, such as the one depicted in FIG. 9. The member schedule web page displays all the member tasks. Member tasks may be displayed in a particular manner, depending upon a particular implementation, to improve the user experience. For example, according to one embodiment of the invention, member tasks are displayed in following order—completed tasks, started tasks, planned tasks (both plan start and plan end have been set), planned start only tasks, and unscheduled task (or to-do list tasks).

In step 2502, the database is queried to obtain the level 1 member tasks. A SELECT query to obtain the level 1 tasks may use the ORDER BY clause to organize the tasks in the order described using nDateState of Level1MemberTask. A sample query to obtain the level 1 tasks for project "J20" and project member "TM" is "SELECT*FROM Level1MemberTask WHERE sProjectNumber='J20' AND sMemberLabel='TM' ORDER BY nDateState DESC, actualStart, planEnd, planStart, setDate ASC".

After querying the database for the level 1 tasks, in step 2504, the database records for the level 1 tasks that satisfy the query are received. In step 2506, a determination is made whether there are any remaining level 1 member tasks to be processed. If so, then in step 2508, the next level 1 task is added to the Web page. After the next level 1 task is added, in step 2510, the subtasks of the level 1 task are added to the Web page. The process to add the subtasks in the web page is depicted in the flow diagram of FIG. 26 and also described in more detail hereinafter. After adding the subtasks to the Web page, control returns to step 2506 and a determination is again made whether there are any remaining level 1 member tasks to be processed. If so, then steps 2508 and 2510 are performed for the next level 1 task. If, in step 2506, a determination is made that there are no remaining level 1 tasks to be processed, then the process is complete in step 2512.

Figure 26:
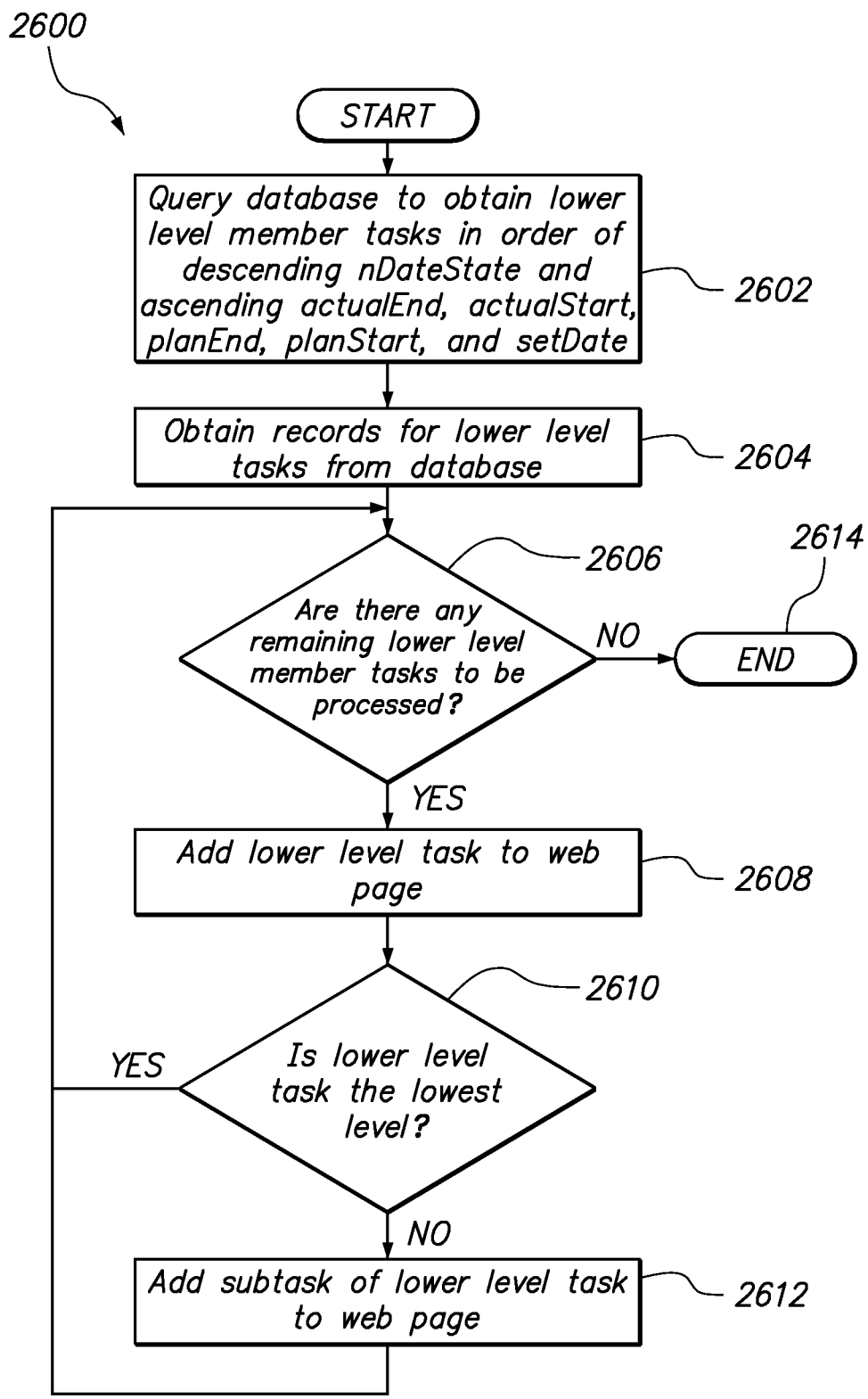
FIG. 26 is a flow diagram that depicts how lower level member tasks that are to be displayed in the member schedule editor are obtained from the schedule database.

FIG. 26 is a flow diagram 2600 that depicts how the lower level member tasks (level 2, 3, and 4) that are to be displayed in the member schedule editor, such as the one depicted in FIG. 27, are obtained from the schedule database, such as the one depicted in FIG. 9. The member schedule web page displays all the lower level tasks associated with the parent tasks. Lower level tasks may be displayed in a particular manner, depending upon a particular implementation, to improve the user experience. For example, according to one embodiment of the invention, lower level tasks are displayed in following order—completed tasks, started tasks, planned tasks (both plan start and plan end have been set), planned start only tasks, and unscheduled task (or to-do list tasks).

In step 2602, the database is queried to obtain the lower level member tasks. A SELECT query to obtain the lower level tasks will use the ORDER BY clause to organize the tasks in the order described using nDateState of LevelXXXMemberTask (where XXX is 2, 3, or 4). An example query to obtain the lower level tasks for project "J20", level 2 tasks, and parent task id "121" is "SELECT*FROM Level2MemberTask WHERE sProjectNumber='J20' AND nLevel1TaskID=121 ORDER BY nDateState DESC, actualEnd, actualStart, planEnd, planStart, setDate ASC".

After querying the database for the lower level tasks, in step 2604, the database records for the lower level tasks that satisfy the query are received. In step 2606, a determination is made whether there are any remaining lower level member tasks to be processed. If so, then in step 2608, the next lower level task is added to the Web page. After the next lower level task is added to the Web page, in step 2610, a determination is made whether the task level is the lowest task level (meaning there are no subtasks for task at the lowest level). If the task level is at its lowest level, then control returns to step 2606 and a determination is again made whether there are any remaining lower level member tasks to be processed. If so, then steps 2608 to 2612 are performed for the next lower level task. If the task level is not at its lowest level, then in step 2612, the subtasks of the lower level task are added to the Web page. The process to add the subtasks to the Web page for the lower level task repeats the entire process of flow diagram 2600. If, in step 2606, there are no remaining lower level tasks to be processed, then the process is complete in step 2614. Although embodiments of the invention are depicted in the figures and described herein in the context of lower level tasks up to level 4, the invention is not limited to any particular number of lower level tasks and any number of lower level tasks may be used.

FIG. 27 depicts an example member schedule web page. Note the organization of the level 1 tasks. Completed tasks (Task Assignment Package and Project Schedule Package) appear first and are ordered by ascending actual end dates. Started tasks (Common Package and Inspection Database Design) follow completed tasks and are ordered by ascending actual start dates. Planned tasks (Inspection Form Design and Member Schedule Package PHP Implementation) follow the started task and are ordered by ascending planned end dates. The planned start only tasks (Inspection Documents Design) follow the planned tasks and are ordered by ascending planned start dates. The unscheduled tasks (Inspection Package Design) follow the planned start only tasks and are ordered by ascending set dates. The same ordering is true for the lower level tasks. For example, the level 3 tasks under CDatabaseP of Design are Draft and Review/Inspection. The completed task Draft appears before the started task Review/Inspection. Using the nDateState field obtains the tasks in the desired order and reduces the number of queries required to obtain the data.

FIG. 28 depicts an example meeting login web page that allows a project member to log on to one of the meeting forms (inspection, discussion, general). The member selects one of the meeting types and enters the necessary information needed for the meeting form such as the Project Number and Originator for the inspection meeting form. The possible selections for Project Number are obtained from the ProjectInformation table of the ProjectTeam database where only Project Number with nProjectStatus of 0 or 1 are obtained. The possible selections for the Originator are obtained from the MemberInformation table of the ProjectTeam database.

For each Project Number selected, the possible Originator selection is updated for the Project Number. When the information is submitted, the appropriate meeting form is displayed.

FIG. 29 depicts an example Inspection Meeting Form. The moderator enters information related to the inspection (within the gray boxed area) such as inspection material to inspect, the inspectors, the inspector's preparation time, meeting type, and inspection type. By selecting on the Start Inspection Meeting button, the defect tables appear at the bottom of the form for each inspection material. As each inspection material is inspected, the moderator enters defect information as defects are discovered. Once the inspection meeting is finished, the moderator selects the Submit button and all the inspection information is passed to the server where the inspection information is added to the Inspection database and Web pages for the inspection meeting, inspection index, and inspection statistics are generated.

FIG. 30 depicts an example Inspection Meeting document generated after an inspection meeting session. The document includes all information related to the inspection. nInspectionDocContId is used as the record control number of the inspection as well as the filename, q6-rj20-ii-004.htm, of the document.

FIG. 31 depicts an example Inspection Index document generated after an inspection meeting session. The index includes link to all the Inspection Meeting documents for a project (J20 is the project in this index). The index shows the results of the inspection along with the number of minor and major defect discovered. A link is also provided to the Inspection Statistics Report shown in FIG. 32.

FIG. 32 depicts an example Inspection Statistic Report generated after an inspection meeting session. From all the data collected for the inspections of a project stored in the database, statistical data may be calculated for all the inspections after each inspection meeting session. Statistics are determined for the duration of the inspection meeting, the average preparation time spent by the inspectors, and the number of minor and major defects. The statistics of the inspections is further divided into the inspection type (all inspections-6, documents-4, and code-2).

FIGS. 33 through 36 depict the class diagrams of the packages of FIG. 13 corresponding to the InspectionMeetingProcessor package of FIG. 12. These figures depict example class designs corresponding to the four packages for displaying the inspection meeting form and posting the information from the form. The XXXPHPPreZZZ package of FIG. 13 obtains task information (inspection material) and member information from the database to be used for the initial display of the inspection meeting form in the server processor of FIG. 6. The XXXJavaScript package of FIG. 13 displays, manages, and maintains the inspection meeting form in the client processor of FIG. 6. The XXXPHPPostZZZ package of FIG. 13 posts all the inspection meeting information from the meeting session of the client processor into the database of the server processor. The XXXWebPageGenerator package FIG. 13 obtains the inspection meeting information from the database and/or inspection meeting form to generate the appropriate web pages that will display the inspection meeting information. These figures depict the similarity in the design of the InspectionMeetingProcessor package with the four packages among the three task editors. Although the editors perform different tasks, the meeting form has a similar design.

Figure 33:
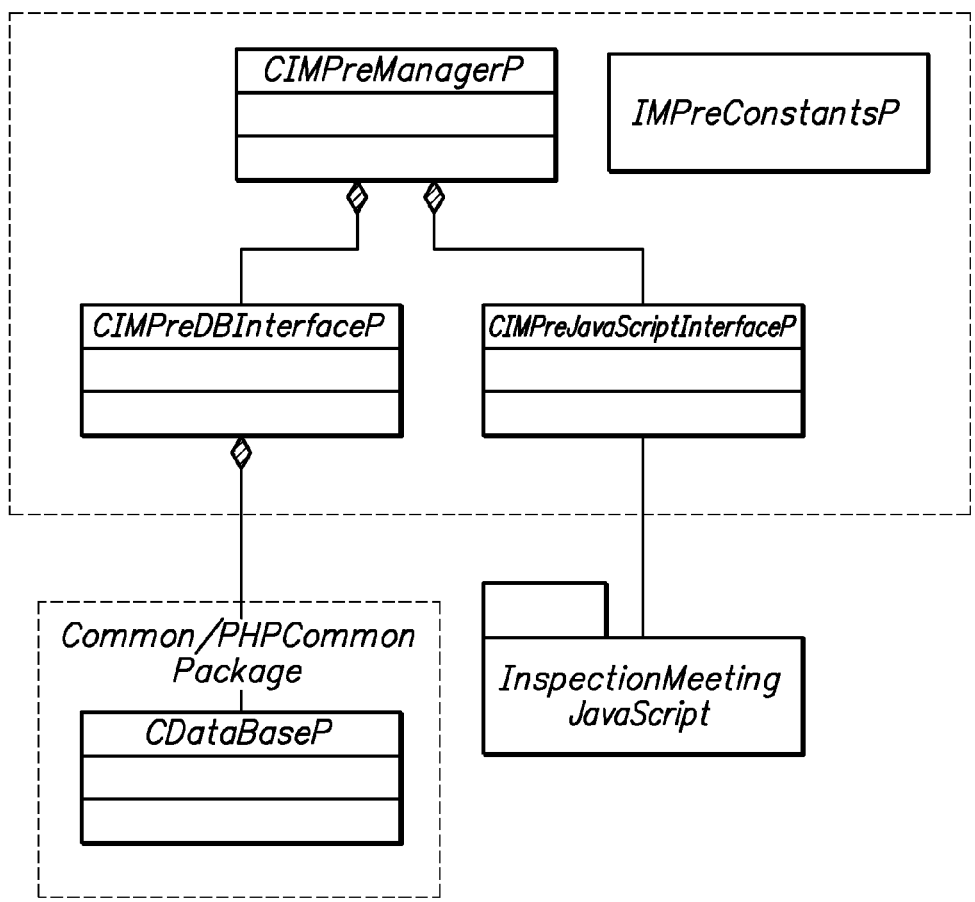
FIG. 33 depicts an example class diagram of the InspectionMeetingPHPPreForm package (e.g., XXXPHPPreZZZ of FIG. 13).

FIG. 33 depicts an example class diagram of the InspectionMeetingPHPPreForm package (e.g., XXXPHPPreZZZ of FIG. 13). The InspectionMeetingPHPPreForm package generates the Javascript interface used for the display of the initial inspection meeting form in the web browser of the client processor. The CIMPreManagerP class provides an interface for the InspectionMeetingPHPPreForm package and manages the classes in the InspectionMeetingPHPPreForm package to generate the Javascript. The CIMPreDBInterfaceP class accesses information from the database that will be displayed in the inspection form including inspection material and member labels. CIMPreDBInterfaceP generates the appropriate database queries to obtain the desired information for display. CIMPreDBInterfaceP interfaces with the CDataBaseP class to access the databases. CIMPreDBInterfaceP uses CDataBaseP to access the schedule database to obtain tasks that are considered inspection material. The CIMPreJavaScriptInterface class generates the sequence of Javascript that is used to create the initial inspection meeting form in the web browser and will interface with the InspectionMeetingJavaScript package of FIG. 34.

Figure 34:
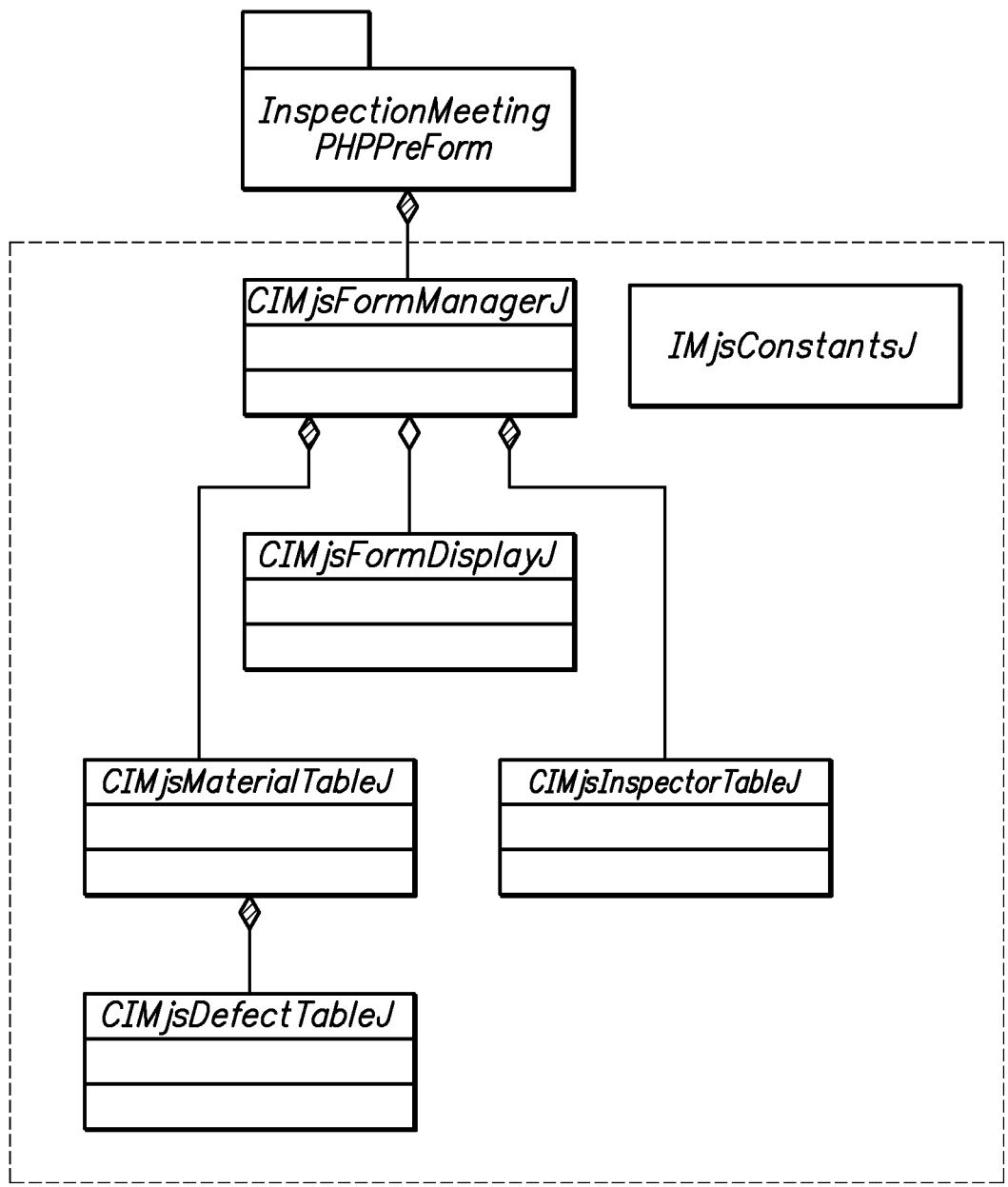
FIG. 34 depicts an example class diagram of the InspectionMeetingJavaScript package (e.g., XXXJavaScript of FIG. 13).

FIG. 34 depicts an example class diagram of the InspectionMeetingJavaScript package (e.g., XXXJavaScript of FIG. 13). The InspectionMeetingJavaScript package manages the inspection meeting form in the web browser of the client processor. The CIMjsFormManagerJ class provides the interface for this package and creates the web page and form for the inspection meeting. The CIMjsFormDisplayJ class creates the initial display of the inspection form with the information about the inspection material and member label obtained from the InspectionMeetingPHPPreForm package. The CIMjsMaterialTableJ class initializes and manages the table in the inspection meeting form for adding and selecting inspection material for inspection. The CIMjsInspectorTableJ class initializes and manages the table in the inspection meeting form for adding and selecting inspectors for the inspection. The CIMjsDefectTableJ class initializes and manages the table in the inspection meeting form for adding defects for each inspection material in the inspection.

Figure 35:
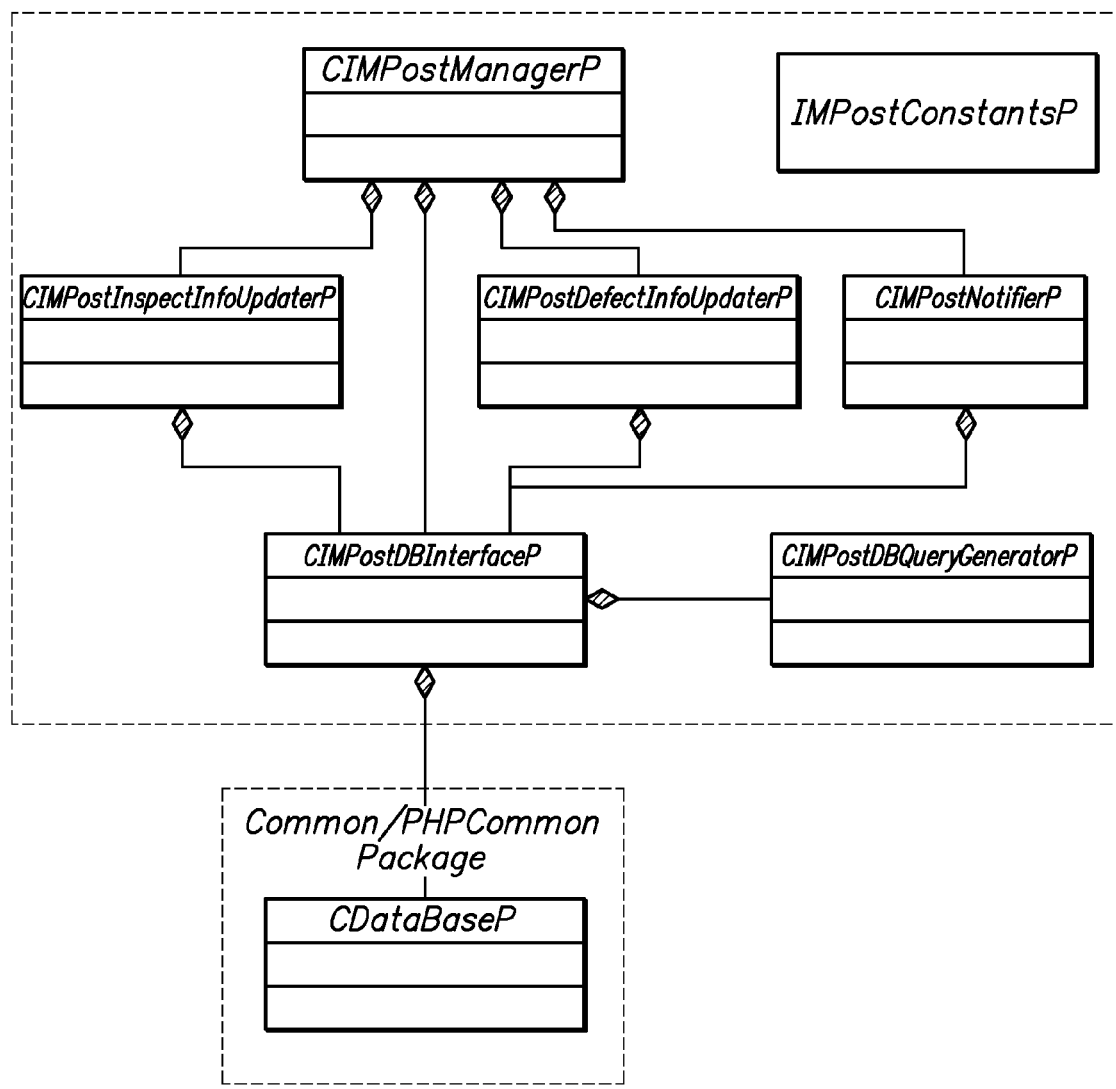
FIG. 35 depicts an example class diagram of the InspectionMeetingPHPPostForm package (e.g., XXXPHPPostZZZ of FIG. 13).

FIG. 35 depicts an example class diagram of the InspectionMeetingPHPPostForm package (e.g., XXXPHPPostZZZ of FIG. 13). The CIMPostManagerP class provides the interface for this package and manages all other classes in the package. The CIMPostInspectInfoUpdaterP class adds the inspection meeting information (inspection material, originator, moderator, inspectors and time spent, etc) to the database. The CIMPostDefectInfoUpdaterP class adds the defect information for the inspection material (location, description, class, etc) to the database. The CIMPostNotifierP class emails a message to the moderator to remind him/her that he/she needs to verify that the defects in the inspection material are corrected before the inspection material is accepted. The message is emailed only if the results of the inspection are conditional. However, other conditions are possible for which a message is emailed. The class CIMPostDBInterfaceP provides an interface for the classes to obtain information and update information in the database. The CIMPostDBQueryGeneratorP class creates the SQL database queries for CIMPostDBInterfaceP. CIMPostDBInterfaceP interfaces with the CDataBaseP class to access the database. CDataBase is used to access the ProjectTeam database to obtain the project status and the email address of the moderator and to access the inspection database to add the inspection information.

Figure 36:
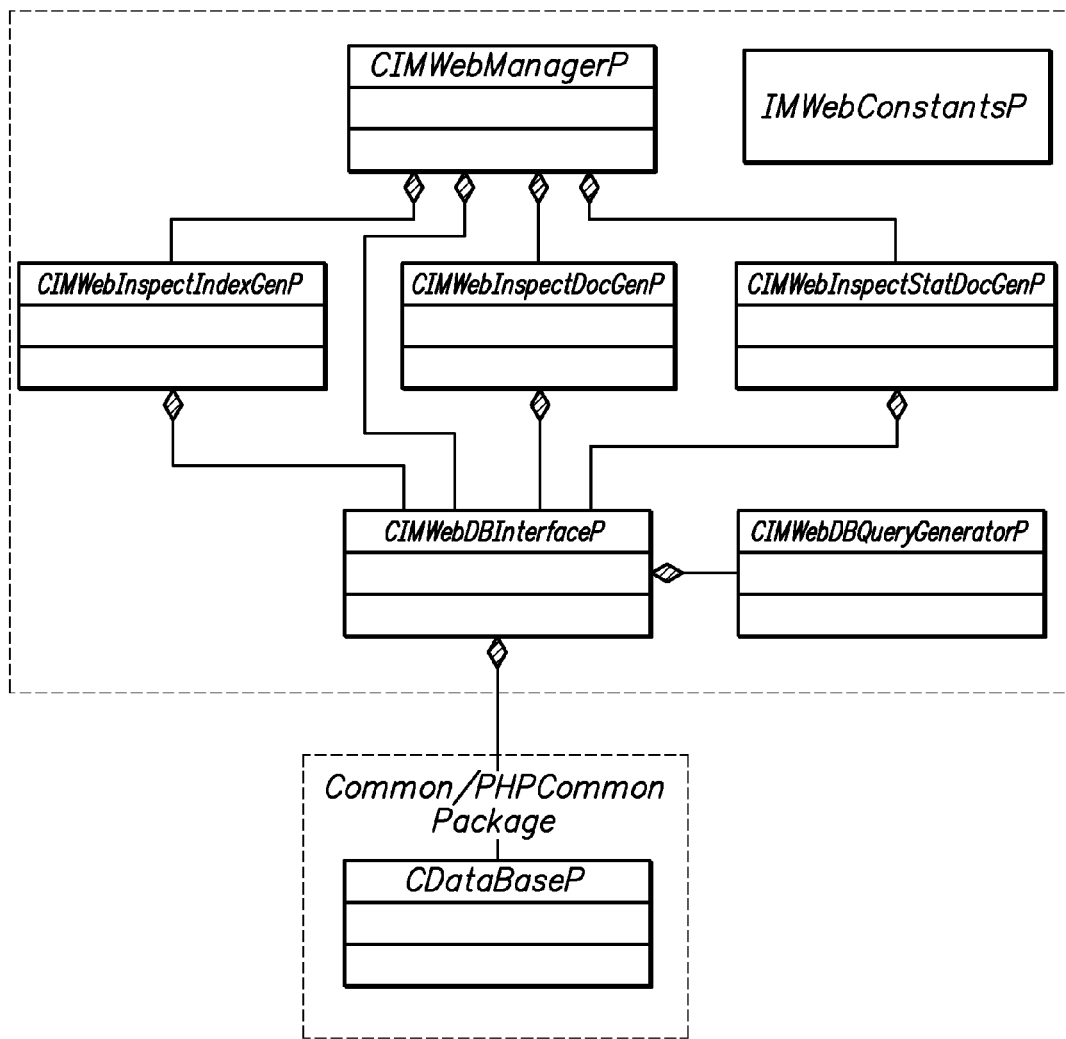
FIG. 36 depicts an example class diagram of the InspectionMeetingWebPageGenerator package (e.g., XXXWebPageGenerator of FIG. 13).

FIG. 36 depicts an example class diagram of the InspectionMeetingWebPageGenerator package (e.g., XXXWebPageGenerator of FIG. 13). The CIMWebManagerP class provides the interface for this package to generate the inspection web pages. The CIMWebInspectIndexGenP class creates the inspection index web page which provides an index that links to all the inspection meeting documents for a project. The CIMWebInspectDocGenP class creates the inspection meeting document for the current inspection meeting that was just completed. The CIMWebInspectStatDocGenP class creates the inspection statistics report for all the inspection meeting session of the project including the most current inspection meeting. The class CIMWebDBInterfaceP provides an interface for the classes to obtain information in the database. The CIMWebDBQueryGeneratorP class creates the SQL database queries for CIMWebDBInterfaceP. CIMWebDBInterfaceP interfaces with the CDataBaseP class to access the database. CDataBase is used to access the ProjectTeam database to obtain the project directory of the project and to access the inspection database to obtain the inspection information used for the web pages.

Figure 37:
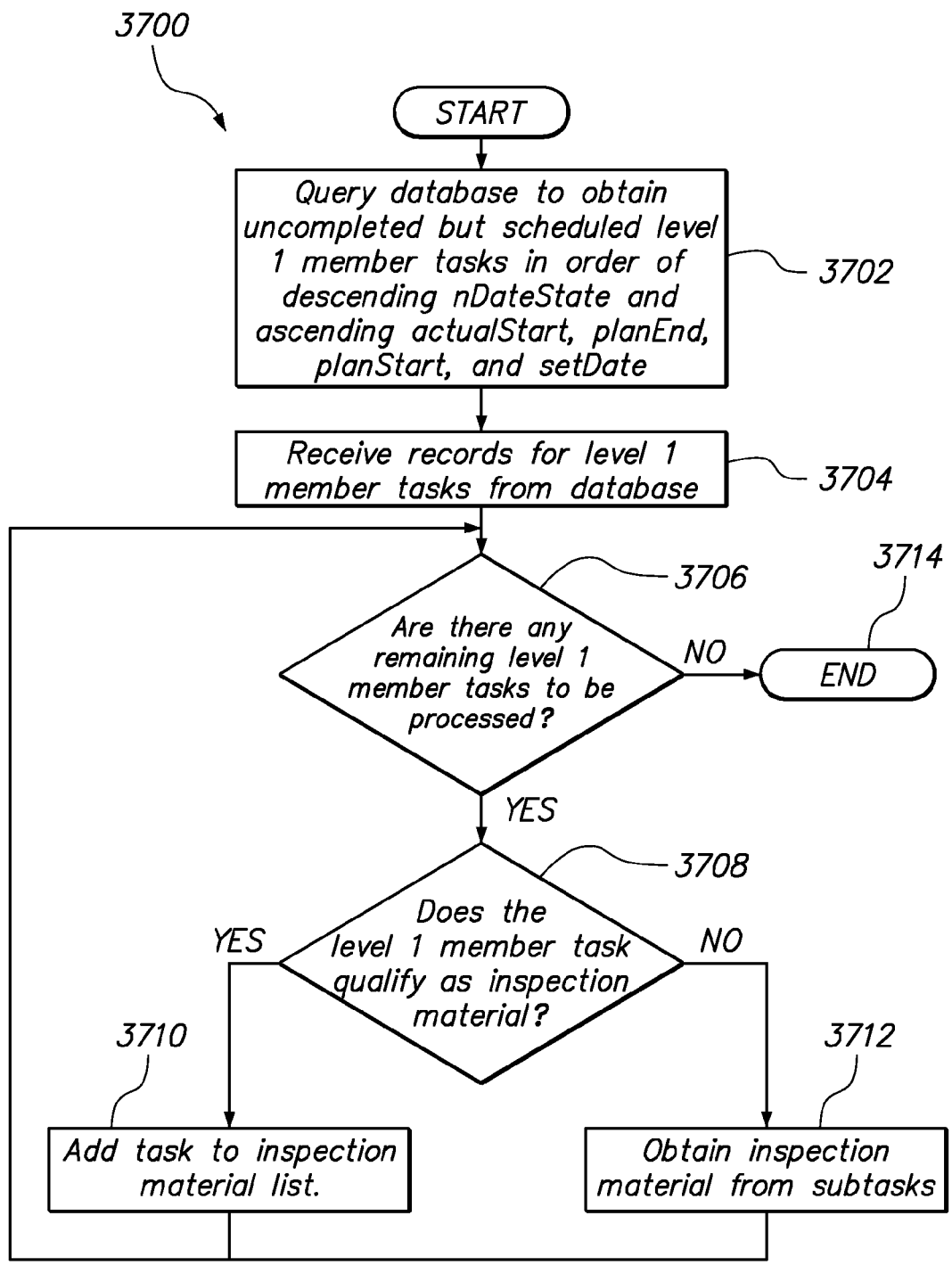
FIG. 37 is a flow diagram that depicts an approach for determining the inspection material from level 1 tasks in the schedule database that is used in the inspection meeting form.

FIG. 37 is a flow diagram 3700 that depicts an approach for determining the inspection material from level 1 tasks in the schedule database that will be used in the inspection meeting form. A level 1 task qualifies as inspection material if it is a project task, if it is an uncompleted but scheduled task (nDateState is between 1 and 3), and it either has no subtasks or one of the subtasks is a test, review or inspection subtask. Other conditions can be added or used to determine if the level 1 tasks qualify as inspection material. A level 1 task is a project task if the value of nProjectTaskID in the Level1MemberTask table of the schedule database is greater than 0. As an example from the Level1MemberTask table of FIG. 19A, "Inspection Form Design" having nProjectTaskID of 70 and nLevel1TaskID of 91 is a project task whereas "Printer Analysis Report" having nProjectTaskID of 0 and nLevel1TaskID of 61 is not a project task.

An example of a level 1 task that qualifies as inspection material from the Level1MemberTask table of FIG. 19A is "Inspection Form Design," which is a project task, is an uncompleted task having an nDateState value of 2 (planned task), and has no subtasks (since nLevel1TaskID of 91 for this task does not exists in Level2MemberTask table of FIG. 19B in the nLevel1TaskID field). "Project Status Preparation" does not qualify as inspection material since it is not a project task having nProjectTaskID of 0. "Task Assignment Package" having nLevel1TaskID of 131 does not qualify as inspection material since it is a completed task having an nDateState value of 4. "Inspection Package Design" having nLevel1TaskID of 111 does not qualify as inspection material since it is an unscheduled task having nDateState value of 0. "Architecture/Database" having nLevel1TaskID of 62 does qualify as inspection material since it is a project task having nProjectTaskID of 50, is not a completed task having nDateState value of 3, and having subtasks in Level2MemberTask table of "Draft" having nLevel2TaskID of 72 and of "Review/Inspection" having nLevel2TaskID of 82. The documents table in the inspection meeting form contains select element that lets the user select the inspection material to inspect. The select element contains all tasks that are considered inspection material at any level.

In step 3702, the database is queried to obtain uncompleted but scheduled level 1 member tasks in order of descending nDateState and ascending actualStart, planEnd, planStart and setDate. To retrieve all the level 1 tasks that are considered inspection material, a SELECT query may use the WHERE clause to obtain only project tasks that are not completed but scheduled using nDateState of Level1Member task. The query may also use the ORDER BY clause to organize the tasks in the order of started tasks, planned tasks, and planned start-only tasks using nDateState of Level1MemberTask. An example query to obtain the level 1 tasks for potential inspection material for project "J20" and project member "TM" is "SELECT*FROM Level1MemberTask WHERE sProjectNumber='J20' AND sMemberLabel='TM' AND nDateState>0 AND nDateState<4 ORDER BY nDateState DESC, actualStart, planEnd, planStart, setDate ASC".

Figure 38:
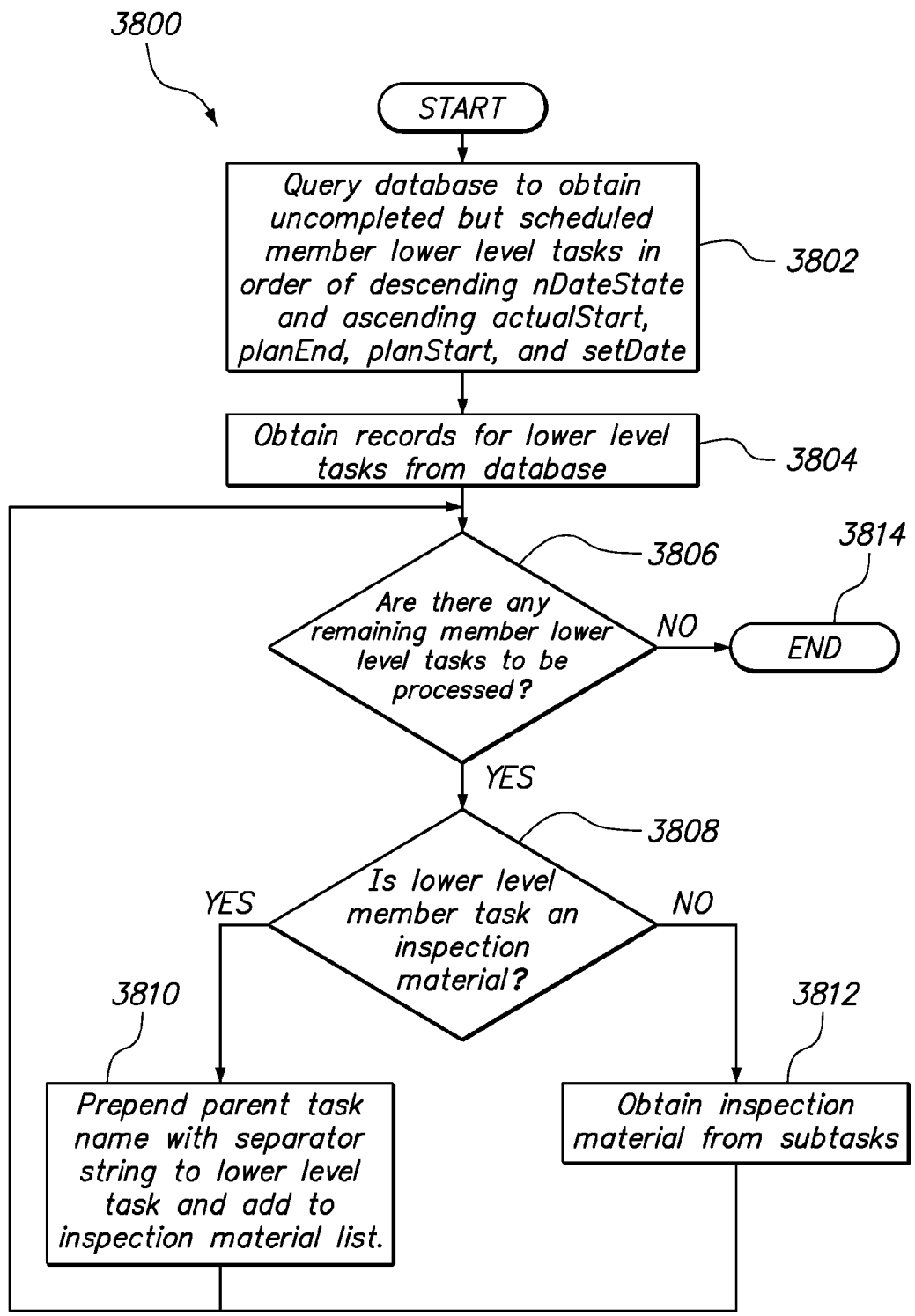
FIG. 38 is a flow diagram that depicts an approach for determining inspection material for lower level tasks.

After querying the database for the level 1 tasks, in step 3704, the records for the level 1 tasks that satisfy the query are received. In step 3706, a determination is made whether there are any remaining level 1 member tasks to be processed. If so, then in step 3708 a determination is made whether the next level 1 task qualifies as inspection material. If the level 1 task qualifies as inspection material, then in step 3710, the task is added to the list of inspection material and the next level 1 task is obtained. If the task is not inspection material, then in step 3712, a determination is made whether any of its subtasks qualify as inspection material. The process for obtaining inspection material from subtasks is depicted in FIG. 38 and described in more detail hereinafter. After obtaining the inspection material from the subtasks, control returns to step 3706 and a determination is again made whether there are any remaining level 1 member tasks to be processed. If so, then steps 3708, 3710 and 3712 are performed for the next level 1 member task. If there are no remaining level 1 tasks to be processed, then process is complete in step 3714 and all the inspection material have been obtained FIG. 38 is a flow diagram 3800 that depicts an approach for determining inspection material for lower level tasks. Since only lower level tasks of level 1 tasks that are project tasks are considered, all lower level tasks are associated with project tasks. Just like level 1 tasks, lower level tasks qualify as inspection material if it is an uncompleted but scheduled task (nDateState is between 1 and 3) and it either has no subtask or one of the subtask contains test, review, or inspection or it is the lowest level task. Other conditions can be added or used to determine if the lower level tasks qualify as inspection material.

In step 3802, the database is queried to obtain uncompleted but scheduled lower level member tasks in order of descending nDateState and ascending actualStart, planEnd, planStart and setDate. To obtain all the lower level tasks that are considered inspection material, a SELECT query may use the WHERE clause to obtain only tasks that are not completed but scheduled using nDateState of LevelXXXMember where XXX is 2, 3, or 4. The query may also use the ORDER BY clause to organize the tasks in the order of started tasks, planned tasks, and planned start-only tasks using nDateState of LevelXXXMemberTask. An example query to obtain the level 3 tasks for potential inspection material for project "J20" and parent task nLevel2TaskID of "91" is "SELECT*FROM Level3MemberTask WHERE sProjectNumber='J20' AND nLevel2TaskID=91 AND nDateState>0 AND nDateState<4 ORDER BY nDateState DESC, actualStart, planEnd, planStart, setDate ASC".

After querying the database for the lower level tasks, in step 3804, the database records for the lower level tasks that satisfy the query are received. In step 3806, a determination is made whether there are any remaining lower level member tasks to be processed. If so, then in step 3808, a determination is made whether the next lower level task qualifies as inspection material. If the next lower level task qualifies as inspection material, then in step 3810, the task is added to the list of inspection material with the parent task name and a separator string prepended to the name of the lower level task and the next lower level task is obtained. The separator may be any string that will clearly distinguish the names of the parent task and lower level task such as "::" or "@@@@@". If the task does not qualify as an inspection material, then in step 3812, a determination is made if inspection material can be obtained from the subtasks of the current lower level task. The process for obtaining inspection material from subtasks repeats the process of FIG. 38. Control then returns to step 3806 and a determination is again made whether there are any remaining lower level member tasks to be processed. All remaining lower level member tasks are processed according to steps 3808, 3810 and 3812. If there are no additional lower level tasks, then the process is complete in step 3814.

The purpose of prepending the parent task name and separator to the lower level task name is to avoid having the same name in the inspection material list. It is possible to have more than one task having the same name so that adding the parent task name and separator reduces the chance of the same name in the list. As an example from the Level3MemberTask table of FIG. 19C to obtain all inspection material from the level 3 tasks, "CDatabaseP" having nLevel3TaskID of 11, "DateUtilityP-fglo_displayStatus" having nLevel3TaskID of 21, and "Clean up of other specifications" having nLevel3TaskID of 31 are all inspection material since "CDatabaseP" and "DateUtilityP-fglo_displayStatus" have inspection as its lower level task in Level4MemberTask table of FIG. 19D and "Clean up of other specifications" has no subtasks. The parent of these three tasks in Level2MemberTask table of 19B is "Design" having nLevel2TaskID of 91. Therefore, the inspection material name that will be displayed in the inspection meeting from for the three are "Design::CDatabaseP", "Design::DateUtilityP-fglo_displayStatus", and "Design:: Clean up of other specifications".

FIG. 39 depicts the New Project Setup Form that allows a user to setup the new project. Initially the form will contain the name for the new project and the member information of all members of the previous project (assuming most if not all the project members remain the same). This information corresponds to the latest project in the ProjectTeam database. The user must enter in the directory and title for the new project. The user can update member information and add new members. When the user submits the form, the project and member information is updated in the ProjectTeam database. Directories and files are created for the project that allow web access to the various documents in the project such as project schedule, task assignments, inspection meetings, change reports, members home page, and member's schedule. The form automates the process of creating and setting up the directories and files for the new project. Directories and files must be set with the appropriate owner, group, and permissions. With incorrect owner, group, or permissions, the task editors and inspection meeting forms may not be able to generate the appropriate web page. Automating the project setup process avoid the problems encountered when manually setting up the project website by the person responsible for maintaining the website such as not setting the appropriate permissions to the directories. When the appropriate permissions are not set for a directory, web pages generated by the task editors or meeting forms cannot create the web pages for the editors or forms.

Figure 40:
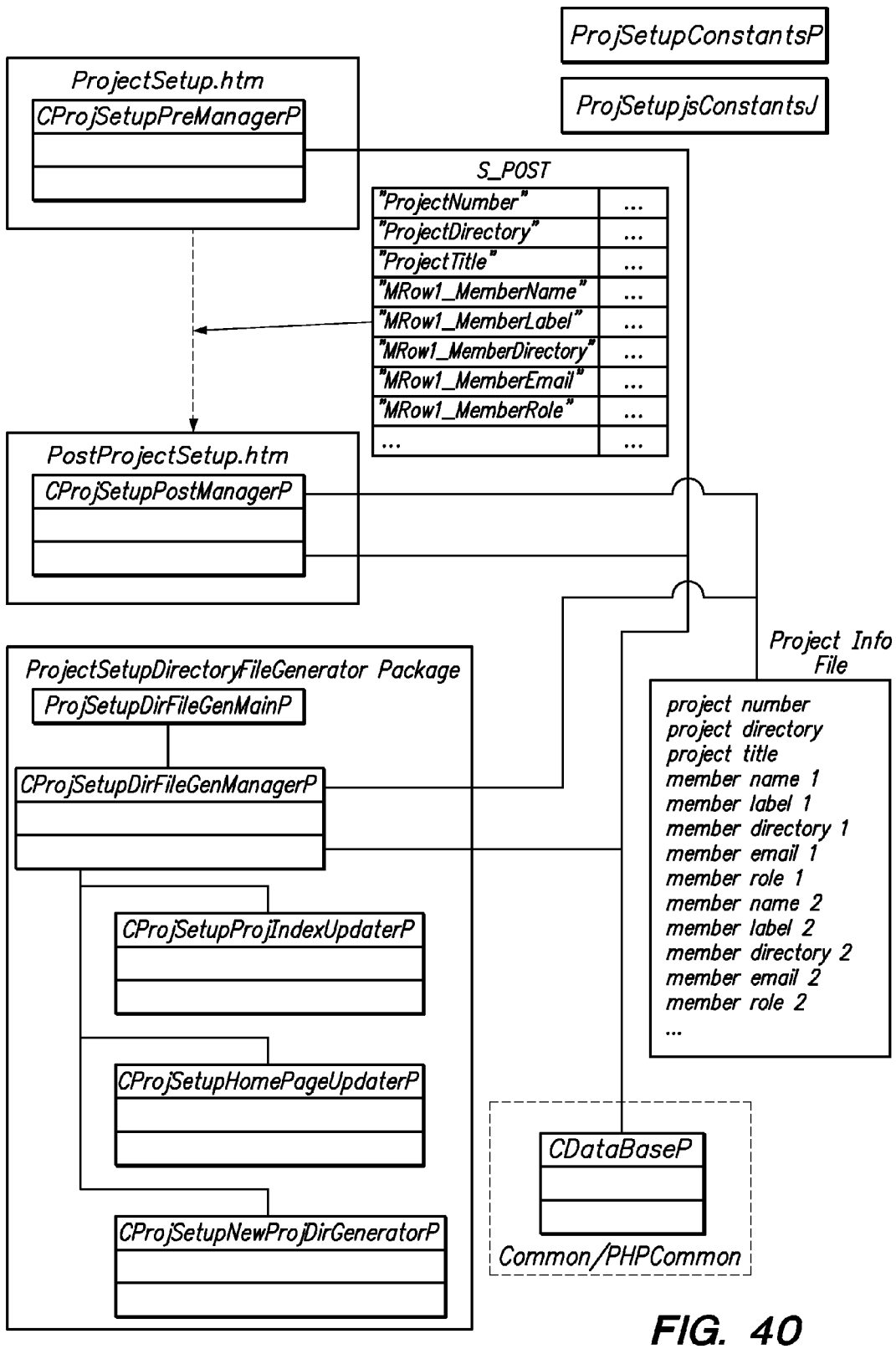
FIG. 40 depicts example components of the ProjectSetupProcessor package depicted in FIG. 12.

FIG. 40 depicts example components of the ProjectSetupProcessor package depicted in FIG. 12. ProjectSetup.htm is the web page that will display the project setup form as shown in FIG. 30. This web page uses the class CProjSetupPreManagerP to obtain information for the initial display of the form including the latest name of the project and the member information for the previous project. The form is posted to web page PostProjectSetup.htm when the form is submitted. $_POST is the information that is passed from ProjectSetup.htm to PostProjectSetup.htm. PostProjectSetup.htm uses the class CProjSetupPostManagerP to write the information in the project setup form to a project info file and to add the new project information to the ProjectTeam database. The ProjectSetupDirectoryFileGenerator package creates the directories and files for the new projects. ProjSetupDirFileGenMainP contains the main program that initiates the creation of the directories and files. The CProjSetupDirFileGenManagerP class manages the classes in the package that creates the various components of the new project setup. The class CProjSetupProjIndexUpdaterP updates the indexes related to the new project. The class CProjSetupHomePageUpdaterP updates the home page files to link to the new project. The class CProjSetupNewProjDirGeneratorP creates the project directories and files for the new project and creates a directory in the members' home page corresponding to the new project. The class updates and creates directories and files to provide access to the web pages of various documents associated with the new project. CProjSetupPreManagerP, CProjSetupPostManagerP, and CProjSetupDirFIleGenManagerP use the CDataBaseP classes that access the ProjectTeam database.

Extensions and Alternatives

Alternative embodiments are described throughout the foregoing description, and in locations that best facilitate understanding the context of the embodiments. Furthermore, the embodiments have been described with reference to specific embodiments thereof. It will, however, be evident that various modifications and changes may be made thereto without departing from any broader concepts. Therefore, the specification and drawings are, accordingly, to be regarded in an illustrative rather than a restrictive sense.

In addition, in this description certain process steps are set forth in a particular order, and alphabetic and alphanumeric labels may be used to identify certain steps. Unless specifically stated in the description, embodiments are not necessarily limited to any particular order of carrying out such steps. In particular, the labels are used merely for convenient identification of steps, and are not intended to specify or require a particular order of carrying out such steps.

Functional implementation of the various inventive embodiments described herein may be implemented equivalently in hardware, software, firmware, and/or other available functional components or building blocks. No specific limitation is intended to a particular device or programmatic sequence. Other variations and embodiments are possible in light of above teachings.

What is claimed is:

1. A computer-implemented method for managing inspections, the computer-implemented method comprising:
generating and storing in a project schedule database schedule data for a plurality of project tasks in a project;
generating and storing in association with the schedule data in the project schedule database, state data that is separate from the schedule data and indicates a current state of one or more of the plurality of project tasks, wherein the current state includes one of the project task is completed, the project task has been started but is not completed, the project task is planned but not started, only a start date is specified for the project task, and the project task is unscheduled;
receiving, at a web server, a request to perform an inspection; and
in response to receiving the request to perform the inspection, one or more computer processors causing:
automatically identifying and selecting, by the web server, one or more project tasks of the plurality of project tasks to be inspection material, wherein automatically identifying and selecting one or more project tasks of the plurality of project tasks to be inspection material includes determining, based upon corresponding state data for at least one project task of the plurality of project tasks, that the at least one project task has a state of started but not completed, planned but not started, or has only a start date specified and the at least one project task has a child project task that is a review, test, or inspection task;

retrieving the inspection material from the project schedule database, wherein the inspection material includes schedule data for the one or more project tasks that are inspection material, and generating an inspection meeting form that identifies at least the inspection material and allows a user to specify at least one or more inspectors, one or more preparation times for the one or more inspectors and one or more attributes of one or more defects that correspond to the inspection, wherein the one or more attributes of the one or more defects include at least location, description and severity; and in response to an indication that the inspection has been completed:

generating an inspection report that identifies at least the one or more inspectors, the inspection material and the one or more attributes of one or more defects that correspond to the inspection, and generating and storing in an inspection index an index entry that references the inspection report, and generating, based upon the inspection index, an inspection index document that includes information about a plurality of inspections that have been completed including the inspection and wherein the inspection index document includes a plurality of links to a plurality of inspection reports for the plurality of inspections, wherein the plurality of links includes a link to the inspection report.

2. The computer-implemented method as recited in claim 1, further comprising generating and including in the inspection material, in association with the schedule data for the one or more project tasks, identification data that identifies the one or more project tasks and child project tasks for the one or more project tasks.

3. The computer-implemented method as recited in claim 1, wherein retrieving the inspection material from the project schedule database is performed by processing a single query against the project schedule database, wherein the single query includes a parameter for the state data.

4. A non-transitory computer-readable medium for managing inspections, the non-transitory computer-readable medium storing instructions which, when processed by one or more processors, causes:

generating and storing in a project schedule database schedule data for a plurality of project tasks in a project;

generating and storing in association with the schedule data in the project schedule database, state data that is separate from the schedule data and indicates a current state of one or more of the plurality of project tasks, wherein the current state includes one of the project task is completed, the project task has been started but is not completed, the project task is planned but not started, only a start date is specified for the project task and the project task is unscheduled;

receiving, at a web server, a request to perform an inspection; and in response to receiving the request to perform the inspection, one or more computer processors causing:

automatically identifying and selecting, by the web server, one or more project tasks of the plurality of project tasks to be inspection material, wherein automatically identifying and selecting one or more project tasks of the plurality of project tasks to be inspection material includes determining, based upon corresponding state data for at least one project task of the plurality of project tasks, that the at least one project task has a state of started but not completed, planned but not started, or has only a start date specified and the at least one project task has a child project task that is a review, test, or inspection task;

retrieving the inspection material from the project schedule database, wherein the inspection material includes schedule data for the one or more project tasks that are inspection material, and generating an inspection meeting form that identifies at least the inspection material and allows a user to specify at least one or more inspectors, one or more preparation times for the one or more inspectors and one or more attributes of one or more defects that correspond to the inspection, wherein the one or more attributes of the one or more defects include at least location, description and severity; and in response to an indication that the inspection has been completed:

generating an inspection report that identifies at least the one or more inspectors, the inspection material and the one or more attributes of one or more defects that correspond to the inspection, generating and storing in an inspection index an index entry that references the inspection report, and generating, based upon the inspection index, an inspection index document that includes information about a plurality of inspections that have been completed including the inspection and wherein the inspection index document includes a plurality of links to a plurality of inspection reports for the plurality of inspections, wherein the plurality of links includes a link to the inspection report.

5. The non-transitory computer-readable medium as recited in claim 4, further comprising additional instructions which, when processed by the one or more processors, causes generating and including in the inspection material, in association with the schedule data for the one or more project tasks, identification data that identifies the one or more project tasks and child project tasks for the one or more project tasks.

6. The non-transitory computer-readable medium as recited in claim 4, wherein retrieving the inspection material from the project schedule database is performed by processing a single query against the project schedule database, wherein the single query includes a parameter for the state data.

7. An apparatus for managing inspections, the apparatus comprising:

one or more processors; and a memory storing instructions which, when processed by one or more processors, causes:

generating and storing in a project schedule database schedule data for a plurality of project tasks in a project;

generating and storing in association with the schedule data in the project schedule database, state data that is separate from the schedule data and indicates a current state of one or more of the plurality of project tasks, wherein the current state includes one of the project task is completed, the project task has been started but is not completed, the project task is planned but not started, only a start date is specified for the project task and the project task is unscheduled;

receiving, at a web server, a request to perform an inspection; and in response to receiving the request to perform the inspection, one or more computer processors causing:

automatically identifying and selecting, by the web server, one or more project tasks of the plurality of project tasks to be inspection material, wherein automatically identifying and selecting one or more project tasks of the plurality of project tasks to be inspection material includes determining, based upon corresponding state data for at least one project task of the plurality of project tasks, that the at least one project task has a state of started but not completed, planned but not started, or has only a start date specified and the at least one project task has a child project task that is a review, test, or inspection task;

retrieving the inspection material from the project schedule database, wherein the inspection material includes schedule data for the one or more project tasks that are inspection material, and generating an inspection meeting form that identifies at least the inspection material and allows a user to specify at least one or more inspectors, one or more preparation times for the one or more inspectors and one or more attributes of one or more defects that correspond to the inspection, wherein the one or more attributes of the one or more defects include at least location, description and severity; and in response to an indication that the inspection has been completed:

generating an inspection report that identifies at least the one or more inspectors, the inspection material and the one or more attributes of one or more defects that correspond to the inspection, generating and storing in an inspection index an index entry that references the inspection report, and generating, based upon the inspection index, an inspection index document that includes information about a plurality of inspections that have been completed including the inspection and wherein the inspection index document includes a plurality of links to a plurality of inspection reports for the plurality of inspections, wherein the plurality of links includes a link to the inspection report.

8. The apparatus as recited in claim 7, wherein the memory stores additional instructions which, when processed by the one or more processors, causes generating and including in the inspection material, in association with the schedule data for the one or more project tasks, identification data that identifies the one or more project tasks and child project tasks for the one or more project tasks.

9. The apparatus as recited in claim 7, wherein retrieving the inspection material from the project schedule database is performed by processing a single query against the project schedule database, wherein the single query includes a parameter for the state data.

* * * * *